United States Patent [19]
Kimmig et al.

[11] Patent Number: 6,000,515
[45] Date of Patent: Dec. 14, 1999

[54] CLUTCH ASSEMBLY

[75] Inventors: Karl-Ludwig Kimmig, Bühl-Waldmatt; Christoph Wittmann, Bühl-Eisental; Wolfgang Reik, Bühl; Paul Maucher, Sasbach; Rolf Meinhard, Bühl, all of Germany

[73] Assignee: LuK Lamellen und Kupplungsbau GmbH, Buhl, Germany

[21] Appl. No.: 08/211,020

[22] PCT Filed: Jul. 7, 1993

[86] PCT No.: PCT/EP93/01760

§ 371 Date: Jan. 6, 1995

§ 102(e) Date: Jan. 6, 1995

[87] PCT Pub. No.: WO94/01692

PCT Pub. Date: Jan. 20, 1994

[30] Foreign Application Priority Data

Jul. 11, 1992 [DE] Germany ............................ 42 22 842
Sep. 17, 1992 [DE] Germany ............................ 42 31 131
May 26, 1993 [DE] Germany ............................ 43 17 587

[51] Int. Cl.⁶ .................................................. F16D 13/75
[52] U.S. Cl. ........................................................ 192/70.25
[58] Field of Search ............................ 192/70.25, 111 A

[56] References Cited

U.S. PATENT DOCUMENTS

| | | |
|---|---|---|
| 3,061,062 | 10/1962 | Smirl . |
| 3,323,624 | 6/1967 | Maurice . |
| 3,876,049 | 4/1975 | Linn et al. ............................ 192/111 A |
| 4,057,131 | 11/1977 | Flotow ................................. 192/70.13 |
| 4,086,996 | 5/1978 | Gatewood ............................ 192/111 A |
| 4,099,604 | 7/1978 | Higgerson ............................ 192/111 A |
| 4,191,285 | 3/1980 | Thelander et al. ............... 192/70.25 X |
| 4,207,972 | 6/1980 | Zeidler ................................ 192/111 A |
| 4,225,028 | 9/1980 | Wishart ................................ 192/111 A |
| 4,228,883 | 10/1980 | Palmer ................................. 192/111 A |
| 4,326,617 | 4/1982 | Mochida et al. ..................... 192/111 B |
| 4,368,810 | 1/1983 | Maucher et al. . |
| 4,828,083 | 5/1989 | Naudin . |
| 4,878,396 | 11/1989 | Grunberg ................................. 74/518 |
| 4,924,991 | 5/1990 | Takeuchi ............................ 192/111 A |
| 5,069,322 | 12/1991 | Mizukami et al. .................. 192/70.25 |
| 5,070,984 | 12/1991 | Fehring . |
| 5,176,234 | 1/1993 | Reik et al. . |
| 5,186,298 | 2/1993 | Takeuchi ............................ 192/111 A |
| 5,251,737 | 10/1993 | Flotow et al. ........................ 192/111 A |
| 5,261,516 | 11/1993 | Freidmann .......................... 192/70.17 |
| 5,301,780 | 4/1994 | Jäckel ................................... 192/70.17 |
| 5,320,205 | 6/1994 | Kummer et al. ..................... 192/70.25 |
| 5,409,091 | 4/1995 | Reik et al. ....................... 192/111 A X |
| 5,413,202 | 5/1995 | Maucher ............................. 192/107 C |
| 5,450,934 | 9/1995 | Maucher ......................... 192/111 A X |

FOREIGN PATENT DOCUMENTS

| | | |
|---|---|---|
| 2582363 | 11/1986 | France . |
| 2599444 | 12/1987 | France . |
| 2599446 | 12/1987 | France . |
| 2605692 | 4/1988 | France . |
| 2606477 | 5/1988 | France . |
| 704791 | 4/1941 | Germany . |
| 898531 | 11/1953 | Germany . |
| 1267916 | 5/1968 | Germany . |
| 1450201 | 8/1969 | Germany . |
| 2441141 | 3/1975 | Germany . |
| 2460963 | 7/1976 | Germany . |
| 2164297 | 9/1976 | Germany . |

(List continued on next page.)

OTHER PUBLICATIONS

SAE Technical Paper Series 900391 authored by Ida et al, (Feb. 26–Mar. 2, 1990).

*Primary Examiner*—Rodney H. Bonck
*Attorney, Agent, or Firm*—Darby & Darby

[57] ABSTRACT

A friction clutch has a pressure plate which is axially movably but non-rotatably coupled to a flywheel on the output element of the engine in a motor vehicle and is acted upon by a diaphragm spring which causes the pressure plate and the flywheel to frictionally engage the friction linings of a clutch disc when the clutch is engaged. The wear upon the friction linings is compensated by a device which causes the diaphragm spring to move toward the flywheel and operates between the clutch housing and the diaphragm spring.

29 Claims, 30 Drawing Sheets

FOREIGN PATENT DOCUMENTS

| | | |
|---|---|---|
| 2701999 | 7/1977 | Germany . |
| 2752904 | 5/1979 | Germany . |
| 2916755 | 11/1979 | Germany . |
| 2920932 | 11/1979 | Germany . |
| 3309427 | 10/1983 | Germany . |
| 3518781 | 11/1986 | Germany . |
| 3721711 | 1/1988 | Germany . |
| 3721712 | 1/1988 | Germany . |
| 3631863 | 3/1988 | Germany . |
| 3742354 | 6/1988 | Germany . |
| 4011850 | 10/1990 | Germany . |
| 41175471 | 12/1991 | Germany . |
| 4117579 | 12/1991 | Germany . |
| 4117582 | 12/1991 | Germany . |
| 4239289 | 5/1993 | Germany . |
| 4092382 | 6/1993 | Germany . |
| 4300665 | 9/1993 | Germany . |
| 4306505 | 9/1993 | Germany . |
| 51-126452 | 4/1976 | Japan . |
| 1163218 | 11/1989 | Japan . |
| 2124326 | 10/1990 | Japan . |
| 3123 | 1/1991 | Japan . |
| 319131 | 2/1991 | Japan ............................. F16D 13/75 |
| 325026 | 3/1991 | Japan . |
| 353628 | 5/1991 | Japan . |
| 1519039 | 7/1978 | United Kingdom . |
| 2022729 | 12/1979 | United Kingdom . |
| 1567019 | 5/1980 | United Kingdom . |
| 2176256 | 12/1986 | United Kingdom . |
| WO88/08492 | 11/1988 | WIPO . |

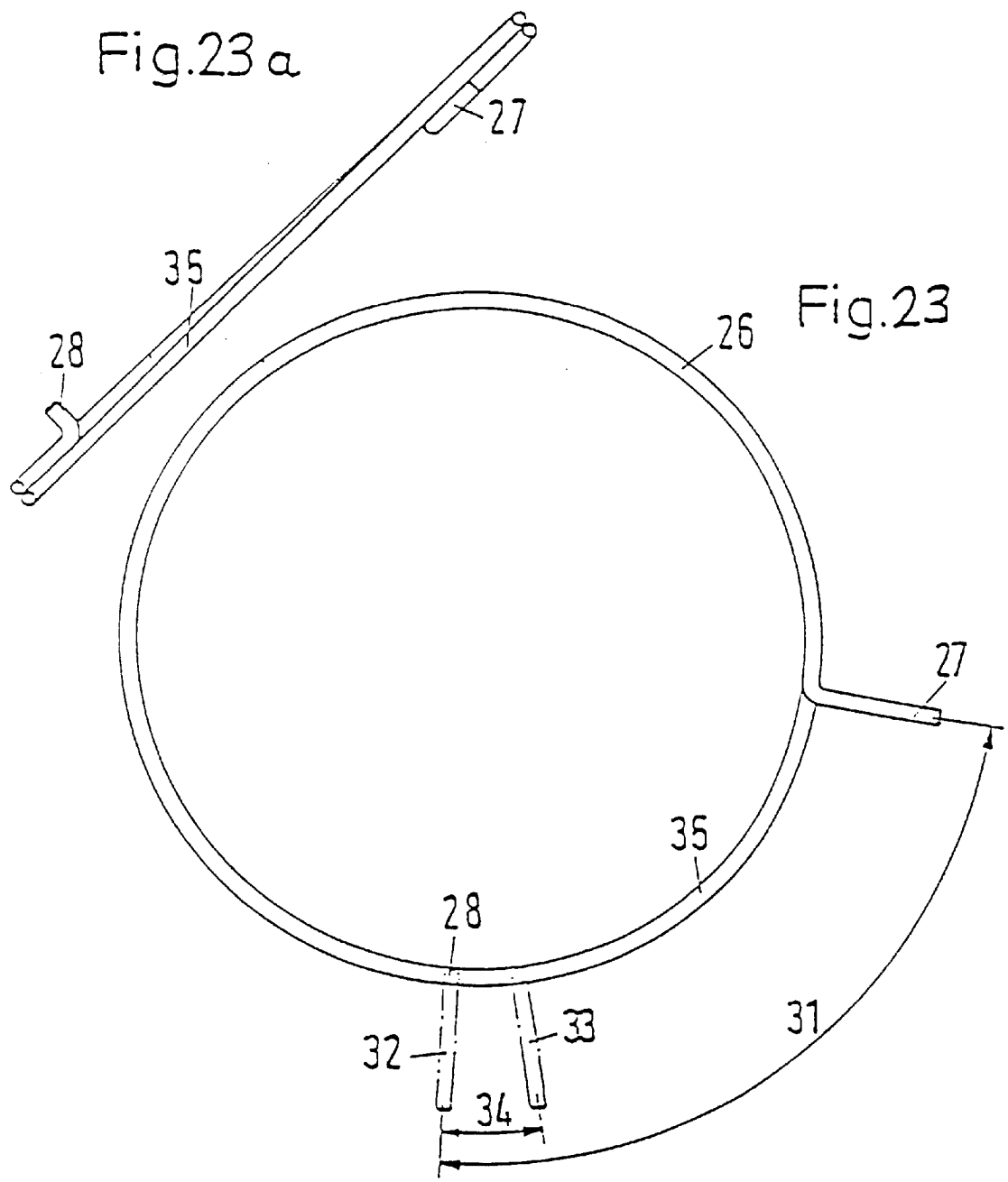

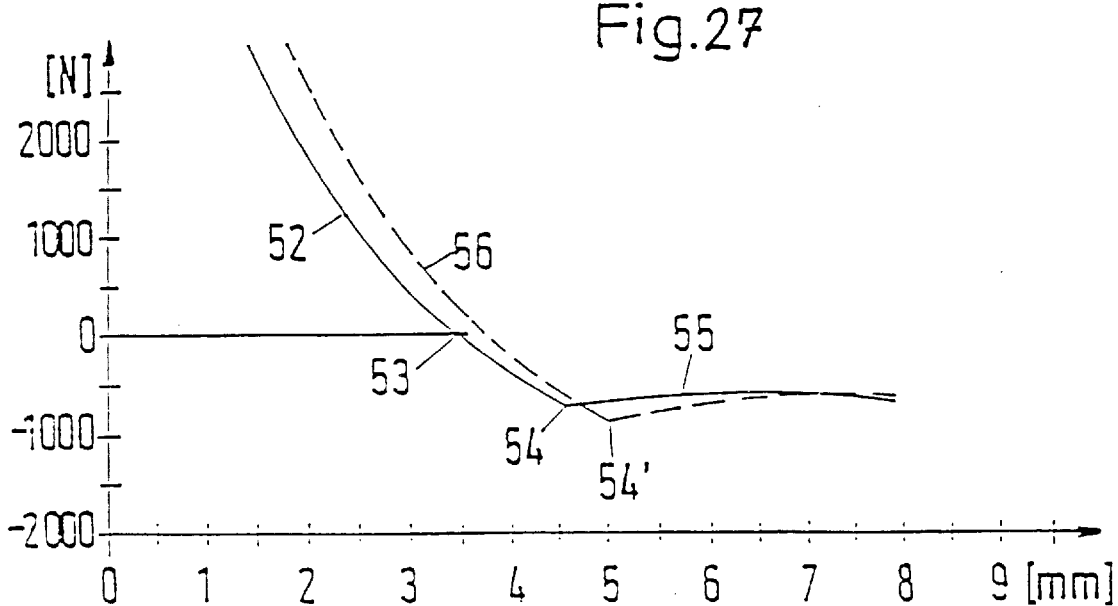
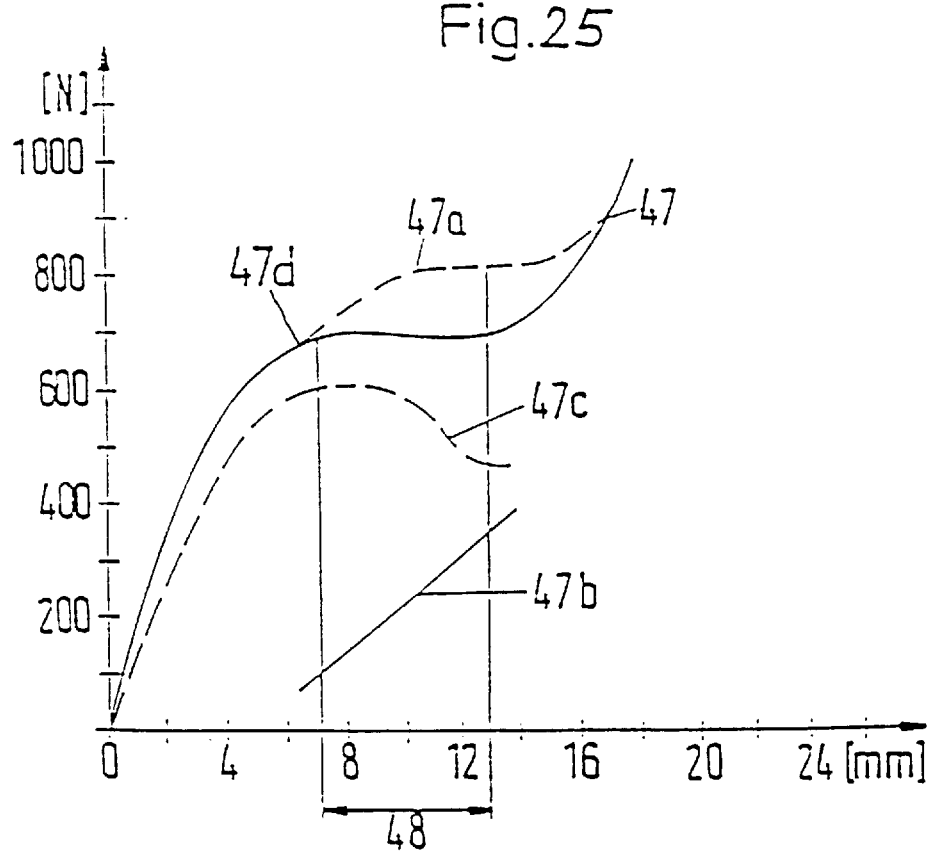

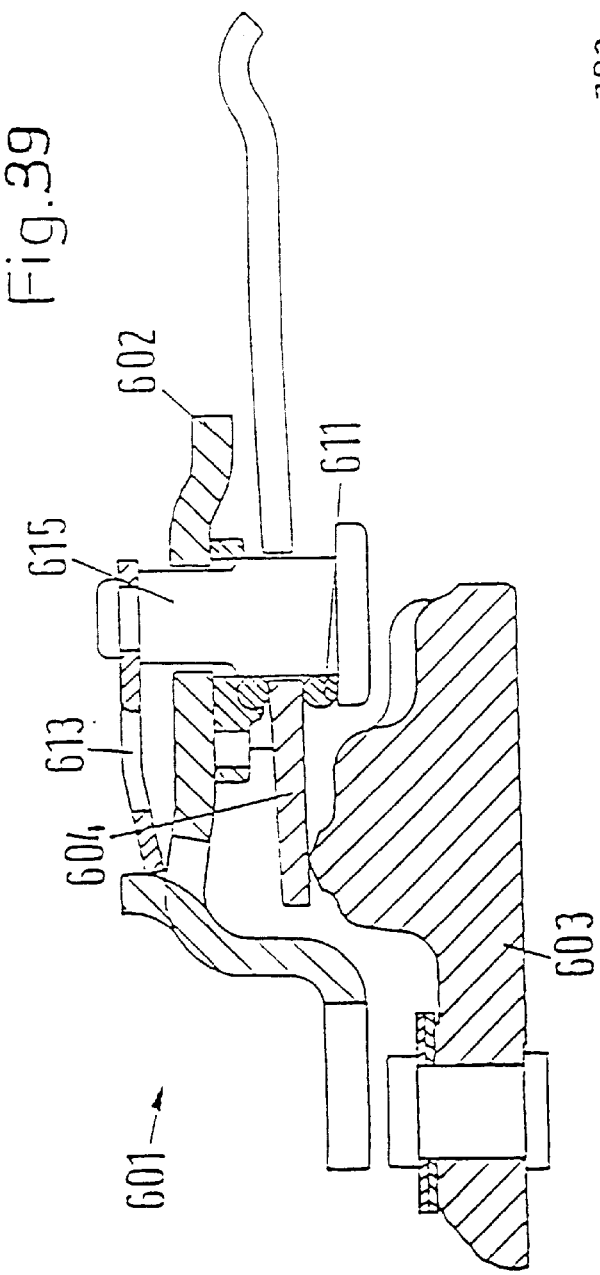

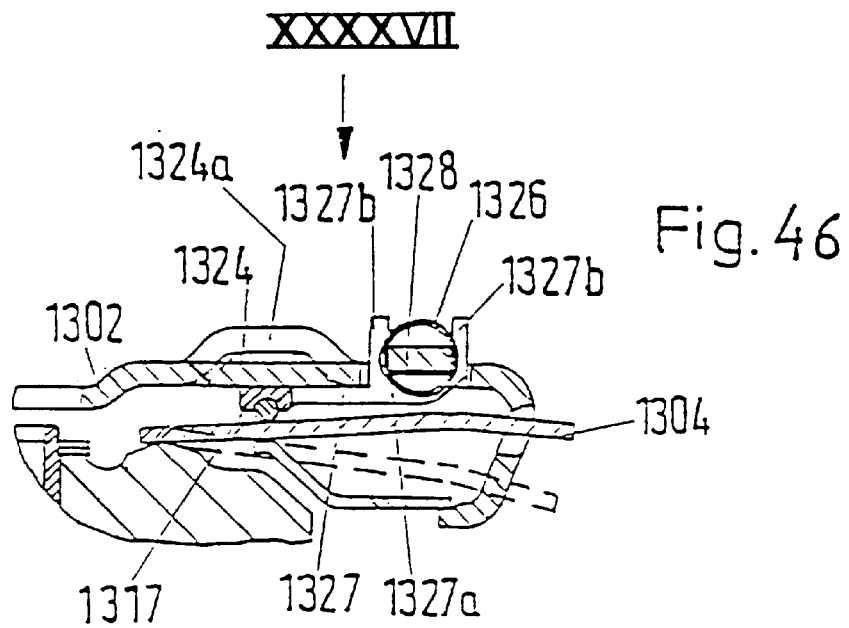
Fig. 46
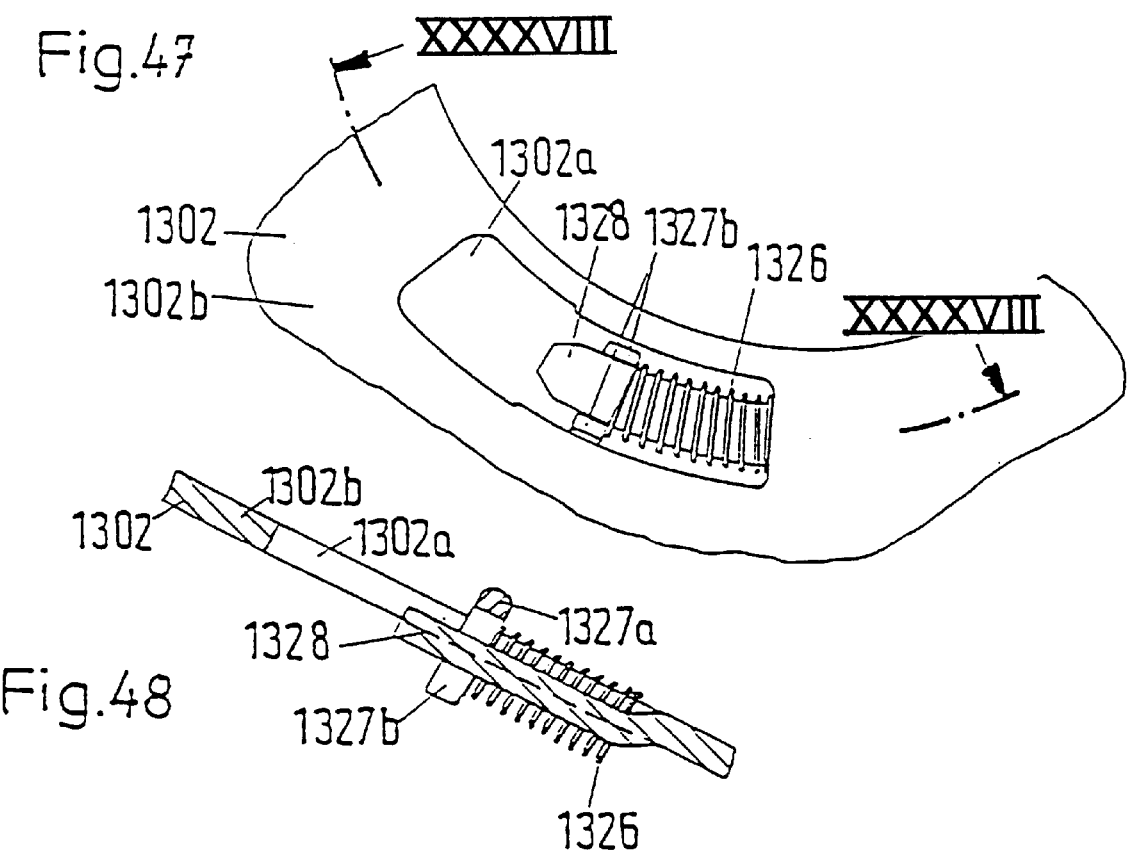
Fig. 47
Fig. 48

CLUTCH ASSEMBLY

BACKGROUND OF THE INVENTION

The invention relates to a clutch assembly with a friction clutch comprising a pressure plate which is non-rotatably connectable with a counterpressure plate for limited axial movement with respect thereto, at least one biasing spring being provided to urge the pressure plate toward a clutch disc which can be clamped between the pressure plate and the counterpressure plate and there being further provided an adjusting device to compensate at least for the wear upon the friction linings of the clutch disc to effect a substantially unchanged application of force by the biasing spring to the pressure plate, the friction clutch further comprising actuating means for engaging and disengaging the clutch and the actuating means being operable by a disengaging member which is shiftable axially by a disengaging means, e.g., a disengaging fork which is pivotably mounted on a transmission case.

A clutch assembly which is constructed and which is operable in the aforedescribed manner is known, for example, from the published French patent application No. 2 582 363. The actuating means of such clutch assemblies can be acted upon by disengaging systems or by disengaging means and a disengaging member in a manner as disclosed, for example, in U.S. Pat. No. 4,368,810, in U.S. Pat. No. 4,326,617, in the published German patent application No. 27 52 904 and in the published German patent application No. 27 01 999.

Clutch assemblies or friction clutches utilizing an integrated adjusting device which compensates at least for the wear upon the friction linings of the clutch disc exhibit the drawback that, especially when employing so-called mechanical disengaging systems wherein the movements of the clutch pedal are transmitted to the actuating means of the friction clutch by way of a linkage and/or a Bowden wire with the interposition of at least one disengaging bearing, due to tolerances within the entire kinematic train one cannot ensure that those portions of the disengaging member which act upon the actuating means invariably assume the same axial position relative to those portions of the actuating means which are to be acted upon. This can result in relatively large departures of the disengaging path of the friction clutch or of the extent of actuating movement which is being imparted to the actuating means. At the very least, such departure can adversely influence the operation of the adjusting device to such an extent that, under certain extreme circumstances, the adjusting device is no longer capable of carrying out its adjusting function. Furthermore, it can happen that, under certain circumstances when the actuating means covers an excessive distance resulting in undesired adjustment, the friction clutch is no longer capable of being properly disengaged or the initial stressing and the position of the biasing spring are altered to such extent that the force which is actually supplied by the biasing spring does not suffice to guarantee an acceptable transmission of torque.

OBJECTS OF THE INVENTION

An object of the present invention is to avoid the aforediscussed drawbacks and to provide a clutch assembly of the aforedescribed class wherein the adjusting device is capable of proper operation for the purpose of compensating for the wear upon the friction linings. Furthermore, it is proposed to make the assembly in a very simple and inexpensive manner.

SUMMARY OF THE INVENTION

In accordance with the invention, the above objects are accomplished by the provision of a device which compensates for departures of the axial position of the actuating means from an optimum position or compensates for the departures of those portions of the actuating means relative to the disengaging member or disengaging means from an optimum position which are acted upon by the actuating means. Such a device can be utilized with particular advantage in clutch assemblies wherein, in accordance with a further development of the invention, the actuating means is shifted in the axial direction of the disengaging movement in dependency at least upon the extent of wear upon the friction linings because this ensures a practically tolerance-free transmission of force between the disengaging member or the disengaging means and the actuating means. In addition, this ensures that the actuating means can always be moved through the same distance. Thus and for all practical purposes, there is no play between the disengaging member and/or the disengaging means on the one hand, and the actuating means on the other hand.

It can be of particular advantage if the compensating device is disposed or acts axially between the disengaging member and the actuating device. However, it is also possible to install the compensating device at other locations, e.g., so that it operates between the disengaging member and the disengaging means. In accordance with the present invention, it is advantageous to mount the actuator on an axial guide which is mounted on the transmission, e.g., a tubular guide which surrounds the input shaft of the transmission.

It can be advisable, particularly in clutch assemblies with a friction clutch which comprises a housing, e.g., a sheet metal cover, which can be connected to the counterpressure plate and comprises a bottom wall confronting the disengaging member, to install the compensating device or to cause the compensating device to act axially between the actuating means and the bottom wall. Furthermore, it can be of advantage if the biasing spring constitutes a diaphragm spring which operates axially between the clutch housing and the pressure plate and which comprises a resilient ring-shaped main portion and prongs which extend radially inwardly from the main portion and constitute the actuating means.

In order to ensure proper adjustment by the compensating device, it can be of particular advantage if the compensating device automatically or self-actingly ensures the necessary adjustment in the engaged condition of the clutch assembly or friction clutch and self-actingly or automatically blocks the adjustment during actuation of the friction clutch.

The compensating device can comprise a ring-shaped member which axially abuts the actuating means also in the engaged condition of the friction clutch. The ring-shaped member can compensate for the eventually changing distance between the actuating portions of the actuating means and the disengaging member. It can be of advantage for the operation of the compensating device if the latter comprises adjusting ramps or climbing ramps. Such ramps can be provided on the ring-shaped member.

The adjusting ramps can cooperate with cylindrical or substantially spherical rolling bodies in order to carry out the adjustment. However, it can be of particular advantage if the adjusting ramps cooperate with complementary ramps because, by properly selecting the slope angle of the ramps, one can achieve a self-locking action in response to axial stressing of the ramps. The complementary ramps can also be provided on a ring-shaped member.

Furthermore, and in order to achieve a more economical production of the friction clutch, it can be of advantage if at least one part of the compensating device is made of a plastic material. Such plastic part or parts can be produced by injection molding. Plastics which are particularly suitable are thermoplastic substances, such as for example polyamide.

It is of particular advantage if the members which include the adjusting ramps are movable in the axial direction in response to actuation of the clutch assembly or friction clutch. It can be of additional advantage if the component parts carrying the climping ramps and the complementary ramps are rotatable relative to each other. One of these members can be mounted in such a way that it cannot rotate relative to the friction clutch, especially relative to the clutch housing.

In accordance with a further inventive concept, the compensating device can be designed in such a way that it operates or adjusts not unlike a freewheel—as seen in the direction of disengagement of the clutch assembly—but is self-locking in the direction counter to the direction of disengagement. To this end, the climbing ramps and/or the complementary ramps can be designed in such a way that they define in the axial direction a slope angle which is between 5° and 20°, preferably in the range of between 7° and 11°. It is of advantage if the compensating ramps are designed in such a way that there develops a self-locking action in response to frictional engagement. Thus, one should ensure that under all circumstances the adjusting ramps can self-lockingly engage each other so that it is not necessary to provide any additional means in order to avoid an unintentional resetting. However, such means can be provided if necessary.

In order to ensure an optimal operation of the automatic compensating device, it can be of advantage if at least one of the climbing ramps and/or a member which carries the complementary ramps is spring biased in the direction of adjustment. The spring bias can be achieved in an advantageous manner in that the operation of the other springs, such as especially the biasing or diaphragm spring and the spring which acts upon the axially yieldable friction linings, is not affected in any appreciable manner or is not affected at all. A particularly satisfactory design can be achieved in that the members which are provided with the climbing ramps and the complementary ramps are acted upon or stressed in the direction of adjustment by at least one energy storing element, such as a coil spring, which is installed between these members. Due to such stressing, the members are urged in opposite directions, as considered in the axial direction, i.e., the energy storing elements and the adjusting ramps cause the members to move axially and away from each other. In this manner, the compensating device can be stressed without play axially between the actuating portions of the actuating means and the clutch cover and/or the disengaging member in the engaged condition of the clutch.

In accordance with a particularly advantageous further development of the invention, the coupling assembly can comprise an arrangement for limiting the disengaging movement, at least the disengaging movement of the actuating means. To this end, one can provide a stop which limits the extent of movability of the disengaging member and/or of the disengaging means in the disengaging direction. It is of advantage if the stop is provided on a member forming part of the compensating device and being designed to engage the clutch cover upon completion of a predetermined movement in the disengaging direction. However, it is also possible to provide a stop which includes portions forming part of the disengaging member and abutting an axially fixed part upon completion of a predetermined movement in the disengaging direction. Furthermore, it can be of advantage if the disengaging member also comprises an abutment which is effective in the direction of engagement and which can also constitute a stop. In accordance with an advantageous embodiment, the compensating device is designed in such a way that it props the actuating member in the engaged condition of the clutch assembly. An unchanged actuating movement for the clutch assembly can also be ensured in that a member which forms part of or constitutes the compensating device comprises movement limiting portions which are effective in the direction of disengagement as well as in the direction of engagement and cooperate with the stops. It is of advantage if such a member is constituted by that part of the compensating device which is acted upon by the disengaging member, and the movement limiting stops can be provided on the clutch housing or can form part of such housing. However, it is also possible to limit the extent of actuating movement of the clutch assembly by providing suitable abutments on that component part which guides the disengaging member in the axial direction. Such abutments preferably cooperate with a component part which is connected with the non-circulating bearing race of the disengaging member. Furthermore, the extent of disengaging movement in at least one axial direction can be limited also between the rotating bearing race and a component part, such as for example the clutch housing, which rotates with the bearing race.

In accordance with an additional further development of the invention, it can be of particular advantage—especially for minimizing the progress of the disengaging force or the maximum required disengaging force—by providing means which effects a gradual reduction of torque adapted to be transmitted by the clutch assembly or the clutch disc during disengagement and at least during a portion of the actuating movement of the actuating means. For example, such means for effecting a gradual reduction of torque can be constituted by the so-called friction lining springs which are provided between the friction linings of the clutch disc which latter can be clamped between the pressure plate and the counterpressure plate.

A particularly advantageous embodiment of the novel friction clutch can be obtained in that the biasing spring, which is preferably constituted by a diaphragm spring, is tiltably supported by the housing between two seats—of which one confronts the pressure plate and is spring-biased toward the biasing diaphragm spring—in such a way that the maximum disengaging force which the biasing spring applies to the spring-biased seat during disengagement of the friction clutch is increased in response to wear upon the friction linings so that it exceeds the opposing force or supporting force acting upon the spring-biased seat. If the transmission of torque between the pressure plate and the clutch housing is effected by leaf spring elements and/or by a so-called spring arrangement between the friction linings, such as are known for example from the published German patent application No. 36 31 863, it is necessary to take into consideration those forces which such springs apply to the biasing spring in order to determine the force which acts upon the spring-biased seat because such forces are superimposed upon each other. In other words, when the friction linings have undergone a certain amount of wear, the temporarily developing increased disengaging force must exceed the resulting force, with reference to the tilting diameter of the diaphragm spring, of the aforementioned forces; this renders it possible to effect an adjustment. It can be of particular advantage if the spring-biased seat is movable in the axial direction. Furthermore, it can be of advantage if the characteristic curve of the biasing diaphragm spring is configured in such a way that, starting with a structurally defined position of installation in the friction clutch and in response to a dissipation of energy which is determined by the extent of wear upon the friction linings, the force which is to be applied by the biasing diaphragm spring and hence the level of the progress of the disengaging force increases and that, when the deformation and stressing of the biasing diaphragm spring exceed the deformation and stressing upon installation, the maximum force which is to be applied during disengagement of the friction clutch decreases. Due to such mounting and design of the biasing diaphragm spring, one can ensure that, in response to wear upon the friction linings, there invariably develops again and again a state of equilibrium between the maximum disengaging force of the friction clutch and the opposing force which acts upon the spring-biased seat or the resultant opposing force acting upon the biasing diaphragm spring in the region of the tilting diameter of the biasing diaphragm spring.

It is of advantage if the clutch assembly or the friction clutch is constructed in such a way that the axially movable spring-biased seat is shifted jointly with the pressure plate within the permissible range of wear upon the parts of the friction clutch. The spring-biased seat can be shifted to a small extent in a direction toward the pressure plate—during the life span of the friction clutch—in response to gradual or small stepwise adjustment by the adjusting device. Such shifting of the spring-biased seat renders it possible to ensure that the diaphragm spring, which then bears upon the pressure plate, undergoes additional deformation so that the force which is being applied by the diaphragm spring decreases, in a manner as described hereinbefore, until the opposing force or the aforementioned resultant force acting upon the spring-biased seat is in a state of equilibrium with the disengaging force. Thus, the maximum disengaging force of the clutch or of the biasing diaphragm spring is reduced in response to shifting of the spring-biased seat.

It can be of particular advantage if the biasing diaphragm spring is installed in the friction clutch in such a way that its characteristic curve slopes downwardly at least during a portion of disengagement of the clutch, preferably during each and every stage of disengagement. The position of the freshly installed biasing spring can be such that, when the friction clutch is disengaged, the biasing spring reaches, at least substantially, the minimum or the lowermost point of its sinusoidal force-distance progress.

It is of advantage if the opposing force which acts upon the spring-biased seat is furnished by an energy storing element which applies a substantially constant force, at least within the contemplated range of compensation. A suitably designed diaphragm spring which is installed in the friction clutch in stressed condition is particularly suitable for the application of opposing force to the spring-biased seat.

The invention is not limited only to the aforedescribed friction clutches but can be put to use generally in friction clutches or clutch assemblies employing an adjusting device which compensates for wear upon the friction linings of the clutch disc.

The invention further relates to a friction clutch, particularly for motor vehicles, having a pressure plate which is connected with a housing in such a way that it cannot rotate but can perform limited axial movements relative to the housing, a biasing diaphragm spring being mounted in axially stressed condition between the housing and the pressure plate so that it can be tilted relative to a seat arrangement which is carried by the housing and that it bears upon the pressure plate in a direction toward a clutch disc which can be clamped between the pressure plate and a counterpressure plate, such as a flywheel, and an adjusting device being provided to compensate for wear upon the friction linings of the clutch disc.

Automatic adjusting devices which are to effect a substantially unchanged biasing of the pressure plate by the biasing diaphragm spring are disclosed, for example, in published German patent applications No. 29 16 755 (corresponding to U.S. Pat. No. 4,228,883 granted Oct. 21, 1980 to Palmer) and 35 18 781 (corresponding to UK patent application Serial No. 2 176 256A published Dec. 17, 1986). The adjusting devices, which are actuatable in dependency upon signals from at least one sensor, are installed or operate between the pressure plate and the biasing diaphragm spring. Due to coupling of the pressure plate with the housing by means of tangentially arranged leaf springs—the bias of the leaf springs must be relatively small because it opposes the bias of the diaphragm spring—the pressure plate, whose mass is considerable, is free to perform axial reciprocatory movements when the friction clutch is disengaged. In other words, the pressure plate can become disengaged from the diaphragm spring and this not only adversely affects the operation of the clutch but can also affect the safety of the clutch because the adjusting device compensates when the friction clutch is disengaged until the pressure plate reengages the clutch disc. Thus, the clutch cannot become disengaged. Therefore, such adjusting devices failed to gain acceptance and are not in actual use.

An object of the additional invention is to eliminate the aforementioned drawbacks and to provide adjusting devices of the aforediscussed type which can be put to actual use even under less than optimal circumstances, whose construction is simple and whose operation is always safe, and which have a compact design and can be produced at a reasonable cost. Furthermore, the required disengaging forces should be small and should remain small during the entire useful life of the friction clutch. Still further, the useful life of the improved friction clutch should be longer than that of heretofore known adjustable friction clutches.

In accordance with the invention, such objects are accomplished in a friction clutch having a pressure plate which is biased by a diaphragm spring and wherein the diaphragm spring reacts against a component such as a housing and is tiltable relative to a ring-shaped seat arrangement provided in the housing. The friction clutch further comprises an automatic adjusting device which operates between the cover and the diaphragm spring to move that seat of the seat arrangement which is nearer to the housing so that the seat is moved away from the housing in dependency upon the wear on friction linings. The adjusting device can be further transported by an advancing device and the biasing spring is acted upon by a supporting force in a direction toward the seat arrangement. Such supporting force is preferably applied continuously so that the diaphragm spring is braced against the disengaging force only in a force-locking manner, namely by spring bias, rather than by form-lockingly coupled means. The diaphragm spring is installed with a degressive characteristic curve within its operating range in such a way that the supporting force and the bias of the diaphragm spring are related to each other so as to ensure that the supporting force, by taking into consideration the contemplated position of installation of the diaphragm spring without the wear-dependent change of conicity and within the range of movement of the diaphragm spring during disengagement, exceeds the magnitude of the force which is furnished by the diaphragm spring and acts counter to the supporting force. On the other hand, the supporting force is smaller than the force which is applied by the diaphragm spring counter to the supporting force when the conicity of the diaphragm spring changes in response to wear upon the friction linings. The supporting force can be applied by a single spring element or at least substantially by a single spring element or spring element system. The term "supporting force" is intended to embrace the sum of forces—to the extent that they are detectable—opposing the bias of the diaphragm spring. Thus, such term embraces for example also or only those forces which are supplied by the (torque-transmitting or disengaging) leaf springs, the bias of springs (in unstressed condition) which act upon the friction linings or their "substitutes".

The energy storing element which furnishes at least the major part of the supporting force is preferably a spring, e.g., a diaphragm spring, whose configuration changes during adjustment. However, it is equally possible to employ the leaf springs as energy storing elements which supply the supporting force.

A diaphragm spring which applies the supporting force can bear directly upon the biasing diaphragm spring, e.g., at the radial level of the seat which is movable axially and confronts the cover.

It is particularly advantageous if the adjusting device is disposed axially between the diaphragm spring and the cover. In accordance with an especially advantageous proposal, the adjusting device can comprise sloping surfaces, such as ramps.

The invention ensures that the conicity or initial stressing of the diaphragm spring in the engaged condition of the friction clutch remains substantially unchanged during the entire useful life of the friction clutch and that the pressure plate and hence also the clutch disc is acted upon by a substantially constant force independently of the extent of wear upon the friction linings, upon the pressure plate or upon other elements such as the seat which confronts the cover or the pressure plate, upon the diaphragm spring or the friction surface of the flywheel. The novel proposal further ensures that the mass of the pressure plate is not augmented by the mass of the adjusting device. The mass of the pressure plate continues to remain within a range in which it is shielded from the effects of wear upon the plates and in which it is located at a greater distance from the source of friction heat.

A particularly advantageous embodiment of the novel friction clutch can be arrived at in that the biasing diaphragm spring is tiltably supported by the housing between two seats—one of which confronts the pressure plate and is spring-biased toward the biasing diaphragm spring—and in that the force which is furnished by the biasing diaphragm spring during disengagement of the friction clutch and acts upon the spring-biased seat increases in response to wear upon the friction linings and then exceeds the opposing force or supporting force which is being applied to the spring-biased seat. The configuration of the characteristic curve of the biasing diaphragm spring is then such that, starting from a structurally defined position of installation of the biasing diaphragm spring in the friction clutch and taking into consideration that the biasing diaphragm spring dissipates energy in a particular direction in response to wear upon the friction linings, the force which is being applied by the biasing diaphragm spring, and hence the required disengaging force, increases during a first stage but decreases in the course of disengagement when the extent of deformation and stressing of the biasing diaphragm spring further depart from the extent of deformation of the biasing diaphragm spring in the position of installation. Such mounting and design of the biasing diaphragm spring ensure that a state of equilibrium between the force which the biasing diaphragm spring applies to the seat during disengagement of the friction clutch and the opposing force acting upon the spring-biased seat is achieved again and again because, if the supporting force is exceeded by the force which the biasing diaphragm spring applies to the seat, the biasing diaphragm spring shifts the sensor spring away from that seat which faces toward the cover and the adjusting device can be rotated again in response to the application of force by the advancing device.

This results in axial shifting of the seat until the force which is being applied by the sensor prevents further rotation and further axial displacement of the seat.

It is particularly advantageous if, as already mentioned above, the biasing diaphragm spring is installed in the friction clutch in such a way that it exhibits a downwardly sloping characteristic curve, at least during a certain portion of the disengagement range, preferably at least substantially within the entire disengagement range of the clutch. The initial position of the biasing diaphragm spring can be selected in such a way that, in the disengaged condition of the friction clutch, the progress of the distance-force curve of the biasing diaphragm spring reaches or moves beyond the minimum or lowermost value.

The opposing force which is being applied to the spring-biased seat can be generated by an energy storing element which applies a substantially constant force at least within the contemplated range of adjustment. A suitably configurated and prestressed diaphragm spring has been found to be particularly suitable for installation in the friction clutch to act upon the spring-biased seat.

The improved adjusting device can be utilized with particular advantage in friction clutches employing a biasing diaphragm spring which comprises radially outer portions bearing against the pressure plate and additional portions located radially inwardly of the radially outer portions and tiltable in the housing between two seats. In such friction clutches, the diaphragm spring can act not unlike a two-armed lever.

However, the invention is not limited to friction clutches with diaphragm springs which are of one piece with disengaging levers in the form of diaphragm spring prongs but can be embodied also in other types of clutches, e.g., clutches wherein the diaphragm spring is actuated by additional levers.

In order to ensure optimal adjustment to compensate for wear or an optimum biasing force for the friction clutch, it can be of particular advantage if the opposing seat at that side of the biasing diaphragm spring which faces away from the spring-biased seat is configured in such a way that it can be automatically or spontaneously moved axially in a direction toward the pressure plate but can be automatically or spontaneously arrested by a device against movement in the opposite direction. The adjustment of the opposing seat, namely of the seat which confronts the cover, can be effected by employing an energy storing element which urges the opposing seat in a direction toward the pressure plate, i.e., which opposes the bias of the biasing diaphragm spring. Thus, the energy storing element automatically adjusts the position of the opposing seat to compensate for displacement of the spring-biased seat in response to wear upon the friction linings, and this ensures a clearance-free tiltable mounting of the biasing diaphragm spring.

The opposing seat can be moved axially by an adjusting device which is provided between the biasing diaphragm spring and the cover. The adjusting device can comprise a ring-shaped member, i.e., a coherent or one-piece member, which is biased by the biasing diaphragm spring axially, at least in the engaged condition of the friction clutch.

The tiltable seat assembly can be adjusted to compensate for wear upon the friction linings by rotating the ring-shaped member in the course of the clutch disengaging operation whenever it becomes necessary to compensate for wear. To this end, it is particularly advantageous to provide the ring-shaped member of such adjusting device with adjusting ramps which slope in the axial direction. Furthermore, it can be of advantage if the ring-shaped member carries the opposing support or seat, and such seat can constitute a wire ring. This wire ring can be received in a circumferentially extending groove of the ring-shaped member and can be form-lockingly connected thereto. The form-locking connection can constitute a connection which can hold the wire ring by snap action.

In order to carry out an adjustment, the adjusting ramps can cooperate with cylindrical or substantially spherical rolling elements. However, it can be of particular advantage if the adjusting or sloping ramps cooperate with corresponding complementary ramps because, by properly selecting the angle of slope of such ramps, one can achieve a self-locking action in response to axial stressing of the ramps. The opposing-ramps can be carried by a ring-shaped member which can be disposed between the member which carries the sloping ramps and the cover. However, a particularly simple construction can be obtained by providing the opposing ramps in the housing. The latter can be accomplished in an especially simple manner if the housing is made of sheet metal because it is possible to stamp the opposing ramps into the housing. The stamped ramps can be provided in radially extending portions of the housing.

In order to ensure the making of the friction clutch at a reasonable cost, it can be of additional advantage if at least a portion of the adjusting device is made of plastic material. Such plastic parts can be made by injection molding. Thermoplastic substances, such as for example polyamide, can be utilized with particular advantage. The utilization of plastic materials is possible because the adjusting device is disposed at a location which is shielded from heat. Furthermore, the relatively low weight of the plastic material brings about a reduction of the mass moment of inertia.

In accordance with a further inventive proposal, the adjusting device can be designed in such a way that it acts not unlike a freewheel, as seen in the direction of disengagement of the friction clutch, but is self-locking in a direction counter to the direction of engagement. To this end, the sloping ramps and/or the opposing ramps can be designed in such a way that their angle of slope in the axial direction is between 4° and 20°, preferably in the range of between 5° and 12°. It is advantageous to design the sloping ramps and/or the opposing ramps in such a way that a self-locking action takes place as a result of frictional engagement. However, it is also possible to achieve or to assist a self-locking action by the establishment of a form-locking connection, for example, by utilizing a set of soft ramps and a set of profiled ramps or by employing two sets of profiled ramps. Such undertakings ensure that it is not necessary to provide additional means for the purpose of avoiding undesirable resetting.

A particularly advantageous and simple adjusting device can be arrived at if the advancing device which acts in the circumferential direction constitutes a spring which is installed in stressed condition and yieldably bears at least upon a member which carries the sloping ramps and/or upon a member which carries the opposing ramps or opposing surfaces so that the biased member is resiliently urged in the direction of adjustment. It is advantageous to select the spring bias in such a way that it does not interfere, or does not appreciably interfere, with the operation of other springs, especially the actuating diaphragm spring and the spring which biases the axially yieldable seat.

It can be of advantage, for many applications, if the adjusting device comprises a plurality of shiftable adjusting elements, such as for example adjusting wedges or rolling elements which are movable in the radial and/or circumferential direction. Furthermore, it can be of advantage if the operation of the adjusting device is dependent on the RPM. For example, the centrifugal force which acts upon certain elements of the adjusting device can be relied upon to actuate and/or to lock the adjusting device under certain operating conditions of the combustion engine. It is particularly advantageous if the adjusting device can be blocked by means whose operation depends upon centrifugal force developing when a certain RPM is exceeded. For example, a blocking action can take place when the RPM at least approximates the idling RPM or when the RPM is below the idling RPM, so that a compensation for wear takes place only at a low number of revolutions per minute. This exhibits the advantage that one precludes unintentional adjustments such as could take place as a result of vibrations at a high RPM.

A particularly simple and reliable design of the adjusting device can be achieved by resiliently stressing those component parts which are movable relative to the housing and are provided with sloping ramps and/or opposing ramps. If the friction clutch comprises only one component which is movable relative to the housing and is provided with the corresponding ramps or surfaces, the spring bias is applied to such one component. It can be of particular advantage if the spring bias generates a force acting in the circumferential direction.

It can be of additional advantage, as concerns the construction and operation of the friction clutch, if the sensor spring—which can constitute a dished spring, such as a diaphragm spring—includes a radially inner portion which reacts against an axially fixed component, such as the housing, and radially inner portions acting upon the seat which faces away from the cover. Such seat can be of one piece with the sensor spring so that the sensor spring also constitutes the seat. In order to hold the sensor spring in stressed condition, the housing can be provided with abutments or stops. Such abutments can include discrete supporting elements which are provided on the housing. However, it can be of advantage if the abutments are of one piece with the housing, e.g., the housing can be provided with stampings or cutouts or deformed portions which axially abut and thus support the sensor spring.

It can be of particular advantage for the operation of the friction clutch, especially to minimize the progress of the disengaging force or the maximum required disengaging force, if the clutch disc which can be clamped between the pressure plate and the counterpressure plate comprises friction linings and so-called friction lining springs between the friction linings. Such springs are disclosed, for example, in the published German patent application No. 36 31 863. If utilized, such friction lining springs can assist in actuation of the friction clutch, especially the disengaging operation. The reason is that, in the engaged condition of the friction clutch, the stressed friction lining springs exert upon the pressure plate a reaction force which opposes the bias of the biasing diaphragm spring and the actuating diaphragm spring upon such pressure plate. During disengagement of the friction clutch, i.e., while the pressure plate moves axially, the pressure plate is initially pushed back by the resiliently stressed friction lining springs simultaneously with a reduction of the bias of the biasing diaphragm spring upon the pressure plate due to the relatively steep downward slope of the characteristic curve of the biasing diaphragm spring during the initial stage of disengagement of the clutch. A reduction of the force which the biasing diaphragm spring applies to the pressure plate entails a reduction of the force which the friction lining springs exert upon the pressure plate. The actual force which is required to disengage the friction clutch equals the difference between the restoring force of the friction lining springs and the biasing force of the biasing diaphragm spring.

When the dissipation of energy by the friction lining springs is completed, namely when the pressure plate is disengaged from the friction linings, i.e., when the pressure plate releases the clutch disc, the required disengaging force is determined primarily by the biasing diaphragm spring. In accordance with a highly advantageous feature, the force-distance characteristic of the friction lining springs and the force-distance characteristic of the biasing diaphragm spring can be related to each other in such a way that, when the pressure plate releases the clutch disc, the force which is required to actuate the biasing diaphragm spring is small. Thus, by properly relating or even equalizing the characteristics of the friction lining springs and of the biasing diaphragm spring until the pressure plate actually releases the clutch disc, only a very small actuating force or, in extreme cases, no actuating force at all is required to act upon the biasing diaphragm spring in order to overcome the remaining power take-off. Furthermore, the characteristics of the biasing diaphragm spring can be selected in such a way that, when the clutch disc is released, the force with which the biasing diaphragm spring thereafter opposes the tilting movement or the force which is required to tilt the diaphragm spring is very small if compared with the biasing force which the biasing diaphragm spring applies in the engaged condition of the friction clutch. It is also possible to select the characteristics in such a way that, when the pressure plate releases the clutch disc, only a very small force, or practically no force at all, is required to actuate the biasing diaphragm spring in order to disengage the friction clutch. Such friction clutches can be designed in such a way that the actuating forces are in the range of between 0 N and 200 N.

In accordance with a further inventive proposal, the friction clutch can be designed in such a way that the axial force which is applied by the biasing diaphragm spring is in the zero range at least substantially simultaneously with the timing of release of the clutch disc by the pressure plate. As the disengaging operation continues, the force which is then applied by the biasing diaphragm spring can become a negative force, i.e., there takes place a reversal of the direction of application of force by the biasing diaphragm spring. This means that, when the friction clutch is fully disengaged, the clutch automatically remains in the disengaged condition and the engaging operation can be initiated only in response to the application of an external force.

The invention further relates to a friction clutch, especially for motor vehicles, with a pressure plate which is non-rotatably connected with a housing for limited axial movement, at least one biasing spring being installed and being adapted to be stressed between the housing and the pressure plate to bias the pressure plate in a direction to clamp a clutch disc between the pressure plate and a counterpressure plate, such as a flywheel.

Such clutches are disclosed, for example, in the published German patent applications Nos. 24 60 963 (corresponding to UK patent No. 1,519,039 published Jul. 26, 1978) and 24 41 141, in German patent No. 898 531, and in German Auslegeschrift No. 1 267 916 (corresponding to U.S. Pat. No. 3,061,062 granted Oct. 30, 1962 to Smirl).

An additional object of the present invention is to improve the operation and to prolong the useful life of such friction clutches. A more specific object of the invention is to reduce the magnitude of forces which are required to operate such friction clutches and to ensure that the progress of disengaging forces remains at least substantially unchanged during the entire useful life of the friction clutches. Furthermore, the novel friction clutches should be designed to ensure that they can be produced in a particularly simple and economical manner.

In accordance with the invention, this is accomplished by the provision of an adjusting device which automatically compensates for wear upon the friction linings of the clutch disc and which ensures that the biasing spring exerts upon the pressure plate a practically unchanged force. The friction clutch comprises actuating means for engaging and disengaging the clutch as well as a device which effects a gradual reduction of torque which can be transmitted by the friction clutch or by the clutch disc during disengagement of the friction clutch, at least during a portion of actuating movement of the actuating means and/or of the distance covered by the pressure plate during disengagement of the clutch. Such a design can further ensure a gradual or progressive increase of torque which the friction clutch can transmit during engagement of the friction clutch and during the initial stage of clamping of the friction linings between the pressure plate and the counterpressure plate.

The novel design of the friction clutch ensures that the stressing of the biasing diaphragm spring when the friction clutch is engaged remains practically unchanged during the useful life of the clutch and this, in turn, ensures that the application of force to the pressure plate remains practically unchanged. Furthermore, the additional undertaking which effects a gradual reduction of torque being transmitted by the friction clutch in the course of disengagement ensures that one can achieve a reduction or minimizing of the progress of disengaging force or of the required maximum disengaging force. This is attributed to the fact that the undertaking assists the actuation, especially the disengagement, of the friction clutch. To this end, the undertaking can comprise axially yieldable resilient means which apply a reaction force to the actuating means and/or to the biasing spring and/or to the pressure plate and/or to the counterpressure plate. The reaction force opposes the force which the biasing spring applies to the pressure plate and is in series therewith.

It can be of particular advantage if the novel torque reducing device of the friction clutch is installed in such a way that it effects a gradual reduction of torque which can be transmitted by the friction clutch or by the clutch disc during a portion of displacement of those parts of the pressure plate which are being acted upon by the biasing spring during disengagement of the friction clutch.

For many applications, the torque reducing device can be installed in the power flow between the tilting bearing for the actuating means or between the biasing spring and the fastening elements, such as threaded fasteners, which secure the housing to the counterpressure plate.

However, it may be desirable if the torque reducing device is installed in the power flow between the means for pivotably mounting the actuating means or between the biasing spring and the friction surface of the pressure plate. Such an arrangement is proposed, for example, in the published German patent applications Nos. 37 42 354 (corresponding to U.S. Pat. No. 4,828,083 granted May 9,1989 to Naudin) and 1 450 201 (corresponding to U.S. Pat. No. 3,323,624 granted Jun. 6, 1967 to Maurice).

For additional applications, it may be particularly advantageous to install the device axially between the friction linings which are disposed back-to-back and form part of the clutch disc, namely to employ a device which constitutes the so-called "friction lining springs", e.g., which constitutes friction lining spring segments. Such devices are known, for example, from the aforementioned published German patent application No. 36 31 863.

An additional possibility to achieve a progressive increase or reduction of torque is proposed in the German patent No. 21 64 297. The flywheel which is disclosed in this patent comprises two parts and the member which constitutes the counterpressure plate is axially movably supported relative to the member which is connected with the output shaft of the combustion engine.

It can be of particular advantage for the operation and construction of the novel friction clutch if the torque reducing device facilitates a resilient axial yieldability between the parts of the clutch, the device being installed and designed in such a way that, when the clutch is disengaged, the magnitude of the force acting upon the device is reduced to a minimum and the force acting upon the device gradually rises to a maximum value during closing of the clutch, i.e., during engagement of the clutch, such rise of the force preferably taking place only during a portion of the engaging or closing movement of actuating means or the pressure plate. It can be of particular advantage if the device is designed in such a way that the gradual reduction or the gradual increase of torque which can be transmitted by the friction clutch takes place while the actuating means completes its movement along between about 40% and 70% of its actuating path and/or during between 40% and 70% of maximum axial displacement of the pressure plate. The remaining portion of the corresponding path is necessary to ensure proper interruption of the power flow and to compensate for possibly existing deformations of parts of the clutch, such as particularly the clutch disc, the pressure plate and the counterpressure plate.

In order to minimize the forces which are necessary to actuate the novel friction clutch, it can be of particular advantage if the biasing spring exhibits a degressive force-distance progress, i.e., that the biasing spring exhibits a decreasing progress of force at least within a portion of its compression- or deformation path. In this manner, one can achieve that the spring force of the device opposes the force of the biasing spring during disengagement of the friction clutch so that the stressing or deformation of the biasing spring is assisted by the spring bias of the device along a portion of disengagement path and, at the same time, the magnitude of the force which is being applied by the biasing spring to the pressure plate or to the friction linings decreases due to the degressive or downwardly sloping force-distance progress of the characteristic curve of the biasing spring. The actual progress of the force which is required to disengage the friction clutch is the difference between the progress of force which is furnished by the device and the progress of the force which is furnished by the biasing spring, it being assumed that no additional superimposed spring actions are present. During disengagement of the pressure plate from the friction linings, i.e., during release of the clutch disc, the necessary remaining progress of disengaging force, i.e., the required disengaging force, is established primarily by the biasing spring. The force-distance characteristic of the device and the force-distance characteristic of the biasing spring can be related to each other in such a way that the force which is required to actuate the biasing spring after the pressure plate releases the clutch disc is at a relatively low level. Thus, by selecting the spring characteristic or the force characteristic of the device in such a way that it approximates or actually matches the characteristic of the biasing spring, it is possible to ensure that a very small force or, in extreme cases, no force at all is necessary to actuate the biasing spring until the pressure plate releases the clutch disc.

A particularly suitable biasing spring is a diaphragm spring which, on the one hand, can be tilted in a tilting seat assembly carried by the housing and, on the other hand, bears upon the pressure plate. The diaphragm spring can comprise a ring-shaped body and prongs extending radially inwardly from the ring-shaped body and constituting the actuating means. However, it is also possible to employ actuating means constituted by levers, for example, levers which are pivotably mounted on the housing. Furthermore, it is also possible to apply the spring bias to the pressure plate by resorting to other types of springs, for example coil springs, which are mounted in the friction clutch in such a way that the axial force which such springs apply to the pressure plate in the engaged condition of the friction clutch assumes a maximum value and that the magnitude of such force decreases in the course of the disengaging operation. This can be achieved, for example, by mounting coil springs at an angle relative to the rotational axis of the friction clutch.

It can be of particular advantage if the diaphragm spring is tiltably mounted on the housing between two seats to form part of a so-called push-type clutch. In such clutches, the actuating means which disengage the friction clutch are normally acted upon in a direction toward the pressure plate. However, the invention is not limited to push-type clutches but also embraces pull-type clutches wherein the actuating means for disengaging the friction clutch is normally acted upon in a direction away from the pressure plate.

In a particularly advantageous manner, the novel friction clutch can comprise a diaphragm spring which is designed in such a way that it exhibits a sinusoidal force-distance progress and is installed in such a way that, when the friction clutch is engaged, its operating point is disposed in the degressive range of the characteristic curve which follows the first force maximum. It can be of additional considerable advantage if the diaphragm spring exhibits a force ratio of between 1:0.4 to 1:2.7 between the first force maximum and the following minimum.

Furthermore, it can be especially advantageous if the friction clutch is actuatable by a disengaging system which acts upon the actuating means, such as for example the tips of prongs of the diaphragm spring, and the disengaging system can comprise a clutch pedal which is constructed in a manner similar to that of making a gas pedal and is installed in the interior of the motor vehicle. Such design of the clutch pedal can be particularly advantageous because, due to the novel design, the magnitude of the required force or the progress of force which is required to disengage the friction clutch can be brought to a very low level so that a clutch pedal resembling a gas pedal renders it possible to more readily meter the magnitude of the actuating force.

Due to the novel design of a friction clutch and the attendant possibility to reduce the maximum forces to be applied by the biasing spring during the useful life of the friction clutch, it is possible to reduce the dimensions of the parts or to reduce the strength of the parts accordingly which results in a considerable reduction of the cost of making. By reducing the magnitude of the disengaging forces, one also achieves a reduction of friction- and elasticity losses in the clutch and in the disengaging system with attendant substantial improvement of the system including the friction clutch and the disengaging system. Thus, it is possible to design the clutch in an optimum manner with attendant substantial increase of the clutch comfort.

The novel design is suitable for use in friction clutches in general, and especially in those which are proposed, for example, in German patents Nos. 29 16 755 and 29 20 932 (corresponding to U.S. Pat. No. 4,228,883 granted Oct. 21, 1980 to Palmer), the aforementioned published German patent application No. 35 18 781, published German patent application No. 40 92 382 (corresponding to U.S. Pat. No. 5,186,298 granted Feb. 16, 1993 to Takeuchi), published French patent applications Nos. 2 605 692, 2,606 477, 2 599 444 and 2 599 446, British patent No. 1 567 019 (corresponding to U.S. Pat. No. 4,099,604 granted Jul. 11, 1978 to Higgerson), U.S. Pat. Nos. 4,924,991, 4,191,285 and 4,057,1317 in Japanese Utility Models Nos. 3-25026 (corresponding to U.S. Pat. No. 5,069,322 granted Dec. 3, 1991 to Mizukami et al.), 3-123, 2-124326, 1-163218, 3-19131 and 3-53628, and in Japanese patent No. 51-126452 granted Apr. 11, 1976.

The utilization of a friction clutch with automatic or self-acting compensation at least for the wear upon the friction linings—which ensures an at least substantially constant clamping force during the useful life of the friction clutch—is of particular advantage in connection with clutch assemblies wherein the friction clutch, the clutch disc and the counterpressure plate, such as for example a flywheel, constitute an assembly unit or module. In order to reduce the cost, it is of advantage in connection with such an assembly unit if the clutch housing is attached to the counterpressure plate by way of a non-releasable connection, for example, by a welded joint or by a form-locking connection such as can be achieved, for example, as a result of plastic deformation. Owing to the provision of such connection, it is possible to dispense with the customarily employed connecting means, such as screws. In such assembly units, it is practically impossible to exchange the clutch disc or the friction lining due to excessive wear without destruction of component parts, such as for example the clutch housing. By employing a clutch which is automatically adjusted to compensate for wear, the assembly unit can be designed in such a way that it ensures proper operation during the entire useful life of the vehicle. Thus, it is now possible, due to the novel design, to dimension and design that portion of the clutch disc which is to wear away and that portion of the friction clutch or clutch assembly which is needed for satisfactory adjustment in such a way that the useful life of the clutch, and hence also the useful life of the mounting assembly, invariably at least matches the useful life of the vehicle.

In accordance with a further development of the invention, it can be of particular advantage if a friction clutch which is provided with a wear compensating unit is combined with a so-called twin-mass flywheel. The friction clutch can be mounted, with the interposition of a clutch disc, on that one of the flywheel masses which is to be connected with a transmission, and the other flywheel mass is connectable with the output shaft of a combustion engine. Twin-mass flywheels which can be employed in combination with the novel friction clutch are disclosed, for example, in published German patent applications Nos. 37 21 712, 37 21 711, 41 17 571 (corresponding to U.S. Pat. No. 5,301,780 granted Apr. 12, 1994 to Jäckel), 41 17 582 (corresponding to U.S. Pat. No. 5,261,516 granted Nov. 16, 1993 to Friedmann) and 41 17 579. The features which are disclosed in the just enumerated published German patent applications can be combined, in any desired manner, with the features which are disclosed in the present application. It is particularly advantageous if the clutch housing or clutch cover is connected with the corresponding flywheel in a manner such that the connection cannot be terminated without destruction of the connected parts. Several embodiments of such connections are disclosed in the aforementioned published German patent application No. 41 17 579.

By utilizing a friction clutch having a unit which compensates at least for wear upon the friction linings, it is further possible to optimize the design of the friction clutch, especially of the energy storing element which furnishes the clamping force for the clutch disc. Thus, this energy storing element can be designed in such a way that, for all practical purposes, it merely supplies that clamping force for the clutch disc which is necessary for the transmission of a desired torque. The energy storing element can be constituted by at least one diaphragm spring or by a plurality of coil springs. Furthermore, the utilization of a self-adjusting friction clutch is of advantage in combination with twin-mass flywheels wherein the torsionally elastic damper which is disposed between the two flywheel masses is installed radially outwardly of the clutch disc or radially outwardly of the maximum diameter of the friction surface on the flywheel mass which is connectable to the transmission. In such twin-mass flywheels, the friction diameter of the clutch disc must be smaller than in conventional clutches so that the biasing force must be increased in accordance with the ratio of the median friction radii in order to be capable of transmitting a predetermined torque from the engine. If one were to utilize a conventional clutch, this would necessitate the application of a greater disengaging force. By utilizing a clutch embodying the wear compensating feature with a progressive reduction of the torque which can be transmitted by the clutch disc during disengagement of the clutch, it is now possible to achieve a reduction of the disengaging force to thus avoid an increase of the disengaging force or, by properly designing the friction clutch, to even achieve a reduction of the disengaging force as compared with a conventional clutch.

Thus, the novel design of the friction clutch can ensure that, in spite of a reduction of the diameters of the friction linings and in spite of the thus required larger biasing force, the disengaging force can remain small. Due to the small disengaging force, the roller bearing which permits the two flywheel masses to rotate relative to each other is subjected to less pronounced wear. Furthermore, compensation for wear renders it possible to prolong the useful life of the clutch so that it is no longer necessary to replace parts, particularly the clutch disc, during the useful life of the motor vehicle. Thus, the clutch cover can be fixedly connected to that flywheel mass which is to be connected with the transmission, for example, by riveting or welding. This is of particular advantage when only a limited space, or a limited outline of the clutch bell, is available so that it is not possible to connect the clutch cover with the flywheel at the side of the transmission in a conventional manner by resorting to screws.

If a clutch assembly consisting of a flywheel and a friction clutch with integrated adjusting means for the wear upon the friction linings is affixed to the output shaft of a combustion engine in a conventional manner, the output element of the combustion engine—particularly a crankshaft—transmits to the clutch assembly axial, rotational and wobbling vibrations. In order to ensure that the operation of the clutch unit or of the adjusting means is not adversely affected by such vibrations, and especially to ensure that such vibrations do not initiate an undesirable adjustment to compensate for wear, it is necessary to design the adjusting means by considering inertia forces of all parts which influence the adjusting means. In order to prevent such undesirable side effects which are caused primarily by the axial and wobbling vibrations, and to avoid a higher cost for the design of the adjusting means for compensation of the wear upon the friction linings in order to take into consideration such side effects, it is further proposed in accordance with an additional feature of the invention to practically separate or isolate the clutch unit and its adjusting means from the axial and flexing vibrations which are initiated by the output shaft of the combustion engine. This can be accomplished in that the clutch unit is connectable with the output shaft of the combustion engine by an axially elastic or resiliently yieldable member. The rigidity of this member is selected in such a way that the member reliably suppresses or damps axial and wobbling or flexing vibrations which the output shaft of the combustion engine transmits to the clutch unit at least to such an extent that one ensures a satisfactory operation of the friction clutch and particularly of its adjusting means. Such elastic members are disclosed, for example, in the published German patent application No. 0 385 752 and in the SAE Technical Paper 9 003 91. By utilizing an elastic member, it is possible to prevent an undesired compensation for wear which is caused by axial vibrations of the pressure plate relative to the clutch cover—especially when the friction clutch is disengaged—induced by vibrations of the flywheel and/or by vibrations of the diaphragm spring. In the absence of an undertaking to at least substantially suppress the aforediscussed vibrations, especially an axially yieldable disc, such vibrations if applied to a clutch assembly or clutch unit could cause a change of adjustment independently of the extent of wear upon the clutch disc so that the biasing force of the diaphragm spring would be adjusted toward the minimum force which, in turn, would prevent the clutch from continuing to transmit a desired torque.

In accordance with a further inventive concept, a friction clutch which is equipped with a self-acting or automatic compensation and especially wherein the automatic compensation is effected in accordance with the present invention can be utilized with particular advantage in a driving unit, especially for motor vehicles, which driving unit consists of an automatic or semiautomatic transmission and a friction clutch which is installed between the prime mover, such as a combustion engine, and the transmission and is actuatable in a controlled or regulated manner at least in dependency upon the actuation of the transmission. An automated or fully automatic actuation of a friction clutch was proposed, for example, in the published German patent application No. 40 11 850.9 (corresponding to U.S. Pat. No. 5,176,234 granted Jan. 5, 1993 to Reik et al.) to which reference may be had regarding the mode of operation and the necessary constituents.

The heretofore known driving units with automatic or semiautomatic transmissions and conventional friction clutches presented serious problems concerning the actuation of the clutch and the design of the actuators which are necessary for such actuation, such as for example cylinder-piston units and/or electric motors. Very strong or large actuators were necessary due to the relatively large disengaging forces which are required for the actuation of conventional clutches. This involves large space requirements, considerable weight and high cost. Moreover, the reaction time of such large actuators is relatively long due to their high mass inertia. Furthermore, if one employs adjusting cylinders, it is necessary to utilize a large volumetric flow of pressurized fluid which, in turn, renders it necessary to employ a relatively large fluid supplying pump in order to ensure the required actuation times for the corresponding friction clutch. In an effort to partially overcome the aforementioned drawbacks, it was proposed for example in the published German patent application No. 33 09 427 (corresponding to U.S. Pat. No. 4,878,396 granted Nov. 7, 1989 to Grunberg) to reduce the actuating force for disengagement of the clutch by appropriate compensating springs which are intended to facilitate the utilization of smaller actuators. However, since the disengaging force for conventional clutches fluctuates within a wide range during the useful life of such clutches, namely the disengaging force is relatively small when the conventional clutch is new but increases during the life of the clutch in response to increasing wear upon the friction linings, a compensating spring can effect only a small reduction of the normally required disengaging force. If one takes into consideration all of the tolerances, it is still necessary to select actuators whose output exceeds that needed for a new conventional clutch in spite of the utilization of compensating springs. By utilizing the novel friction clutch having means for compensating for wear upon the friction linings in combination with a driving unit consisting of an engine and an automatic or semiautomatic transmission, it is possible to greatly reduce the disengaging force in comparison with that which is required for disengagement of conventional clutches, and such reduction can be effected directly in the clutch, so that the magnitude of such reduced disengaging force or the progress of the disengaging force remains practically unchanged during the entire useful life of the novel clutch. This brings about important advantages as concerns the design of the actuators because their actuating output can be correspondingly low with attendant corresponding reduction of the forces and/or pressures which are necessary in the entire disengaging system. Consequently, losses developing in the disengaging system as a result of friction or elasticity of the component parts are either eliminated or reduced to a minimum.

BRIEF DESCRIPTION OF THE DRAWINGS

The invention will be explained in greater detail with reference to the accompanying drawings.

There are shown in.

DESCRIPTION OF PREFERRED EMBODIMENTS

Figure 1:
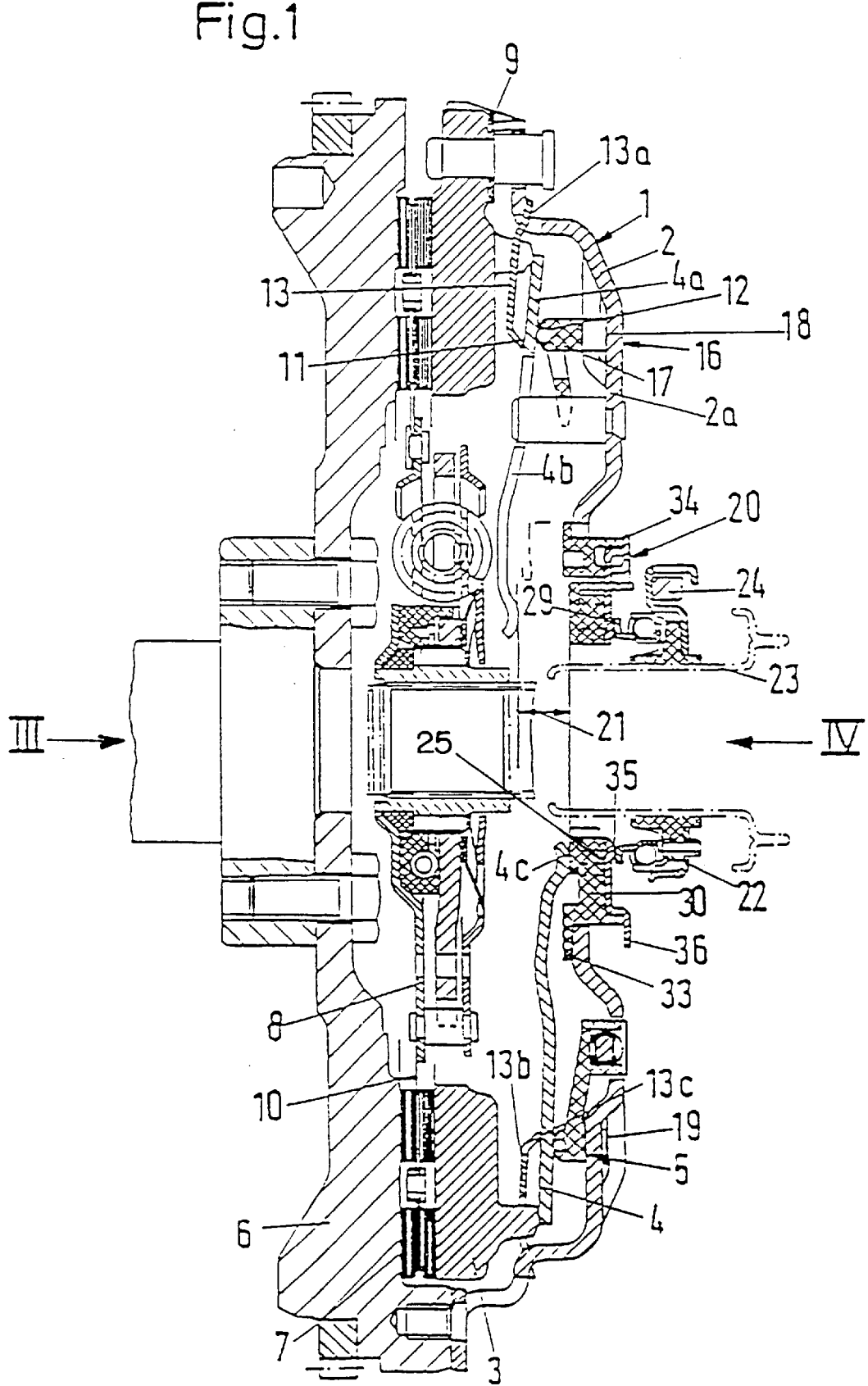
FIG. 1 a sectional view of a clutch assembly which is constructed in accordance with the invention, FIG. 2 the compensating device in section and drawn to a larger scale, FIG. 3 a view as seen in the direction of arrow III in FIG. 1 or 2, FIG. 4 a view of the adjusting ring which engages the disengaging means of the friction clutch as seen in the direction of arrow IV in FIG. 1 or 2, FIG. 5 a sectional view taken along the line V—V in FIG. 4, FIG. 6 the opposing adjusting ring which is utilized in the clutch assembly of FIG. 1 as seen in the direction of arrow III in FIG. 2, FIG. 7 a sectional view as seen from the line VII—VII in FIG. 6, FIG. 8 a detail of a modification of the compensating device which is shown in FIG. 2, FIG. 9 a sectional view of a further detail of a novel clutch assembly, FIGS. 10 and 11 wear compensating rings which can be utilized in the novel clutch assemblies, e.g., in that which is shown in FIG. 9, FIG. 12 a sectional view of a novel clutch assembly, FIG. 12a an arcuate section of the sensor spring which is utilized in FIG. 12, FIG. 13 a partial view as seen in the direction of arrow XIII in FIG. 12, FIG. 14 a further possibility of constructing a novel friction clutch, FIG. 15 a schematically illustrated disengagement system for a clutch assembly according to the invention, FIG. 16 a further novel design of a friction clutch which comprises a brake for the adjusting ring, FIG. 17 an elevational view of a novel friction clutch, FIG. 18 a section along the line XVIII—XVIII in FIG. 17, FIG. 19 an adjusting ring which is utilized in the friction clutch of FIGS. 17 and 18, FIG. 20 a section along the line XX—XX in FIG. 19, FIG. 21 a supporting ring which is utilized in the friction clutch of FIGS. 17 and 18, FIG. 22 a section along the line XXII—XXII in FIG. 21, FIGS. 23 and 23a a spring which applies a turning force to the adjusting ring, FIGS. 24 to 27 diagrams with various characteristic curves showing the mode of cooperation between discrete resilient and adjusting elements of the novel friction clutch, FIGS. 28 and 29 a further possibility of designing a novel friction clutch, FIG. 29 being a sectional view taken along the line XXIX—XXIX in FIG. 28, FIG. 30 an elevational view of an adjusting ring which is utilized in the friction clutch of FIGS. 28 and 29, FIGS. 31 to 33 the details of a further friction clutch with a compensating device, FIG. 33 being a sectional view as seen in the direction of arrows from the line XXXIII—XXXIII in FIG. 32, FIGS. 34 and 35 diagrams with various characteristic curves which indicate the mode of cooperation between the biasing diaphragm spring and the friction lining springs as well as the resulting effect upon the progress of the disengaging force in the friction clutch, FIG. 36 a partial view of a further friction clutch which embodies the invention, FIG. 36a a view of a detail as seen in the direction of arrow XXXVIa in FIG. 36, FIG. 37 a sectional view taken along the line XXXVII—XXXVII in FIG. 36, FIG. 38 a fragmentary elevational view of an adjusting ring which can be utilized in the friction clutch of FIGS. 36 and 37, FIGS. 39 and 40 further modifications of the novel friction clutches, FIG. 41 an elevational view of an adjusting ring which can be installed in a friction clutch according to FIGS. 28 and 29 or 36 and 37, FIGS. 42 to 45 additional modifications of friction clutches, FIGS. 46 to 48 the details of another possibility of constructing a friction clutch, FIG. 47 being a fragmentary elevational view as seen in the direction of arrow XXXXVII in FIG. 46 and FIG. 48 being a sectional view as seen in the direction of arrows from the line XXXXVIII—XXXXVIII in FIG. 47.

The clutch assembly which is shown in FIG. 1 comprises a friction clutch 1 with a housing 2 and a pressure plate 3 which is non-rotatably connected to but is movable axially within limits relative to the housing. A biasing diaphragm spring 4 is stressed between the pressure plate 3 and the cover 2 and is tiltable relative to a ring-shaped seat assembly 5 which is carried by the housing. The spring 4 acts upon the pressure plate 3 to urge the latter toward a counterpressure plate 6, for example a flywheel, whereby the friction linings 7 of the clutch disc 8 are clamped between the friction surfaces of the pressure plate 3 and the counterpressure plate 6.

The pressure plate 3 is non-rotatably connected with the housing 2 by circumferentially or tangentially oriented leaf springs 9. In the illustrated example, the clutch disc 8 comprises so-called springy friction lining segments 10 which ensure a progressive buildup of torque during engagement of the friction clutch 1 by permitting a limited axial shifting of the two friction linings 7 in a direction toward each other to thus effect a gradual increase of axial forces acting upon the friction linings 7. However, one could also utilize a clutch disc wherein the friction linings 7 are substantially rigidly attached to a disc-shaped carrier.

In the illustrated embodiment, the diaphragm spring 4 comprises a ring-shaped main portion 4a which applies the biasing force and actuating prongs 4b which extend radially inwardly from the main portion. The diaphragm spring 4 is installed in such a way that its radially outer zones act upon the pressure plate 3 and its radially inner portions are tiltable relative to the seat assembly 5.

The seat assembly 5 comprises two tilting seats 11, 12 and the diaphragm spring 4 is held or clamped between the two seats. The seat 11 which is provided at that side of the diaphragm spring which faces the pressure plate 3 is biased axially in a direction toward the housing 2. To this end, the seat 11 forms part of a diaphragm spring 13 or a member which resembles a diaphragm spring and the radially outer marginal portion 13a of this spring resiliently bears against the housing 2 to thus urge the radially inwardly disposed seat 11 axially against the actuating diaphragm spring 4 and hence also toward the housing 2. The diaphragm spring 13, which is installed axially between the pressure plate 3 and the actuating diaphragm spring 4, comprises a ring-shaped portion 13b and tongues 13c which extend radially inwardly from the portion 13b and constitute the seat 11.

In the embodiment of FIG. 1, the means for supporting the diaphragm spring-shaped member 13 comprises a bayonet mount-like connection or lock which is installed between the housing 2 and the tongue-like arms of the ring-shaped portion 13a of the diaphragm spring-shaped member 13.

The diaphragm spring-shaped member or diaphragm spring 13 constitutes a sensor spring which generates an at least approximately constant force while it covers a predetermined working distance. The sensor spring 13 takes up at least the major part of the clutch disengaging force which is being applied to the tips of its tongues 13c so as to thereby ensure the development of an at least substantial equilibrium between the force which develops as a result of the application of disengaging force upon the tilting seat 11 and the opposing force which the sensor spring 13 applies to the seat 11.

The tilting seat 12 which faces the housing 2 is propped relative to the housing by an adjusting device 16. This adjusting device 16 ensures that no undesirable play can develop between the tilting seat 12 and the housing 2 or between the tilting seat 12 and the diaphragm spring 4 in response to axial displacement of the tilting seats 11 and 12 in a direction toward the pressure plate 3 and hence in a direction toward the counterpressure plate 6. This prevents the development of lost motion or dead travel during actuation of the friction clutch 1 to thus ensure optimum efficiency and satisfactory operation of the friction clutch 1. Axial shifting of the tilting seats 11 and 12 takes place in response to axial wear upon the friction surfaces of the pressure plate 3 and counterpressure plate 6 as well as upon the friction linings 7.

The adjusting device 16 comprises a spring-biased adjusting element in the form of a ring-shaped member 17 which is provided with circumferentially extending and axially rising sloping ramps 18 distributed along the periphery of the member or element 17. The adjusting element 17 is installed in the clutch 1 in such a way that the sloping ramps 18 face the bottom wall 2a of the housing.

The adjusting element 17 is spring biased in the circumferential direction to turn in the adjusting direction, i.e., in a direction which brings about axial displacement of the adjusting element 17 in a direction toward the pressure plate 3, namely in the axial direction away from the housing section or bottom wall 2a. Such direction of axial movement is achieved as a result of movement of the sloping ramps 18 relative to opposing ramps 19 which are formed in the bottom wall 2a of the cover.

The mode of automatically adjusting the seat assembly 5 or the adjusting device 16 as well as further possible modifications of the adjusting device 16 will be explained in greater detail with reference to FIGS. 17 to 48.

The clutch 1 comprises a compensating device 20 which ensures that the disengaging means of the friction clutch 1 which are constituted by the diaphragm spring prongs 4b can be actuated without play in the axial direction and can cover an unchanging distance 21. The compensating device 20 is disposed between a disengaging member 22, which comprises a disengaging bearing, and the tips 4c of the prongs. The disengaging member 22 is movable axially along a schematically illustrated tubular guide 23 in order to actuate the friction clutch 1. The tubular guide 23 is carried by a transmission case, not specifically shown, and surrounds the input shaft of the transmission. The clutch disc 8 is non-rotatably mounted on the input shaft of the transmission. The force which is required to axially displace the disengaging member 22 is furnished by actuating means 24 which, in the illustrated embodiment, is constituted by a schematically illustrated disengaging fork. Such fork can also be mounted on the transmission. However, it is also possible to employ disengaging members which can be actuated hydraulically or pneumatically, namely disengaging members comprising a cylinder-piston unit which operates with a pressurized fluid medium.

Figure 2:
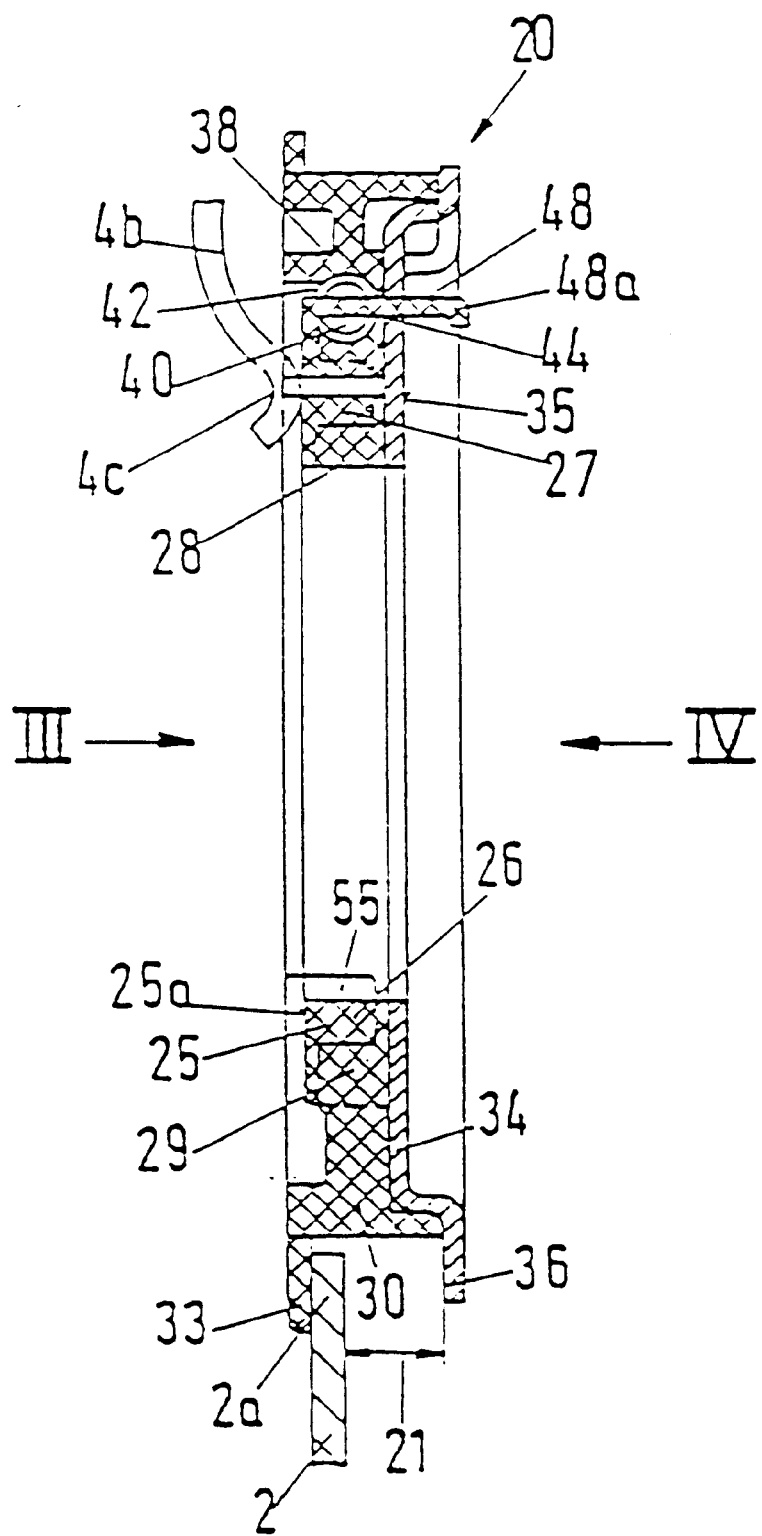
Figure 3:
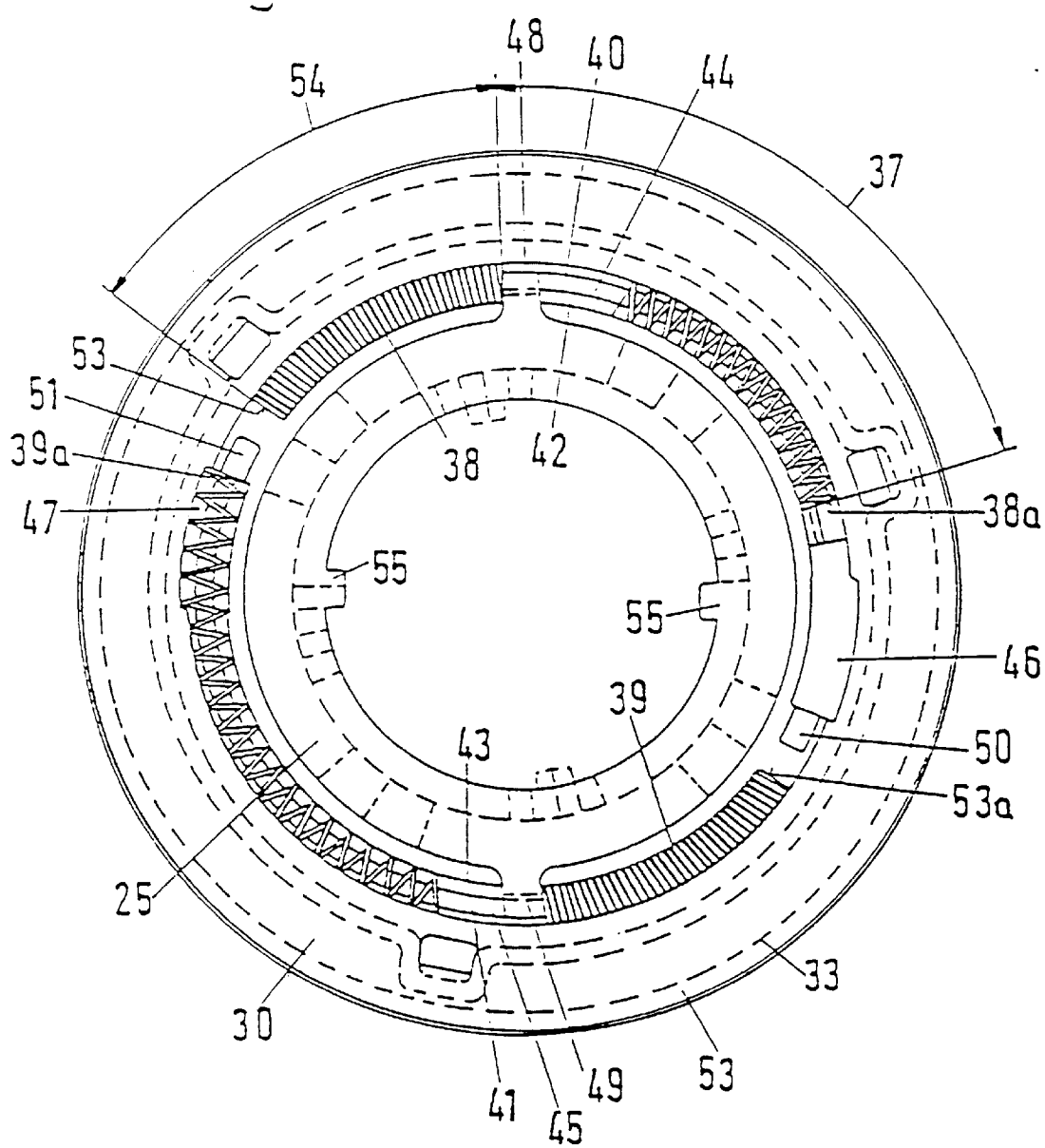
Figure 5:
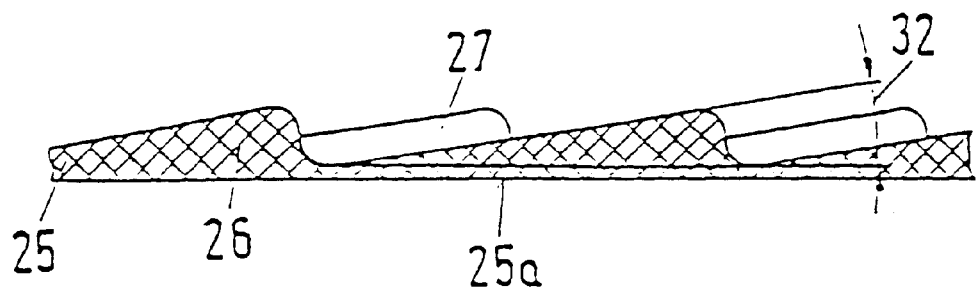
Figure 4:
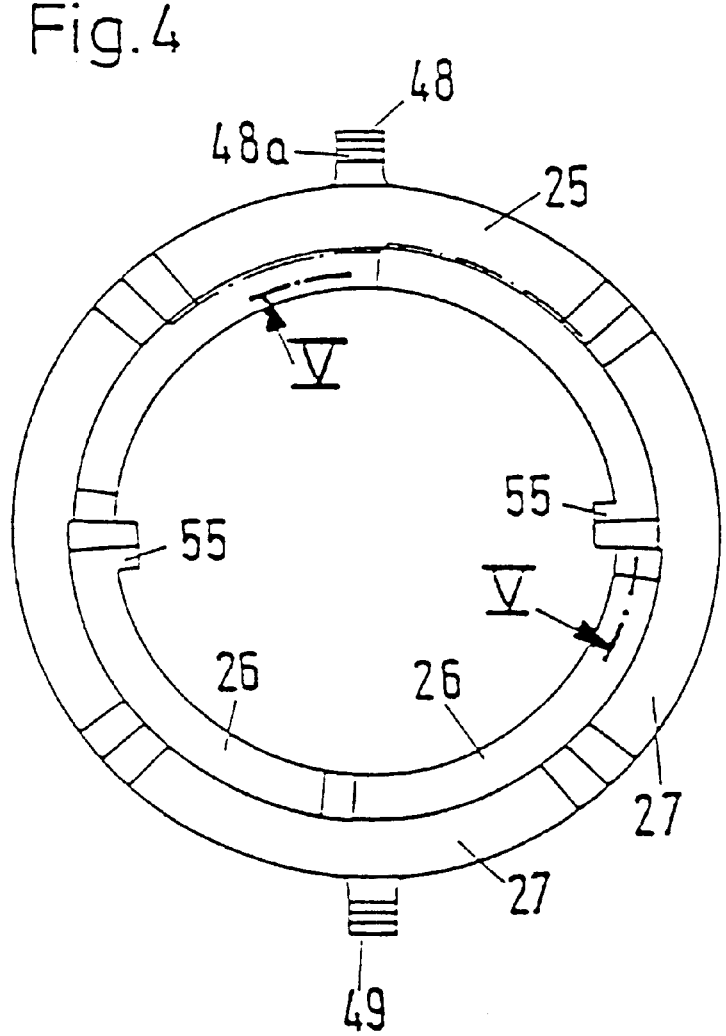

The compensating device 20 is shown drawn to a larger scale in FIGS. 2 and 3. This device comprises an adjusting element in the form of a ring-shaped member 25 which is illustrated in FIGS. 4 and 5. In the illustrated embodiment, the adjusting element 25 comprises two sets of axially rising sloping ramps 26, 27 which are offset relative to each other in the radial direction and extend in the circumferential direction. The ramps of each of the two sets are distributed along the periphery of the member 25. As can be readily seen in FIG. 5, the radially inner sloping ramps 26 are offset in the circumferential direction with respect to the radially outwardly disposed sloping ramps 27, namely by approximately one-half the length of a sloping ramp or the pitch of the ramps. As can be seen in FIGS. 1 and 2, the adjusting element 25 has a front surface 25a which directly abuts the tips 4c of the prongs 4b. The sloping ramps 26, 27 face axially and away from the prongs 4b. The adjusting element 25 is spring biased in the circumferential direction, namely in the direction of adjustment. This is the direction in which the movement of the ramps 26, 27 along the opposing ramps 28, 29 of a supporting ring 30 of the compensating device 20—shown in detail in FIGS. 6 and 7—must take place in order to effect an axial displacement of the adjusting element 25 in a direction toward the pressure plate 3, namely in the axial direction and away from the disengaging member 22.

Figure 7:
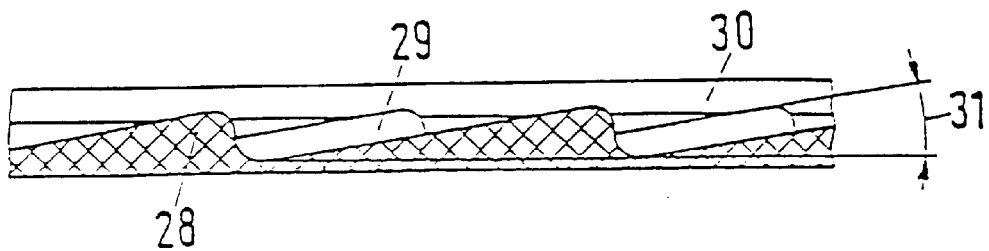
Figure 6:
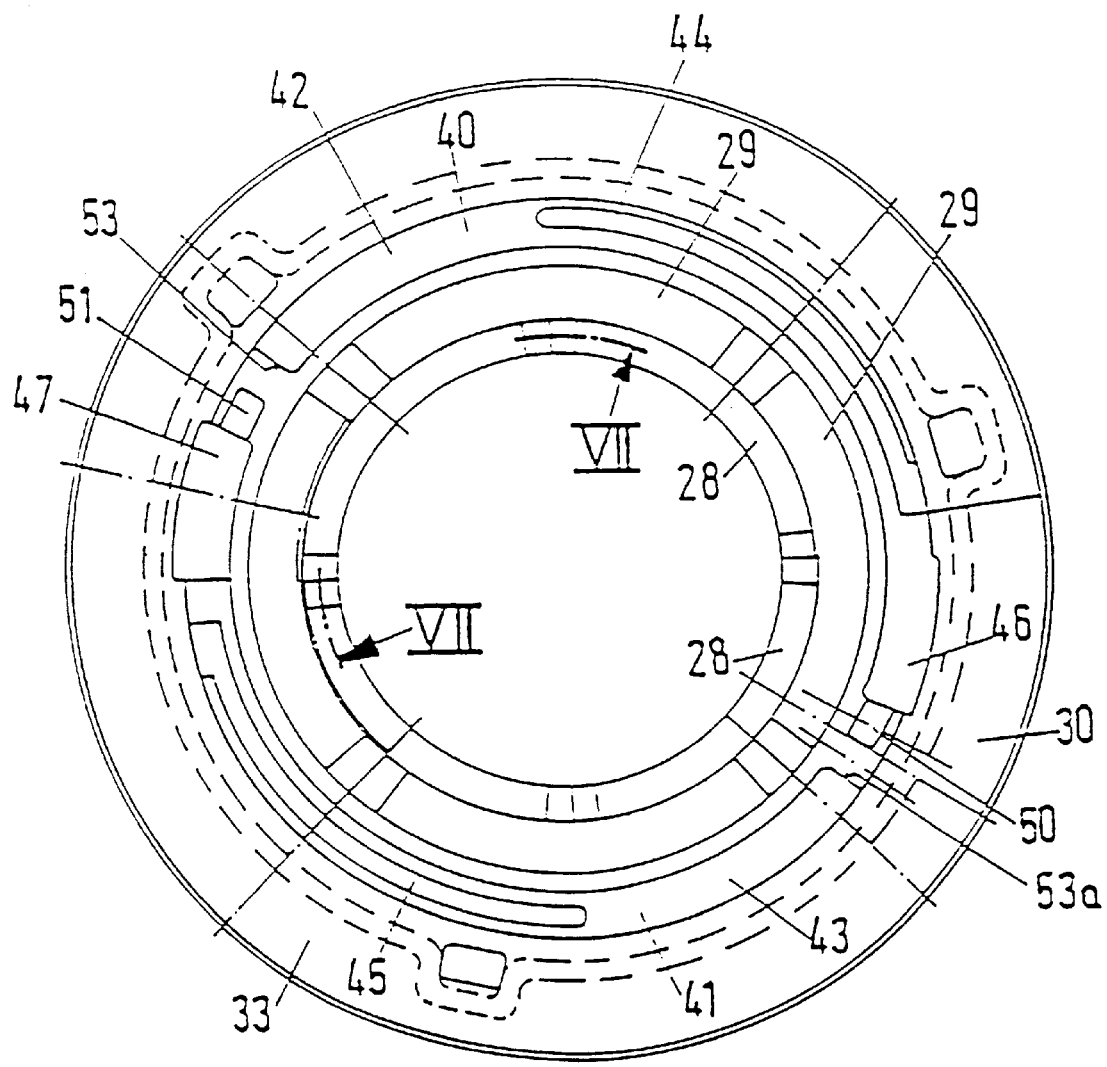

As can be seen in FIGS. 6 and 7, the opposing sloping ramps 28, 29 also form two sets of sloping ramps which are offset relative to each other in the radial direction as well as in the circumferential direction. The ramps 26, 27 of the adjusting element 25 and the ramps 28, 29 of the supporting ring 30 complement each other and are interlaced in the axial direction. The offsetting of ramps in the circumferential direction ensures the establishment of a satisfactorily centered guidance of the adjusting element 25 and the supporting ring 30. As can be seen particularly in FIG. 2, the components 25 and 30 of the compensating device 20 are axially interfitted into each other. The angle 31 of slope (FIG. 7) of the opposing sloping ramps 28, 29 on the supporting ring 30 corresponds to the angle 32 (FIG. 5) of the sloping ramps 26, 27 on the adjusting element 25. The supporting ring 30 can be non-rotatably connected with the housing 2 but can be moved within limits relative to the housing in the axial direction. The extent of axial movement is limited by radial portions 33 of the supporting ring 30 because such portions abut the radially inner portions of the bottom wall 2a of the housing 2 in the engaged condition of the friction clutch 1. Such abutment is effected by the stressed resilient actuating prongs 4b. During disengagement of the friction clutch 1, the extent of movement of the ring 30 relative to the housing 2 is limited by a sheet metal part 34 provided at that side of the supporting ring 30 which faces away from the actuating prongs 4b and can be acted upon by the disengaging member 22 at the region of the diameter 35. This sheet metal part 34 also comprises radial portions 36 which can abut the radially inner portions of the bottom wall 2a of the cover or housing 2 during disengagement of the friction clutch 1.

In the illustrated example, the adjusting ring 25 as well as the supporting ring 30 are made of a heat-resistant synthetic plastic material, such as for example a thermoplastic substance which, in addition, can be reinforced by fibers. In this manner, such parts can be readily produced by injection molding.

As seen in the circumferential direction, the sloping ramps 26, 27 and the oppositely sloping ramps 28, 29 are configurated in such a way that they enable the members 25 and 30 to turn relative to each other through an angle which permits an adjustment for the wear upon the friction surfaces of the pressure plate 3 and counterpressure plate 6 as well as to compensate for wear upon the friction linings 7 during the entire useful life of the friction clutch 1. Depending upon the design of the sloping ramps, the angle of adjustment can be in the range of between 30° and 90°. In the illustrated embodiment, such angle of rotation, denoted in FIG. 3 by the reference character 37, is approximately 75°. The angles of slope 31 and 32 of the ramps and opposing ramps can be within the range of between 6° and 14°, preferably about 8°. The actual slope angles 31 and 32 of the ramps and opposing ramps vary in the radial direction of the respective ramps because the same difference between levels must be achieved for a selected angle of rotation. Thus, this means that the angles 31 and 32 of the ramps decrease with increasing diameter.

The force which is necessary for adjustment of the element 25 and acts in the circumferential direction is applied by energy storing elements which, in the illustrated embodiment, include two arcuate coil springs 38, 39 which are mounted in stressed condition between the supporting ring 30 and the adjusting element 25. These coil springs 38, 39 react against the supporting ring 30 which is held against rotation relative to the cover 2 and they turn the adjusting ring 25 as soon as the actuating prongs 4b of the diaphragm spring move away from the bottom wall 2a of the cover 2 or from the disengaging member 22 as a result of wear upon the friction linings 7. As can be readily seen by referring particularly to FIGS. 3 and 6, the coil springs 38, 39 are received, respectively, in channel-shaped toroidal recesses 40, 41 of the ring 30. As can be seen in FIG. 2, a recess 40 whose cross-sectional outline conforms to the convolutions of the energy storing elements 38, 39 extends along more than one-half of the cross-section of a spring 28 or 29 and, as shown in FIGS. 3 and 6, a slit-shaped opening 42, 43 is provided at that side which faces the actuating prongs 4b and a slit-shaped opening 44, 45 is provided at that side of the supporting ring 30 which faces away from the actuating means 4b. The springs 38, 39 are secured relative to the supporting ring 30 in the axial direction by surfaces which flank the recesses 40, 41. To facilitate the introduction of the coil springs 38, 39, the sector-shaped recesses 40, 41 are provided with threading-in portions 46, 47 each having an introduction facilitating width, as seen in the radial direction, which at least equals the outer diameters of convolutions of the coil springs 38, 39. The energy storing coil springs 38, 39 can be introduced into the sector-shaped recesses 40, 41 by advancing through the threading-in portions 46, 47 at an oblique angle. Once the still unstressed coil springs 38, 39 are introduced into the sector-shaped recesses 40, 41, the adjusting element 25 is assembled with the supporting ring 30. To this end, axial projections 48, 49 which are provided on the adjusting ring 25 to further constitute the biasing portions or supporting portions for the coil springs 38, 39 are each introduced into one of the axially extending slit-shaped portions 50, 51 which are adjacent the threading-in portions 46, 47 to thus place the stressing projections 48, 49 adjacent one end portion each of the unstressed coils springs 38, 39. The unstressed condition of the spring 38 or 39 can be seen in FIG. 3 at 38a and 39a. The other end portions of the coil springs 38, 39 abut the bottoms 53, 53a provided in the sector-shaped recesses 40, 41 as seen in the circumferential direction. The springs 38, 39 can be stressed by rotating the adjusting ring 25 and the supporting ring 30 relative to each other. Upon rotation of the rings 25, 30 relative to each other through a predetermined angle which exceeds the circumferential length of the threading-in portions 46, 47, the stressing projections 48, 49 of the adjusting ring 25 respectively overlie the end portions of openings 44, 45, as seen in the axial direction, so that the adjusting ring 25 and the supporting ring 30 can be moved toward each other until the sloping ramps 26, 27 and the oppositely sloping ramps 28, 29 come into actual contact with each other. The openings 44, 45 and the axial projections 48, 49 are positioned relative to each other in such a way that a snap-in connection is established between the rings 25, 30 as seen in the axial direction. To this end, the end portions of the axial projections 48, 49 comprise hook-shaped portions 48a (see FIG. 4) which can abut radially extending portions of the supporting ring 30. The springs 38, 39 are caused to assume stressed positions 54 corresponding to the unused condition of the friction clutch 1 in response to additional angular movement of the parts 25 and 30 relative to each other through the angle 37 (FIG. 3). Thereafter, the rings 25, 30 can be fixed in such positions by suitable means, not shown. For example, such means can include a form-locking connection which is effective between the rings 25 and 30 and can be removed after the mounting of the friction clutch 1 on the counterpressure plate 6 is completed, and such removal of the form-locking connection results in activation of the compensating device 20. The angle of adjustment which can be achieved to compensate particularly for the wear upon the friction linings 7 corresponds to the angle of rotation which is shown in FIG. 3, as at 37. Upon completed angular movement through the angle 37, the axial projections 48, 49 of the ring 25 abut at the ends of the openings 44, 45 of the ring 30, as seen in the direction of adjustment of the ring 25. The stressed condition of the coil spring 38 corresponding to the just described position is shown in FIG. 3 at 38a.

When the friction clutch 1 is new, the axially extending cams 26, 27 and 28, 29 which constitute the sloping ramps and the oppositely sloping ramps extend axially into each other to a maximum extent. Thus, the overlapping rings 25, 30 occupy a minimum of space as seen in the axial direction.

In the illustrated embodiment, the extent of actuating movement in the direction of disengagement of the friction clutch 1 is determined by the sheet metal part 34. In accordance with a non-illustrated modification, the abutment portions which are required for such purpose and which cooperate, for example, with the cover 2, can also be provided on the disengaging member 22, namely on that race of the bearing which rotates with the friction clutch 1 or on a part which is connected therewith. The extent of axial movement of the friction clutch 1 in at least one of the two axial directions can also be limited by at least one abutment which can be provided on the tubular guide 23 to arrest the disengaging member 22.

Furthermore, the disengaging member 22 could act directly upon the actuating prongs 4b and a corresponding compensating means could be provided between the disengaging member 22 and the disengaging fork 24.

It is advisable to stress the disengaging member 22 in a direction toward the actuating prongs 4b to such an extent that the thus stressed member 22 does not adversely affect the operation of the friction clutch 1 and of the compensating device 20.

As can be seen in FIGS. 2 to 4, the adjusting ring 25 is provided with radially inwardly disposed cams 55 adapted to be engaged by a rotating or retaining means which, if necessary, can abut the housing 2 or the supporting ring 30 to prevent rotation. Such retaining means can be provided during the making or during assembly of the friction clutch 1 or of the compensating device to be thereupon removed upon completion of the mounting of the friction clutch 1 on the plate or flywheel 6.

Figure 8:
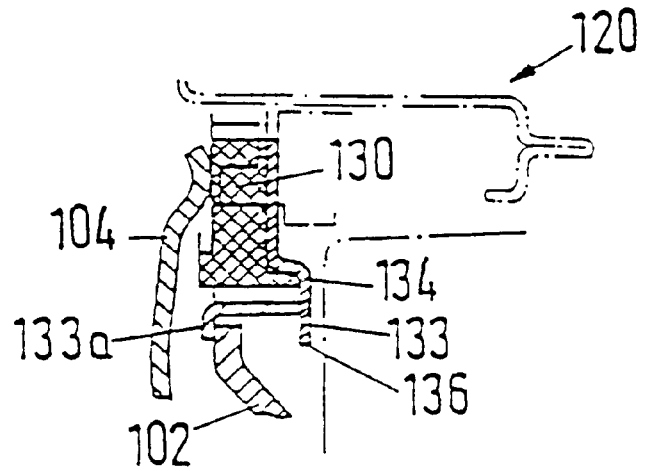

The detail which is shown in FIG. 8 constitutes a modified version of the lower half of the compensating device 20 shown in FIGS. 1 and 2. In the modification which is shown in FIG. 8, the extent of axial movement between the compensating device 120 and the housing or cover 102 in the engaged condition of the friction clutch is limited by hook-shaped axially extending arms 133 which are of one piece with the sheet metal part 134. The arms 133 are provided at the outer marginal portion of the sheet metal part 134 which acts as a pusher and the arms extend axially through the cover 102. The free ends of the arms 133 confront the diaphragm spring 104 and include radially outwardly extending portions 133a overlying radially that side of the cover 102 which faces the diaphragm spring 104. Such construction ensures that the axial forces which the diaphragm spring 104 applies to the compensating device 120 can be taken up by the pusher 134 which is made of metallic sheet material so that the compensating device 120 can take up larger axial forces than the compensating device 20 of FIG. 2 wherein the abutments 33 are provided on the supporting ring 30 which is made of a plastic material. Such axial forces can be applied to the compensating device 20 or 120, among others, during transport, i.e., prior to installation of the friction clutch, because the resilient prongs of the main diaphragm spring 4 or 104 then bear axially upon the plastic supporting ring or compensating element 30 or 130. The pusher 134 which is made of metallic sheet material can be provided with at least two, preferably three or more hook-shaped arms 133 which are preferably distributed symmetrically or uniformly along the periphery of the pusher. The thickness of the metallic sheet material of the pusher 134 can be selected in dependency on the magnitude of axial forces which are to be resisted by the pusher. The ring 130 is made of a plastic material and is non-rotatably connected with the pusher 134. In a manner similar to that shown in FIG. 2, the pusher or the shaped sheet metal part 134 also comprises radially outer portions 136 which extend between the hook-shaped arms 133, as seen in the circumferential direction, and serve to limit the extent of disengaging movement or to prevent an excessive overtravel by abutting the housing 102.

Figure 9:
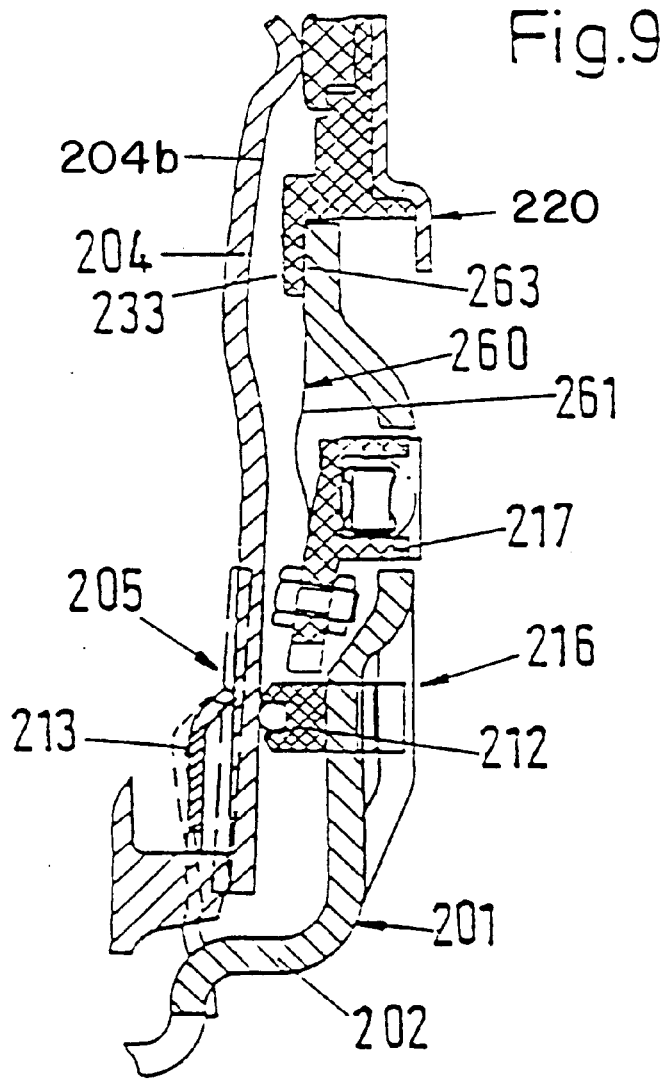

That part of a friction clutch 201 which is shown in FIG. 9 is constructed substantially in the same way as the lower right-hand portion of the friction clutch 1 of FIG. 1. FIG. 9 shows portions of the clutch housing 202, the tilting seat assembly 205 for the main diaphragm spring 204, the adjusting device 216 and the compensating device 220. As concerns the mode of operation of the adjusting device 216 and compensating device 220, reference should be had to the description of FIGS. 1 to 8 and/or to German patent applications Nos. P 43 06 505.8 and P 42 39 289.6 (corresponding to U.S. Pat. No. 5,450,934).

The embodiment of FIG. 9 comprises a rotation preventing device 260 for the adjusting element which latter is shown in the form of an adjusting ring 217.

The adjustment- or rotation preventing device 260 ensures that, prior to installation of the friction clutch 201, the adjusting element 217 assumes a predetermined position relative to other parts, particularly relative to the housing 202. The adjustment preventing device 260 is particularly suited to ensure that, when the friction clutch 201 is still new, the adjusting element 217 can be maintained in its retracted position, namely at least close to the zero position, prior to any adjustment even though the diaphragm spring 204 does not bear upon the adjusting ring 217 in the region of the combined tilting and supporting seat 212. This is attributed to the fact that, prior to mounting of the friction clutch 201 or when the friction clutch 201 is ready for shipment, the resilient prongs 204b of the main diaphragm spring 204 bear axially against the compensating device 220 in a manner as can be seen by referring to FIGS. 1 and 2. Due to such abutment, the main diaphragm spring 204 urges the force sensor 213—here shown as a diaphragm spring—axially and away from the housing 202 and adjusting ring 217 whereby the adjusting ring is no longer stressed in the axial direction and toward the housing 202. Therefore, the ring 217 could change its position were it not for the provision of the rotation preventing device 260. Thus, the ring 217 would not assume the desired retracted position, in which it permits an adjustment particularly to compensate for wear upon the friction linings of the clutch disc, during mounting of the friction clutch 201 on the output shaft of a combustion engine. The parts which are shown in FIG. 9 assume the solid-line positions when the friction clutch is mounted on a flywheel. The diaphragm spring 204 and the sensor spring 213 assume the broken-line positions of FIG. 9 prior to mounting of a new friction clutch. As can be seen, an axial distance or clearance is established between the adjusting element 217 or the ring-shaped seat 212 and the diaphragm spring 204 prior to mounting of the friction clutch 201.

Figure 10:
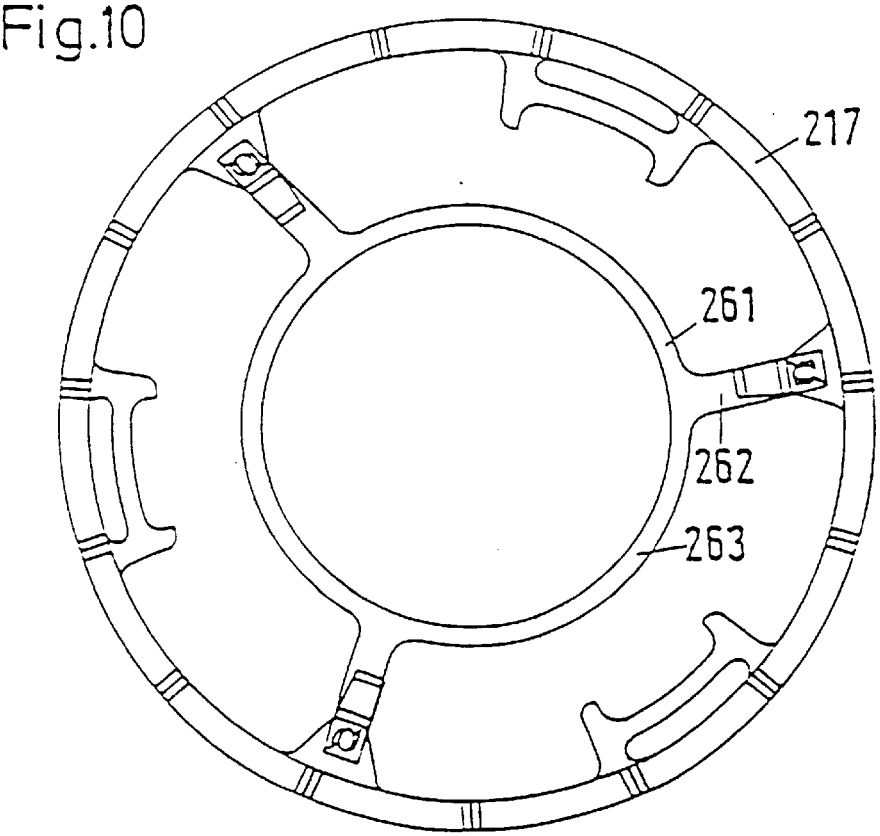

The adjustment preventing device 260 which, in addition to other functions, serves to be active during transport of the friction clutch 201, comprises at least one securing element 261 which is held against rotation relative to the housing 202 and cooperates with the housing to prevent rotation of the adjusting element 217 at least prior to installation of the friction clutch 201 and, if necessary, also in the engaged condition of an installed friction clutch 201. For example, and as shown in FIG. 10, the securing element 261 can comprise discrete arms 262 which extend in the radial direction and the radially outer portions of which are fixedly secured to the adjusting ring 117. The radially inner portions of the arms 262 can be clamped between the housing 201 and an abutment 233 provided at that side of the housing 202 which faces the diaphragm spring 204. This establishes a force-locking connection between the adjusting element 217 and the housing 202. The arms 262 can constitute or resemble leaf springs and their radially inner portions can be connected to each other by a ring-shaped part 263. In the illustrated embodiment, the arms 262 are connected with the adjusting element 217 by threaded fasteners. However, it is also possible to rivet the arms 262 to the adjusting element 217 or the arms can even include portions which are non-rotatably secured to the adjusting element 217 by being embedded in the plastic material of the adjusting element.

The compensating device 220 or its abutment 233 cooperates with the housing 202 and with the axially clampable portions of the securing element 261 to form a coupling or brake for the adjusting element 217; such brake or coupling is effective in the disengaged condition of the friction clutch 201.

The braking or clamping action of the securing element 261 is terminated during disengagement of the clutch so that the adjusting element or adjusting ring 217 can carry out an adjustment when necessary.

It is of advantage to construct the securing element 261 or the strips which resemble leaf springs and constitute the element 261 in such a way that the spring gradient or spring rate is low in the axial direction but that the element 261 is relatively rigid or stiff in the circumferential direction.

Figure 11:
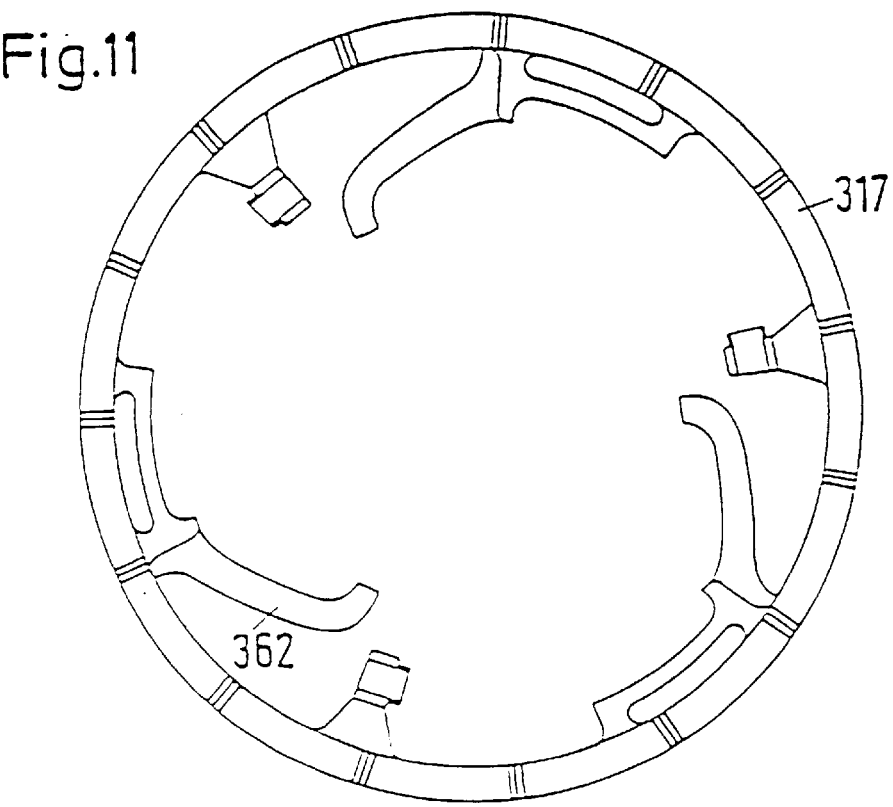

In that embodiment of an adjusting ring 317 which is shown in FIG. 11, the strips 362 are resilient in the axial direction and are molded into the plastic ring 317. In a manner similar to that shown at 263 in FIG. 10, the radially inner portions of the strips 362 can be connected to each other by a circular ring-shaped member.

Figures 12, 12A:
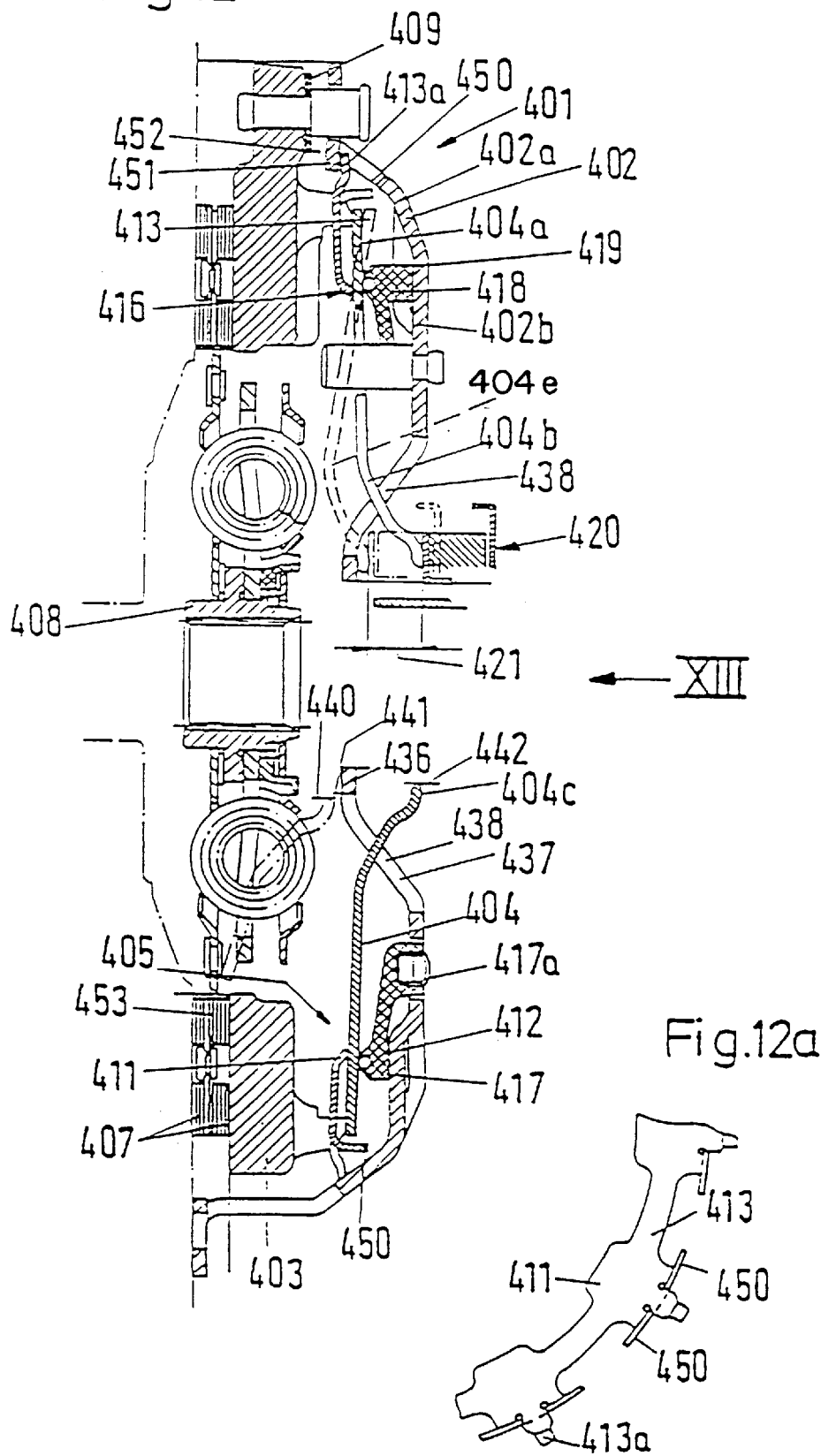
Figure 13:
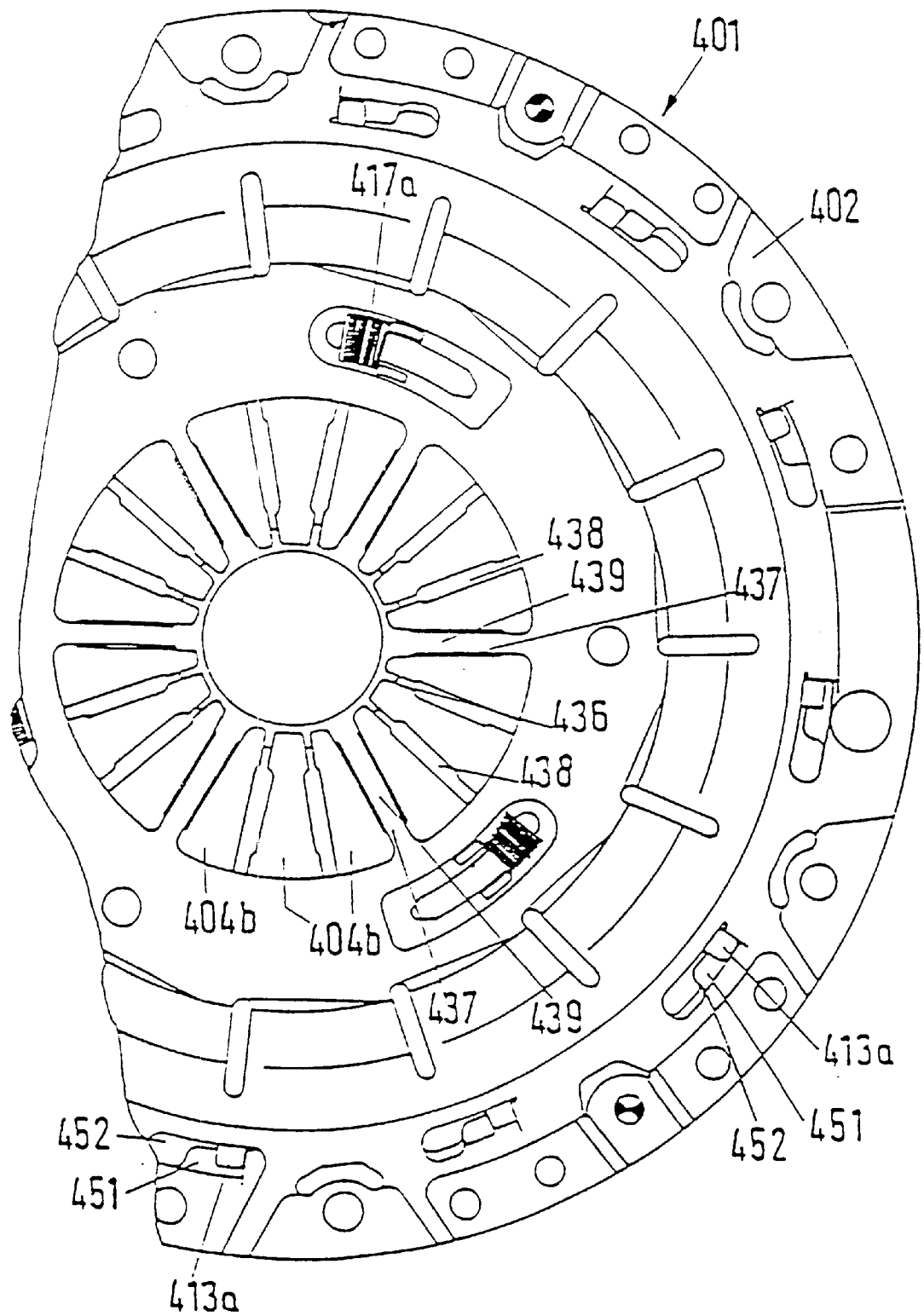

The clutch unit or friction clutch 401 which is shown in FIGS. 12 and 13 comprises a housing which constitutes a sheet metal cover 402, a pressure plate 403 which is non-rotatably connected with but is free to carry out limited axial movements relative to the cover, and a biasing diaphragm spring 404 which is stressed between the pressure plate and the cover 402. With reference to the housing 402, the biasing diaphragm spring 404 is mounted to constitute a two-armed lever which is tiltable or pivotable in a tilting seat assembly 405. Those portions of the diaphragm spring 404 which are located radially inwardly of the ring-shaped tilting seat assembly 405 bear upon the pressure plate 403 in a direction toward the friction linings 407 of a clutch disc 408 which can be clamped between the pressure plate and a flywheel. The transmission of torque between the pressure plate 403 and the cover 402 takes place by way of leaf springs 409 which can be stressed in a direction to urge the pressure plate 403 away from the friction linings 407.

The diaphragm spring 404 comprises a ring-shaped main portion 404a as well as prongs 404b which extend radially inwardly from the main portion.

The tilting seat assembly 405 comprises two tilting seats 411, 412 and the diaphragm spring 404 is held or clamped between the two seats against axial movement with reference thereto. The mounting and the construction of the tilting seats 411 and 412 are similar to and their functions are the same as those of the tilting seats 11 and 12 which were described with reference to FIG. 1. As concerns the parts which act upon the tilting seats 411, 412 and the automatic adjusting operation of the tilting seat assembly 405, reference should be had to the description pertaining to FIG. 1 as well as to the description pertaining to FIGS. 17 to 48.

The disengaging means of the friction clutch 401 are constituted by the prongs 404b of the diaphragm spring and can be actuated in the axial direction by a disengaging device 420 which can change the conicity of the diaphragm spring 404. The disengaging device 420 can comprise a compensating device 20 corresponding to that described with reference to FIGS. 1 to 7. However, such a disengaging device 420 is not necessary in clutch disengaging systems with a self-adjusting disengaging bearing. In such disengaging systems, the disengaging device 420 can be connected with that race of the disengaging bearing which rotates with the clutch 401 at least in the course of a disengaging operation.

In order to avoid an excessive disengaging movement of the disengaging means which is constituted by the prongs 404b of the diaphragm spring, the clutch 401 or the housing 402 is provided with movement limiting means 436 for the prongs 404b of the diaphragm spring. The movement limiting means 436 limit the extent of tilting or the tilting angle of the diaphragm spring 404 by propping the prongs 404b of the diaphragm spring in the axial direction and by thus taking up axially the disengaging force acting upon the disengaging device 420.

In the illustrated embodiment, the movement limiting means 436 is constituted by a ring-shaped abutment portion defined by the radially inner portions of the cover 402. The tips 404c of the prongs abut the portion 436 upon completion of a predetermined axial movement 421. The ring-shaped abutment portion 436 is designed in such a way that it is located at least close to the disengagement diameter of the prongs of the diaphragm spring, namely that diameter at which the disengaging device 420 engages the prongs 404b of the diaphragm spring. The abutment portion 436 is disposed axially between the prongs 404b of the diaphragm spring or the tips 404c of the prongs and the clutch disc 408.

The ring-shaped abutment portion 436 is connected with the cover body 402a by radially extending ribs or webs 437.

As can be seen in FIG. 13, six such webs are provided in the illustrated embodiment. However, it is possible—in many instances—to provide only three such webs. It is also possible to provide a larger number of webs, for example nine, in those types of clutches which necessitate the application of particularly large disengaging forces.

The webs 437 extend from the bottom wall 402b of the cover or from the cover body 402a radially inwardly and are inclined axially toward the pressure plate 403 or the clutch disc 408. The abutment portion 436 is shifted axially relative to the bottom wall 402b of the cover toward the interior of the cover. The resilient prongs 404b extend through openings 438 which are disposed between the ring-shaped abutment portion 436, the cover body 402a which is located radially outwardly, and connecting ribs 437. To this end, the radially inner portion of the length of each prong 404b forming part of the diaphragm spring of the illustrated embodiment is bent or oriented in the axial direction counter to the direction in which the webs 437 extend. As can be seen in FIG. 13, the prongs 404b of the diaphragm spring form groups of three for each opening or cutout 438. Slots 439 are provided between the groups of three to receive the webs 437. The slots 439 and the webs 437 are positioned relative to each other in such a way that it is possible to properly tilt the diaphragm spring 404.

Insertion of the prongs 404b of the diaphragm spring into the openings 438 is carried out during installation of the friction clutch 401. To this end, the inner diameter 440 of the diaphragm spring 404 is larger than the outer diameter 441 of the ring-shaped abutment portion 436 in the unstressed condition of the diaphragm spring. Such unstressed condition of the diaphragm spring 404 is shown in FIG. 12 by dot-dash lines. The inner diameter is the diameter of a circle defined by the tips 404c of the prongs. This ensures that the prongs of the diaphragm spring 404 can be pushed axially into the openings 438 of the cover 402, at least in the fully unstressed condition of the diaphragm spring. During assembly of the friction clutch 401 or not later than during mounting of the friction clutch, e.g., on a flywheel, the diaphragm spring 404 is tilted to thus reduce the inner diameter 440 which is the diameter of a circle surrounded by the prongs 404b of the diaphragm spring. When the friction clutch is mounted on a flywheel, the diaphragm spring 404 assumes the operative position and the tips 404c of the prongs define a circle having a diameter 442 which is smaller than the outer diameter 441 of the abutment portion 436. The diaphragm spring 404 is tiltably mounted on the housing 402 and its prongs 404b are configurated in such a way that the inner diameter of the circle surrounded by the prongs is smaller than the outer diameter of the abutment portion 436 even after the prongs have covered the tilting distance 421.

The axially limited maximum possible actuation distance 421 is selected in such a way that, after the linings 407 have undergone a maximum permissible amount of wear, the clutch 401 still provides at least the necessary full disengagement distance which is required for satisfactory operation, namely for proper disengagement of the clutch. The clutch 401 or the sensor spring 413 which ensures automatic compensation for the wear upon the friction linings in the clutch, as well as the adjusting device 416, are designed in such a way that, when the friction clutch 401 is new, undesirable axial adjustment of the tilting seat assembly 405 does not take place, even upon completion of movement through the full distance 421.

The mode of operation and the cooperation between the abutment portion 436 and the prongs 404b of the diaphragm spring will be explained and demonstrated with reference to the following numerical example:

The prescribed disengagement distance for the friction clutch 401 amounts to between 8.4 and 10 mm; this takes into consideration the existing tolerances. The clutch 401 is designed in such a way that, when the clutch is still new, undesired axial adjustment of the tilting seat assembly 405 could take place only if the disengagement distance were increased to more than 14 mm. The movement limiting abutment 436 is designed and positioned in such a way that, when the friction clutch is still new, those portions which come into engagement with the abutment 436, namely the tips 404c of the prongs, can cover an axial distance 421 of 12.5 mm. When the tips 404c of the prongs of the diaphragm spring engage the abutment 436 and apply the maximum disengaging force, the cover can again yield resiliently through an axial distance of approximately 0.5 mm so that it is possible to cover a maximum distance 421 of 13 mm.

It is now assumed that the friction linings 407 can be subjected to a maximum wear of 3 mm. This means that, during the useful life of the friction clutch 401, the diaphragm spring is displaced by 3 mm in a direction toward the clutch disc as a result of axial shifting of its tilting seat assembly 405. The maximum possible distance which can be covered for disengagement of the clutch is thus reduced from approximately 13 mm to approximately 10 mm, so that after elapse of the useful life of the clutch, the distance to be covered for engagement is still within the required tolerance of between 8.4 and 10 mm.

In the illustrated embodiment, the abutment 436 is of one piece with the cover 402. However, this abutment could also constitute a separate part which is connected to the cover 402. The webs 437, too, can constitute separate parts or can be of one piece with a discrete part constituting the abutment 436.

The clutch 401 which is shown in FIGS. 12 and 13 further comprises a device or means which effect an increase of supporting force acting upon the diaphragm spring 404 during operation of the clutch 401 at least within those portions of the RPM range of the clutch when the clutch rotates while the friction linings undergo wear. Such increase of the supporting force prevents that, due to undesirable influences which arise at least within a certain RPM range during actuation of the clutch 401, an adjustment or compensation based upon an undesirable axial yielding or retraction of the sensor means in the form of the sensor spring 413, which cooperates with the tilting seat 411, could take place.

FIG. 12 illustrates means 450 which operate in dependency upon the RPM or centrifugal force to increase the axial force acting upon the tilting seat 411. The means 450 depend upon the centrifugal force and are constituted by tongues which are formed at the outer periphery of the diaphragm spring shaped sensor 413 and are bent in a direction toward the cover 402. As can be seen in FIG. 12a, the sensor spring 413, which resembles a diaphragm spring, comprises tongue-like arms 413a which extend radially outwardly and bear axially upon the cover 402 in a manner as shown in FIGS. 12 and 13. A bayonet type mount or lock 452 is provided between the arms 413a and those portions 451 of the cover 402 which abut and axially prop or support the arms 413a. The bayonet mount-like connection 452 is designed in such a way that, when the sensor spring 413 and the housing 402 are moved axially toward each other, the arms 413a overlie the supporting portions 451 of the housing 402 in response to subsequent relative angular movement of the parts 413 and 402 relative to each other. During assembly of the sensor spring 413 with the cover 402, the sensor spring 413 is first elastically stressed in the axial direction prior to rotation of the parts 413 and 402, and is thereupon relieved subsequent to rotation so that the arms 413a are biased against the cover 402. As can be seen in FIG. 12a, a tongue 450 is provided at each side of a radially extending arm 413a. When the clutch 401 rotates, the tongues 450 are subjected to the action of centrifugal force which results in the generation of a force that is superimposed upon the force generated due to stressing of the sensor spring 413, i.e., the two forces are added to each other, and this results in an increase of the supporting force for the actuating diaphragm spring 404 in the region of the tilting seat 411. This additional force which acts upon the tilting seat 411 and is generated by the tongues 450 increases in response to increasing RPM. However, such increase of the force can be limited in that, once a certain RPM is reached, the tongues 450 undergo such deformation or tilting under the action of the centrifugal force that they bear radially outwardly against the housing 402 so that, at such time, no additional or practically no additional increase of the additional force, namely of the force which is generated by the RPM-dependent means 450, takes place in the region of the tilting seat 411.

In considering the relationship of axial forces or of the equilibrium of forces between the tilting seat 411 and the diaphragm spring 404, it is further necessary to take into consideration the leaf springs which constitute the torque transmitting means 409. Such leaf spring-like torque transmitting means 409 can be installed in stressed condition between the housing 402 and the pressure plate 403 in such a way that the pressure plate is biased against the diaphragm spring 404 with at least some force during the entire useful life of the clutch unit 401. Thus, the axial force which is generated by the torque transmitting means 409 opposes the force which the diaphragm spring 404 applies to the pressure plate 403 and is added to the axial force which the sensor spring 413 applies to the diaphragm spring 404 so that the sum of the two forces opposes axially the disengaging force which is being applied to the tips 404c of the prongs. Thus, the actual sensor force, which opposes axial movement of the diaphragm spring 404 when the clutch 401 does not rotate, is furnished by the resultant of the forces generated by the torque transmitting means 409 and the sensor spring 413 and of the force acting upon the diaphragm spring 404. When the clutch 401 rotates, the resulting force is superimposed upon an additional force which is dependent upon the RPM or upon the centrifugal force and is generated by the tongues 450.

If the clutch disc 408 is provided with a device, e.g., in the form of friction lining springs 453, which ensures a gradual increase or gradual decrease of the transmitted torque during actuation of the friction clutch 401 and during a portion of the disengagement movement of the pressure plate 403, such device 453 assists the axial propping of the diaphragm spring 404 against the adjusting element in the form of an adjusting ring 417 until the pressure plate 403 releases the friction linings 407 and hence the clutch disc 408. This ensures that the adjusting ring 417 remains in axially stressed condition between the diaphragm spring 404 and the housing or cover 402 at least close to the instant of unclamping of the friction linings 407 so that no adjustment can take place. When, during disengagement of the clutch 401, the pressure plate 403 no longer engages the friction linings 407, and if the clutch unit does not comprise the tongue-like torque transmitting means 450, the axial stressing force acting upon the main diaphragm spring 404 is furnished only by the resultant of the forces applied by the leaf spring-like torque transmitting means 409 and by the sensor diaphragm spring 413. Such resultant sensor force opposes the disengaging force which is being applied to the tips 404c of the prongs. Within certain RPM ranges, especially at high engine RPM, vibrations which cause axial oscillation of the pressure plate 403 are likely to develop, for example, by the engine. If the pressure plate 403 oscillates in the axial direction, it is likely to become disengaged from the main or diaphragm spring 404 so that the resultant sensor force decreases for a short interval of time because the axial force which is generated by the leaf spring-like torque transmitting means 409 no longer acts upon the diaphragm spring 404. Consequently, the relationship of forces between the diaphragm spring 404 or the disengaging force acting upon the spring 404 and the resulting supporting or propping force acting upon the spring 404 is disturbed, namely the supporting or propping force acting upon the diaphragm spring 404 during such stages of operation of the clutch unit 401 is too small so that the clutch is adjusted prematurely or not at a time when an adjustment is desired, whereby the operating point of the diaphragm spring 404 is shifted in a direction toward the diaphragm spring minimum. Furthermore, particularly high circumferential accelerations of the crankshaft can develop during certain stages of operation of the engine, especially at higher engine RPM, and such accelerations entail—due to inertia of the adjusting ring 417—the development of circumferentially acting forces which, due to the presence of adjusting ramps 418, 419 which operate between the adjusting ring 417 and the housing 402, are likely to apply to the diaphragm spring 404 an axial force component acting counter to the direction of application of the resultant sensor force, and this can also result in undesired or unintended adjustment for wear. Moreover, the development of vibrations can result in a reduction of frictional engagement between the sloping ramps 418, 419 and in an increase of the axial force generated by the adjusting spring 417a—i.e., by the spring which acts in the circumferential direction upon the adjusting member 417—and acting upon the diaphragm spring 404; this also promotes undesired adjustments.

In order to eliminate the aforediscussed drawbacks of a clutch 401 without resorting to the centrifugal force-dependent supporting means, the embodiment which is shown in FIGS. 12 and 13 is provided with the tongues 450 which are acted upon by centrifugal force. Such centrifugal force-dependent tongues 450 compensate for undesirable influences which are a function of RPM in that the tongues 450 generate a supporting force which acts in parallel with the force generated by the sensor spring 411 and increases in dependency upon the RPM and/or in dependency upon centrifugal force.

The centrifugal force-dependent tongues can be designed in such a way that the adjustment in the clutch 401 which is necessary to compensate for wear can take place only when the clutch is idle or its RPM is low. Thus, when the clutch 401 rotates and/or when its RPM is above a value at which critical vibrations are likely to develop, the operation of the adjusting device 416 can be blocked for all practical purposes.

Figure 14:
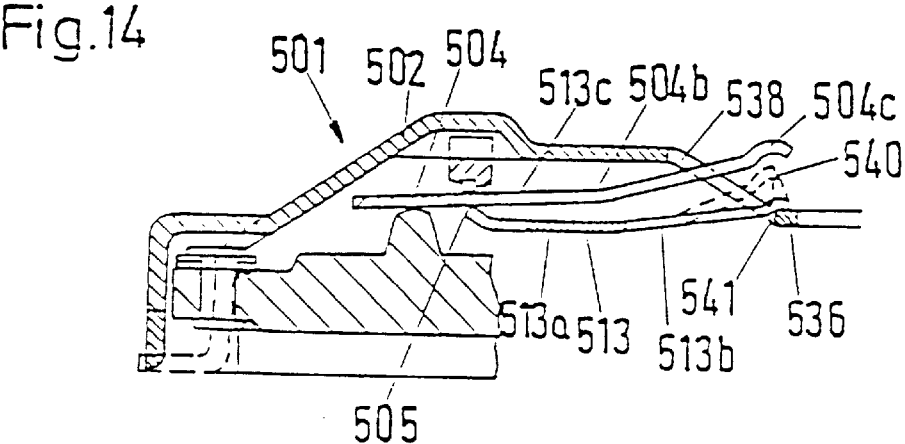

In the embodiment of a friction clutch 501 which is shown in FIG. 14, the sensor spring 513 is disposed radially inwardly of the tilting seat assembly 505 for the diaphragm spring 504. The sensor spring 513 comprises a ring-shaped main portion 513a and tongues 513b which extend radially inwardly from the main portion. These tongues 513b of the sensor spring 513 bear upon the ring-shaped abutment portion 536 which is mounted and designed in a manner similar to that of the ring-shaped abutment portion 436 shown in FIGS. 12 and 13. The tips of tongues 513b of the sensor abut that side of the abutment portion 536 which faces the tips 504c of the prongs 504b of the diaphragm spring 504. The main portion 513a further comprises tongues 513c which extend radially outwardly therefrom and abut and hence provide axial support for the diaphragm spring 504.

The mounting of the sensor spring 513 on the cover or housing 502 can be carried out in such a way that the spring is deformed in the stressing direction to assume a conical shape and its deformation suffices to ensure that the inner diameter which is surrounded by the inner tongues 513b is larger than the outer diameter 541 of the abutment portion 536. In this manner, the supports 513b can be inserted into the openings 538 of the cover 502 in a manner similar to that already described in connection with the prongs 404b and openings 438 of the clutch 401 shown in FIGS. 12 and 13. When the insertion of the tongues 513b into the openings 538 is completed, the stressing of the sensor spring 513 can be terminated so that the inner portions of the tongues 513b are shifted to define a circle having a smaller diameter and to contact the abutment portion 536.

A further possibility of mounting the sensor spring 513 on the cover 502 is that one bends portions of the inner tongues 513b axially in a direction toward the cover 502 so that they surround a circle having a diameter 540 which is larger than the outer diameter of the abutment portions 536. Once the sensor spring 513, and more particularly its tongues 513b, are introduced into the openings 538 of the cover 502, then tongues 513b can be bent back in such a way that their radially inner portions bear upon the abutment portion 536. Such bending of the tongues 513b back from the position which is shown in FIG. 14 for one of these tongues by broken lines to the position which is shown by solid lines entails pivoting with attendant plastic deformation of the material of the diaphragm spring. In order to effect plastic deformation of the sensor tongues 513b, such tongues can bear axially against the prongs 504b and more specifically against the tips 504c of the prongs forming part of the diaphragm spring 504. The tongues 513b can be bent by a tool which supports the prongs 504b of the actuating diaphragm spring 504 from above and acts upon the undersides of the sensor spring tongues 513b, namely in the region of the diameter of the circle defined by the tongues 513b.

The abutments 436 and 536 which limit the extent of disengagement movement or the magnitude of the tilting angle of the diaphragm springs 404 and 504, respectively, exhibit the advantage that they are integrated into the corresponding clutches 401 and 501 as well as that the abutments act in the regions of the prongs 404b and 504b which can ensure that, when the prongs 404b and 504b of the diaphragm springs actually bear upon the respective abutments 436 and 536, the prongs of the diaphragm springs are not deformed, or are only negligibly deformed, in the axial direction. This can further ensure that the prongs 404b, 504b do not actually contact a part of the clutch disc 508 when the prongs assume positions corresponding to the disengaged conditions of the respective clutches 401 and 501. That position which the diaphragm spring 404 assumes in the disengaged condition of the clutch is shown in FIG. 12 by broken lines and is identified by the reference character 404e. Thus, one can avoid abutment or sliding movement between the clutch disc 408 and the prongs 404b of the diaphragm spring 404 when the clutch 401 is disengaged, i.e., when the clutch and the clutch disc 408 rotate relative to each other.

In those embodiments which are shown in FIGS. 12 to 14, the abutments 436, 536 are disposed in the regions of the tips 404c, 504c of the prongs of the respective diaphragm springs. However, such abutments can also be designed in other ways and can be disposed radially outwardly of the tips 404c, 504c. It is advisable in the aforementioned modified constructions to select the radial lever arms between the tips 404c, 504c of the prongs and abutments which are disposed radially outwardly thereof in such a way that no excessive flexing of the prongs 404b, 504b of the respective diaphragm springs can take place under the action of the disengaging force acting thereon and due to the fact that they are being supported by the abutments.

The aforementioned excessive or unduly long disengaging movement can be caused by a disengaging system or actuating system which acts upon the clutch acuating means. The actuating means of the illustrated and described embodiments are the prongs of the diaphragm springs. Such actuating systems normally further comprise a bearing which acts upon the actuating means of the friction clutch, an actuating member, such as for example a clutch pedal, and a power train between the disengaging bearing and the actuating member. The power train can comprise a master cylinder as well as a slave cylinder. In disengaging systems which employ a master cylinder and a slave cylinder, an unacceptably long disengaging movement which exceeds the satisfactory disengaging movement can be caused in that, due to rapidly following engagements and disengagements of the friction clutch, the slave cylinder cannot reset in time, i.e., it does not reach an end position so that, during the immediately following renewed disengagement, the slave cylinder covers a distance which corresponds to the normal disengagement distance but the combined disengagement distance for the clutch corresponds to the sum of the normal disengagement distance and the remaining resetting movement which did not take place. This can result in such total actuating movement for the friction clutch which considerably exceeds the contemplated maximum permissible disengaging movement. In other words, the extent of actual movement is likely to exceed the spare or additional travel for actuation which is normally provided for in a clutch.

Due to the novel undertakings, such as the provision of the abutments 36, 436, 536, it is now possible to prevent excessive disengaging movements or overtravel during actuation of friction clutches in spite of the fact that one can ensure those normal disengaging movements which are needed during the useful life of the clutch.

Thus, in accordance with the invention, it is now possible to provide in clutches in general, and especially in clutches which are provided with an adjusting device capable of compensating at least for the wear upon the friction linings of the clutch disc, in the clutch actuating train an abutment or stop which prevents overtravel of the clutch actuating means during actuation of the clutch. For example, such an abutment can limit the disengaging movement of the disengaging bearing or the extent of tilting of the diaphragm spring. However, such an abutment can also be installed at another location. Furthermore the actuating movement of the friction clutch can be limited to a predetermined constant value by providing a suitable exact barrier, such as an abutment, against excessive movement in the direction of disengagement as well as in the direction of engagement.

It is of advantage if such a limitation of the extent of movement takes place in the region of the disengaging bearing because, at such location, the chain of tolerances between the actuating means, such as the prongs of the diaphragm spring in the friction clutch, and the component parts whose movement is to be limited to a predetermined distance is small.

In view of the provision of such a barrier, i.e., of the aforediscussed abutment, the disengaging movement takes place in a direction toward a practically rigid barrier which might be undesirable under certain circumstances because it could entail overstressing of component parts, especially of those in the disengaging system. Moreover, this might be undesirable to the person operating, for example, a foot actuated system. Therefore, a further development of the invention provides in the actuating train of the friction clutch resiliently or elastically yieldable means and/or means for limiting the pressure in the disengaging system, and such means is maintained under an initial stress or necessitates the application of a minimal deforming force or opening force which at least slightly exceeds the maximum required force or the required maximum pressure for actuation of the clutch. This ensures that the clutch pedal can be further depressed or that the actuating motor can complete its movement toward a predetermined position after the abutment becomes effective. The yieldable means in the actuating train of the friction clutch can be installed between the clutch actuating means and the disengaging bearing or between such bearing and the disengagement effecting actuating means.

Figure 15:
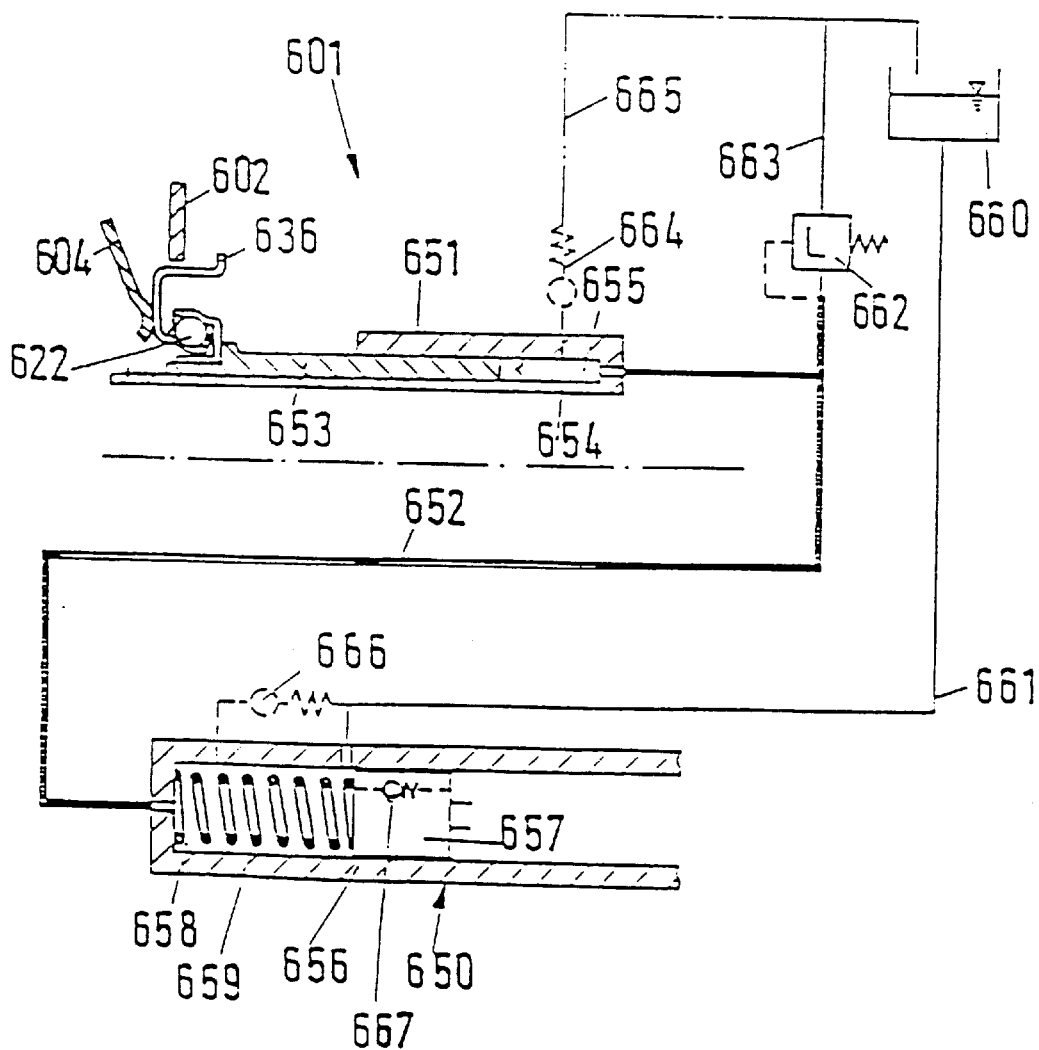

FIG. 15 illustrates a disengagement system 601 and several possible embodiments of means for limiting the maximum force which can be applied by the disengaging bearing 622 to the clutch actuating means 604 and/or to the clutch housing 602. The structure which is shown in FIG. 15 comprises an axial stop 636 which engages the housing 602 when the disengaging bearing 622 completes a movement through a predetermined distance in a manner similar to that described in connection with the abutment 36 shown in FIGS. 1 and 2. However, it is also possible to limit the disengagement movement in another way, e.g., as described with reference to FIGS. 12 to 14. The disengaging system 601 comprises a master cylinder 650 and a slave cylinder 651. The two cylinders are connected to each other by a conduit 652. The piston 653 of the slave cylinder 651 carries the disengaging bearing 622 and is axially movably received in a housing 654. A plenum chamber 655 of the cylinder 651 receives a hydraulic medium, such as for example oil, through the conduit 652. The master cylinder 650 comprises a housing 656 which cooperates with a piston 657 therein to define a variable-volume plenum chamber 658. The plenum chamber 658 is connected with the plenum chamber 655 by the conduit 652. The plenum chamber 658 accommodates a restoring or resetting spring 659 for the piston 657. The piston 657 can be moved axially by way of a clutch pedal or an actuating motor, such as an electric motor or a pump. The circuit for the pressurized fluid in the disengagement system 601 is connected with a reservoir 660 for pressurized fluid. The master cylinder 650 is preferably directly connected with the reservoir 660 for pressurized fluid by a conduit 661.

Figure 16:
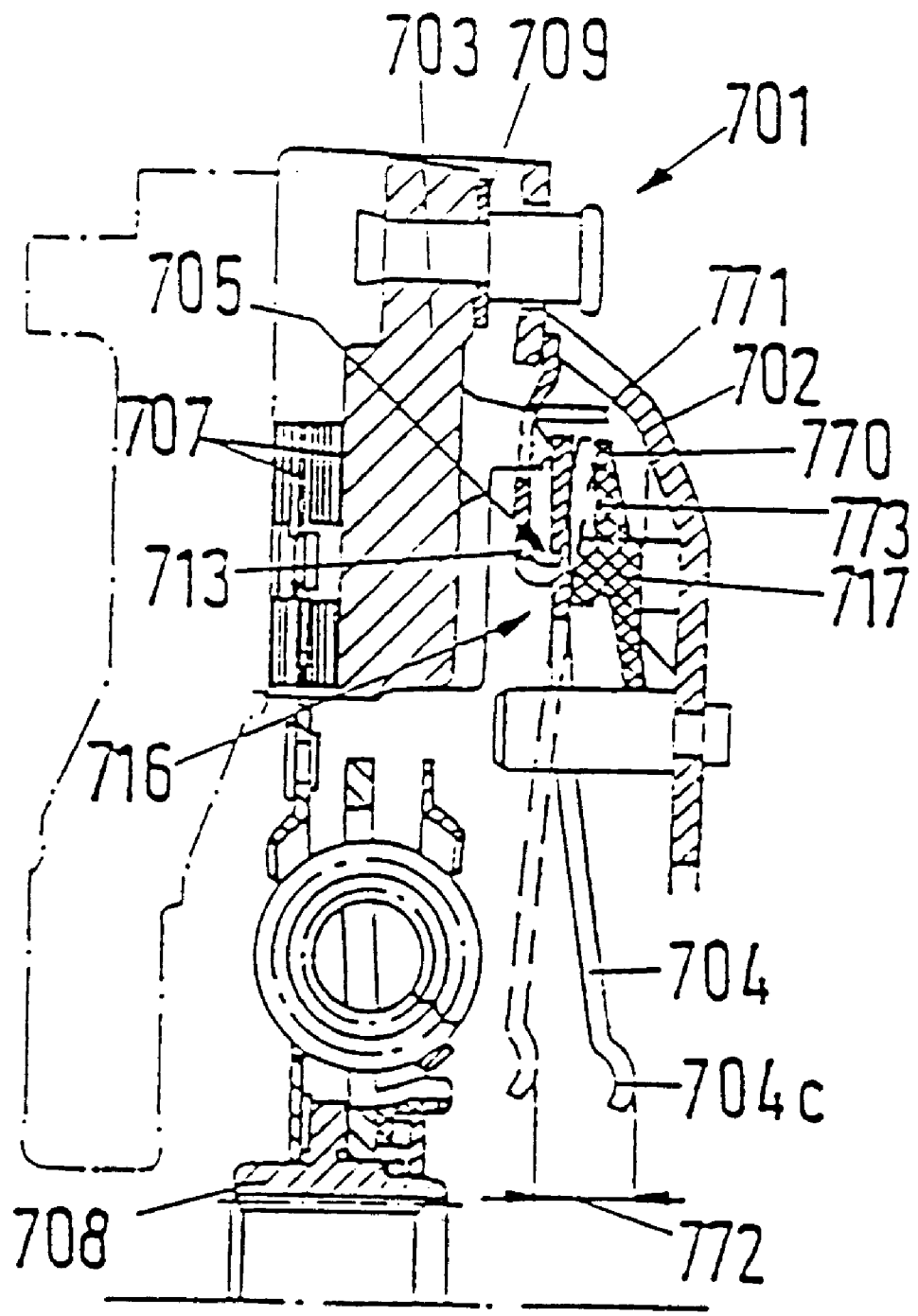

In order to limit the clutch actuating force which is being applied to the actuating means 604 and/or to the housing 602, the embodiment of FIG. 16 provides in the circuit for the pressurized fluid in the disengagement system 601 at least one means which limits to a predetermined value the pressure developing in the circuit for the pressurized fluid in response to actuation of the friction clutch. In the embodiment of FIG. 15, such means is constituted by at least one pressure limiting valve. FIG. 15 illustrates several possible locations for such a pressure limiting valve. One such pressure limiting valve 662 can be installed, for example, in the conduit 652 and then comprises a return conduit 663 leading back to the reservoir 660 for pressurized fluid. However, in lieu of the pressure limiting valve 662, it is also possible to provide a pressure limiting valve 664 which is carried by the housing 654 or is actually integrated into the housing, which communicates with the plenum chamber 655 and which is connected with the reservoir 660 for pressurized fluid by a return flow conduit 665.

FIG. 15 shows a further alternative possibility of employing a pressure limiting valve 666. This pressure limiting valve is in communication with the plenum chamber 658 of the master cylinder 650 and can be carried by or integrated into the housing 656. The pressure limiting valve 666 is further provided with a return conduit discharging into the container 660 for pressurized fluid. To this end, the pressure limiting valve can be provided with its own return conduit or with a connection to the conduit 661.

A further possibility of utilizing a pressure relief valve 667 consists in that the valve is integrated into the piston 657 of the master cylinder 650. The relief side of this valve 667 must include a connection with the reservoir 660 for pressurized fluid or at least with an intermediate reservoir.

In lieu of a pressure relief valve, the circuit for pressurized fluid can comprise a hydromagazine which limits the maximum pressure developing in the disengaging system by relieving the system and by thus acting not unlike a buffer or energy storing means upon actuation of abutments which limit the extent of disengaging movement.

The clutch 701 which is shown in FIG. 16 employs, in a manner similar to those described in connection with the preceding Figures, an adjusting device 716 which automatically compensates for wear developing upon the friction linings 707 of the clutch disc 708. In the illustrated embodiment, the basic design and the mode of operation of the adjusting device 716 correspond to those described with reference to FIGS. 12 and 13. The adjusting element or adjusting ring 717 comprises abutment- or stop portions 770 which can cooperate with the diaphragm spring 704 during disengagement of the clutch 701. The relative axial arrangement of the abutment portions 770 with respect to those portions 771 of the diaphragm spring 704 which cooperate therewith is selected in such a way that, in the course of a disengaging operation, the portions 771 of the diaphragm spring are axially supported, at least indirectly but preferably directly, by the abutment portions 770 which are carried by the adjusting ring 717. The mutual propping or supporting preferably takes place at least close to that instant when the extent of the disengaging movement reaches or slightly exceeds the desired movement or, otherwise stated, when the change of conicity of the diaphragm spring 704 in the region of the tips 704c of its prongs reaches or slightly exceeds the desired change. The movement beyond the desired movement can take place because of a defect in or an improper adjustment of the disengaging system. Due to the fact that the diaphragm spring 704 is axially supported by the abutment portions 770, the adjusting ring 717 is secured against unintended rotation. Thus, for all practical purposes, the diaphragm spring 704 acts not unlike a brake for the adjusting ring 717 and becomes effective when the extent of disengaging movement exceeds the predetermined value 772.

The abutment- or stop portions 770 of the illustrated embodiment are constituted by a ring-shaped projection 773 which is provided on the ring 717 radially outwardly of the tilting seat assembly 705. In lieu of a ring-shaped radial projection 773, it is also possible to provide several radial arms which are distributed in the circumferential direction. The projection 773 or the arms which are used in the illustrated embodiment extend to the radially outer edge of the diaphragm spring 704. As soon as the movement through the predetermined distance 772 is completed, the radially outer portion 771 of the diaphragm spring 704 abuts the abutment portions 770 of the adjusting ring 717. When the predetermined distance 772 is exceeded, the tilting diameter of the diaphragm spring 704 is increased because such diameter is moved from the diameter of the tilting seat assembly 705 to the contact diameter between the portions 771 of the diaphragm spring 704 and the abutment portions 770. Owing to such movement of the tilting diameter of the spring 704, the disengaging force which is required in the region of the prongs 704c is reduced because the lever action of the diaphragm spring is changed from i to i+1, namely because before the disengagement distance 772 is covered the diaphragm spring acts not unlike a two-armed lever but is pivoted not unlike a one-armed lever when the distance 772 is exceeded. Due to such reduction of the disengaging force, one further ensures that the diaphragm spring 704 is urged in a direction toward the housing 702 and the adjusting ring 717 by, among others, the resulting axial supporting force generated by the sensor spring 713 and the leaf springs 709. Thus, the entire diaphragm spring 704 can no longer be shifted axially in a direction away from the adjusting ring 717 and cover 702. When the predetermined distance 772 is exceeded, the sensor spring 713 is resiliently stressed in the axial direction because the diaphragm spring 704 is then lifted off the adjusting ring 717 in the region of the tiltable seat assembly 705.

It is advantageous to provide the projection 773 or the arms on the adjusting ring 770, which is made of a plastic material, by resorting to an injection molding operation. The maximal force which is applied to the projection 773 in the axial direction equals the difference between the minimum disengaging force in the region of the tips 704c of the prongs of the diaphragm spring and the axial sensor- or supporting force which is being applied by the sensor spring 713 and the leaf springs 709. The projection 773 or the corresponding arms are designed in such a way that they can withstand such maximum force without pronounced deformation.

A further important advantage resides in that the axial stroke of the pressure plate 703 remains practically constant and, therefore, the axial force which the leaf springs 709 apply to the main diaphragm spring 704 does not undergo further reduction when the extent of movement exceeds the distance 772. Since the force which is being applied by the leaf springs 709 constitutes a portion of the resultant force, the remaining residual bias of such leaf springs further reduces the likelihood that the distance 722 would be exceeded in the friction clutch 701. Consequently, when the improved friction clutch is utilized, for example, in passenger cars, the excess movement or overtravel in the region of the tips 704c of the prongs of the diaphragm spring 704 can be in the range of between 0.5 and 2 mm without adversely influencing the operation of the adjusting device 716.

The extent of lifting of the pressure plate 703 can also be limited in that, when the extent of disengaging movement exceeds a predetermined distance, the pressure plate 703 abuts axially the sensor spring 713. To this end, suitable projections, such as for example cam lobes, protuberances or the like, can be provided on the sensor spring 713 and/or on the pressure plate 703.

Figure 17:
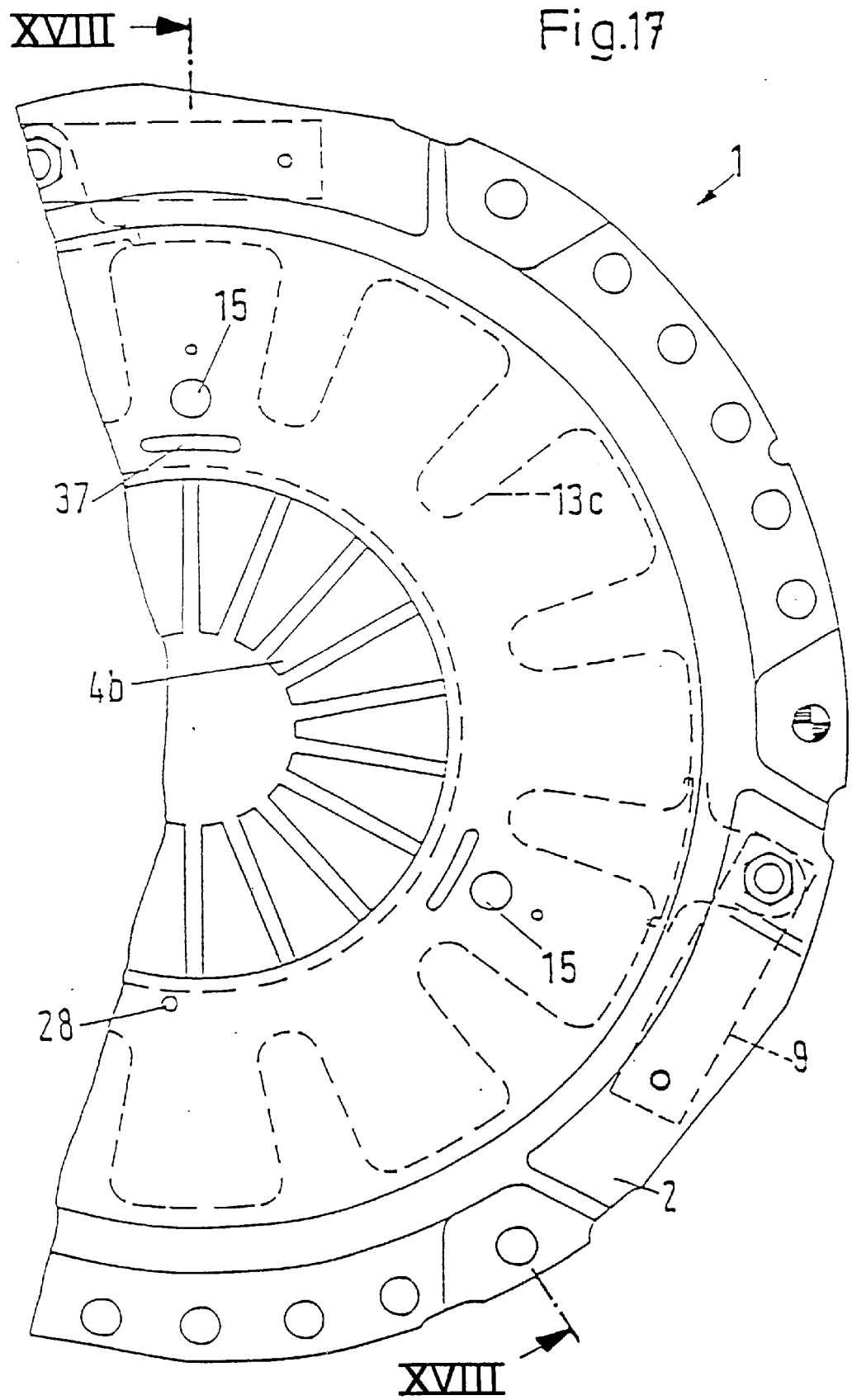
Figure 18:
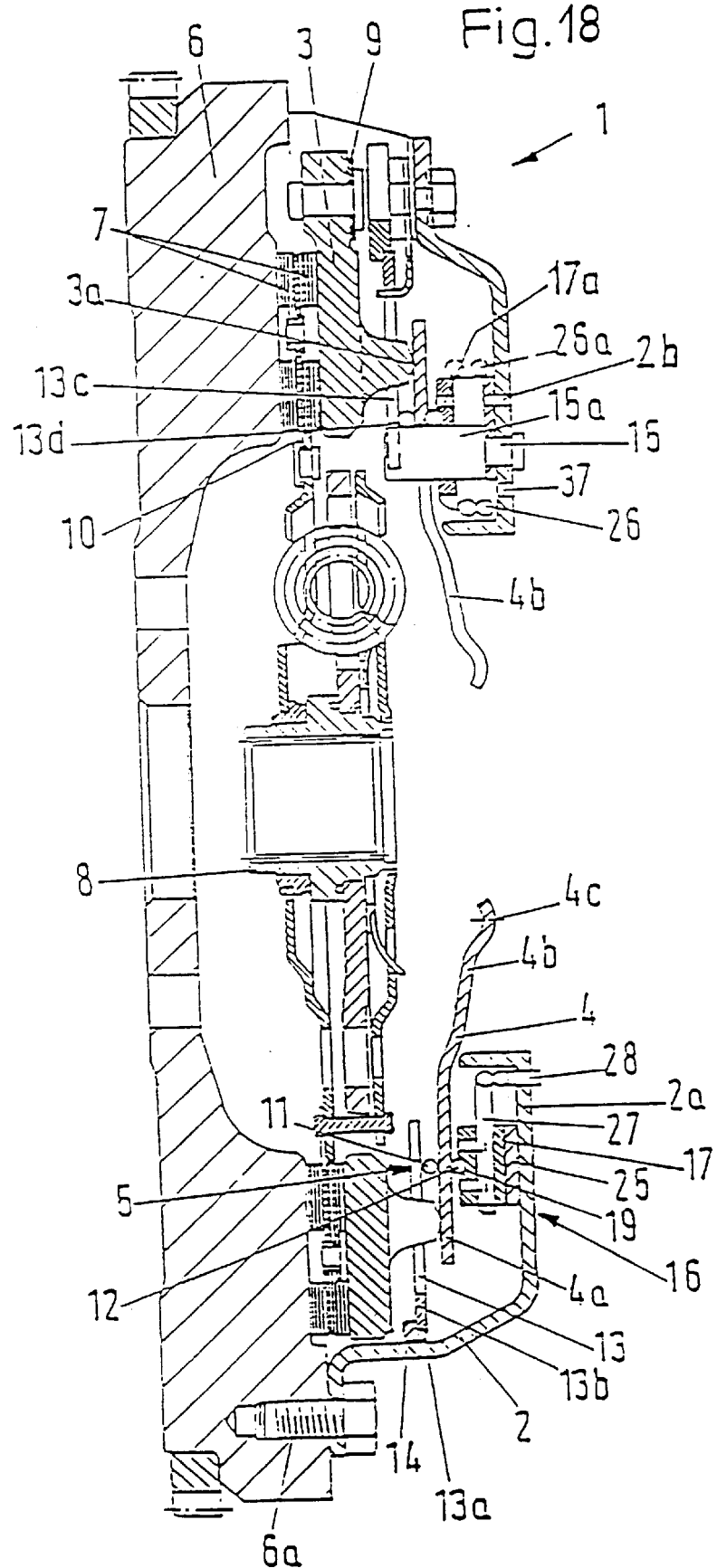

The friction clutch 1 which is shown in FIGS. 17 and 18 comprises a housing 2 and a pressure plate 3 which is non-rotatably connected to but can perform limited axial movements relative to the housing. A biasing diaphragm spring 4 is axially stressed between the pressure plate 3 and the housing 2 and is tiltable in a ring-shaped tilting seat assembly 5 which is mounted on the housing 2. The diaphragm spring 4 biases the pressure plate 3 toward a counterpressure plate 6 which is fixedly connected with the housing 2 at 6a and which can constitute, for example, a flywheel. In this manner, the friction linings 7 of the clutch disc 8 can be clamped between the friction surfaces of the pressure plate 3 and the counterpressure plate 6.

The pressure plate 3 is non-rotatably connected with the housing 2 by circumferentially or tangentially extending leaf springs 9. In the illustrated embodiment, the clutch disc 8 comprises so-called spring segments 10 for the friction linings 7. The segments 10 ensure a progressive increase of torque during engagement of the friction clutch 1 by enabling the friction linings 7 to perform a limited axial movement toward each other to thus ensure a progressive increase of axial forces acting upon the friction linings 7. However, it is also possible to employ a clutch disc having friction linings 7 which are practically rigidly mounted on a disc-shaped carrier with no appreciable movability axially and toward each other. In such instances, one can employ a so-called "friction lining spring set", i.e., a resilient arrangement in series with the diaphragm spring, for example, a resilient arrangement between the cover and the flywheel, between the cover and the seat facing the cover, between the diaphragm spring and the pressure plate, or by employing a resilient cover.

In the illustrated embodiment, the diaphragm spring 4 comprises a ring-shaped main portion 4a which furnishes the biasing force and actuating prongs 4b which extend radially inwardly from the main portion. The diaphragm spring 4 is installed in such a way that its radially outer main portion 4a biases the pressure plate 3 and that its radially inner portions (prongs 4a) are tiltable with respect to the tilting seat assembly 5.

The tilting seat assembly 5 comprises two tilting seats 11, 12 which are shown in the form of wire rings. The diaphragm spring 4 is axially held or clamped between the seats 11 and 12. The tilting seat 11 is located at that side of the diaphragm spring 4 which faces the pressure plate 3 and is biased axially in a direction toward the housing 2 by an energy storing element 13. The energy storing element 13 is a diaphragm spring or an element which resembles a diaphragm spring. The radially outer portion of the element 13 reacts against the housing 2 and its radially inner portions bias the tilting seat 11 axially against the actuating diaphragm spring 4 and hence also toward the housing 2. The diaphragm spring 13 is disposed between the pressure plate 3 and the actuating diaphragm spring 4 and comprises a ring-shaped main outer portion 13b as well as tongues 13c which extend radially inwardly from the inner edge of the portion 13b and abut the tilting seat 11.

In the embodiment of FIGS. 17 and 18, the housing 2 is connected with additional means 14 which serve to support the diaphragm spring-like member 13 and constitute a tilting seat for the diaphragm-spring like member 13. Such additional means 14 can be constituted by discrete segment-shaped parts which are tacked or riveted to the housing and can be uniformly distributed in the circumferential direction. However, the means 14 can also constitute a circumferentially complete ring-shaped part. Furthermore, the supporting means 14 can also constitute deformed or shaped integral parts of the housing 2, e.g., stampings which are impressed into the axially extending portion of the housing 2 or tongue-like cut-out sections which are forced out of the housing with attendant deformation of the housing subsequent to insertion and stressing of the diaphragm spring-shaped member 13 so that the sections of the housing are located beneath the outer marginal portion of the member 13. It is further possible to provide a bayonet mount-like connection or lock between the supporting means 14 and the diaphragm spring-shaped member 13 so that the diaphragm spring-shaped member 13 is stressed in a first step and its radially outer portions are thereafter moved axially to overlie the supporting means 14. In the next step, the diaphragm spring-shaped member 13 is turned through a requisite angle relative to the housing 2 so that the supporting portions of the member 13 overlie the supporting means 14. The supporting portions of the diaphragm spring-shaped member 13 can constitute arms which extend radially outwardly from the ring-shaped main portion 13b.

The means for preventing rotation of the actuating diaphragm spring 4 and, if necessary, of the diaphragm spring-shaped member 13 relative to the housing 2 as well as for centering the wire rings 11, 12 comprises axially extending centering means in the form of rivet elements 15 which are secured to the housing 2. Each rivet element 15 comprises an axially oriented shank 15a which extends axially through a cutout between the neighboring prongs 4b of the diaphragm spring 4 and can be partially surrounded by a shaped portion 13d provided on the adjacent tongue 13c of the diaphragm spring 13.

The diaphragm spring-shaped member or diaphragm spring 13 constitutes a sensor spring which generates an at least substantially constant force within a predetermined operating range. This sensor spring 13 serves to take up the clutch disengaging force which is being applied to the tips 4c of the prongs 4b in such a way that it establishes a continuous at least substantially unchanged state of equilibrium between the force which the disengaging means applies to the tilting seat 11 and the opposing force which the sensor spring 13 applies to the tilting seat 11. The disengaging force is that force which is applied to the tips 4c of the prongs 4b and hence to the disengaging levers for the prongs of the diaphragm spring 4 during actuation of the friction clutch 1 to thus oppose the bias of the sensor spring 13.

The tilting seat 12 is nearer to the housing 2 and is supported on the housing by an automatic adjusting device 16 which is installed in the axial space between the diaphragm spring 4 and the housing. The adjusting device 16 ensures that no undesirable clearance can develop between the tilting seat 12 and the housing 2 or between the tilting seat 12 and the diaphragm spring 4 in response to or during axial shifting of the tilting seats 11 and 12 in a direction toward the pressure plate 3 and hence in a direction toward the counterpressure plate 6. This, in turn, ensures that no undesirable idling or dead movements can develop during actuation of the friction clutch 1 to thus ensure optimum efficiency and hence a satisfactory operation of the friction clutch. Axial shifting of the tilting seats 11 and 12 takes place in response to axial wear upon the friction surfaces of the pressure plate 3 and the counterpressure plate 6 as well as in response to wear upon the friction linings 7. However, in friction clutches which embody the present invention, an adjustment can also take place in response to wear upon the tilting seats 11, 12, the adjacent portions of the diaphragm spring 4 (as seen in the axial direction) and in response to wear upon the diaphragm spring in the region of cams (shown at 3a) on the pressure plate or in response to wear upon the cams of the pressure plate. The mode of operation of the automatic adjusting device 16 for the tilting seat assembly 5 will be described again in detail with reference to the diagrams which are shown in FIGS. 24 to 27.

Figure 19:
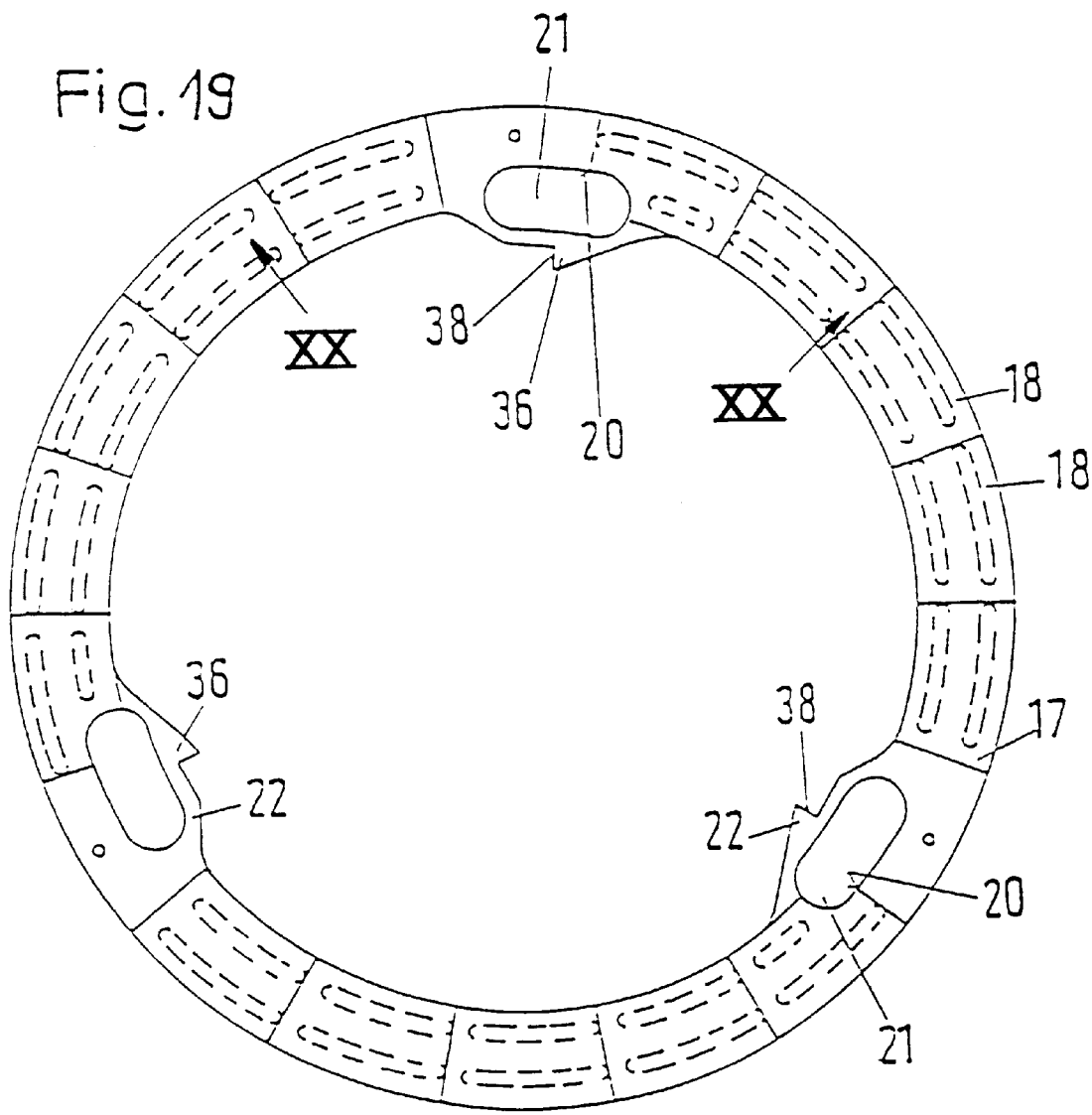
Figure 20:
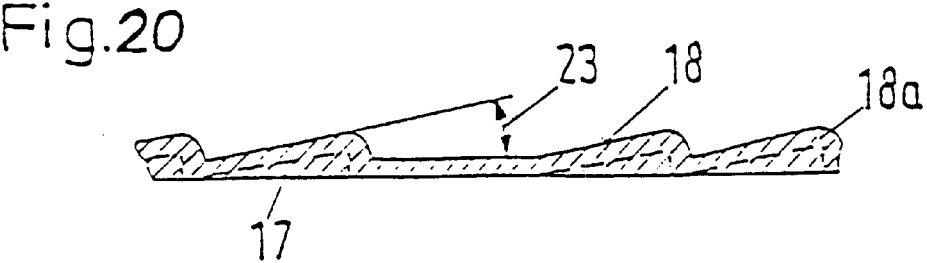

The adjusting device 16 comprises a spring-biased adjusting element in the form of a ring-shaped member 17 which is shown in FIGS. 19 and 20. The ring-shaped member 17 comprises sloping ramps 18 which extend in the circumferential direction and rise in the axial direction and are distributed in the circumferential direction of the element 17. The adjusting element 17 is installed in the clutch 1 in such a way that the sloping ramps 18 face the bottom wall 2a of the housing 2. The tilting seat 12 which constitutes a wire ring is centered in a groove-like socket 19 (FIG. 18) at that side of the adjusting element 17 which faces away from the sloping ramps 18. The socket 19 can be configured in such a way that the tilting seat 12 is secured to the adjusting element 17 also against movement in the axial direction. For example, this can be accomplished in that at least certain portions of that part of the adjusting ring 17 which is adjacent the socket 19 clampingly engage or retain the tilting seat 12 by snap action. If the tilting seat 12 and the adjusting element 17 are made of different materials, it is often advisable to compensate for differences between expansion coefficients of the parts 12 and 17 if the temperatures of the parts 12, 17 vary within a wide range. This can be accomplished by using a tilting seat 12 in the form of an open wire ring, i.e., a ring which is slotted at least at one point as seen in the circumferential direction, to thus facilitate a movement of the wire ring 12 relative to the socket 19 in the circumferential direction so that the wire ring 12 can conform to changes of the diameter of the socket 19.

In the illustrated embodiment, the adjusting element 17 is made of a synthetic material, such as for example a temperature-resistant thermoplastic material, and can be reinforced by fibers. This renders it possible to simplify the mass-production of adjusting elements 17 each of which can constitute an extrusion. As already mentioned before, an adjusting element which is made of a synthetic material having a low specific weight has a low mass moment of inertia which reduces its sensitivity to pressure-induced vibrations. The tilting seat assembly could also simply constitute a ring of synthetic material. However, it is also possible to employ an adjusting element 17 which is a shaped article made of metallic sheet material or such element can constitute a sintered product. Furthermore, and by properly selecting the materials, the tilting seat 12 can be made of one piece with the adjusting element 17. The tilting seat 11 can directly constitute a part of the sensor spring 13. To this end, the tongues 13c can be provided with suitable formations, such as for example beads.

The adjusting ring 17 is centered by the axially oriented shanks 15a of the rivets 15 which are uniformly distributed along its circumference. To this end, the adjusting ring 17 is provided with centering formations 20 constituted by recesses 21 extending in the circumferential direction and being located radially inwardly of the tilting seat 11. In order to define the recesses 21, the radially inner marginal portion of the adjusting ring 17 is provided with radially inwardly extending lobes 22 which bound the radially inner portions of the recesses 21.

Figure 22:
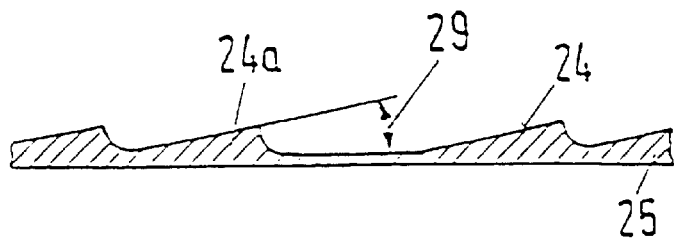
Figure 21:
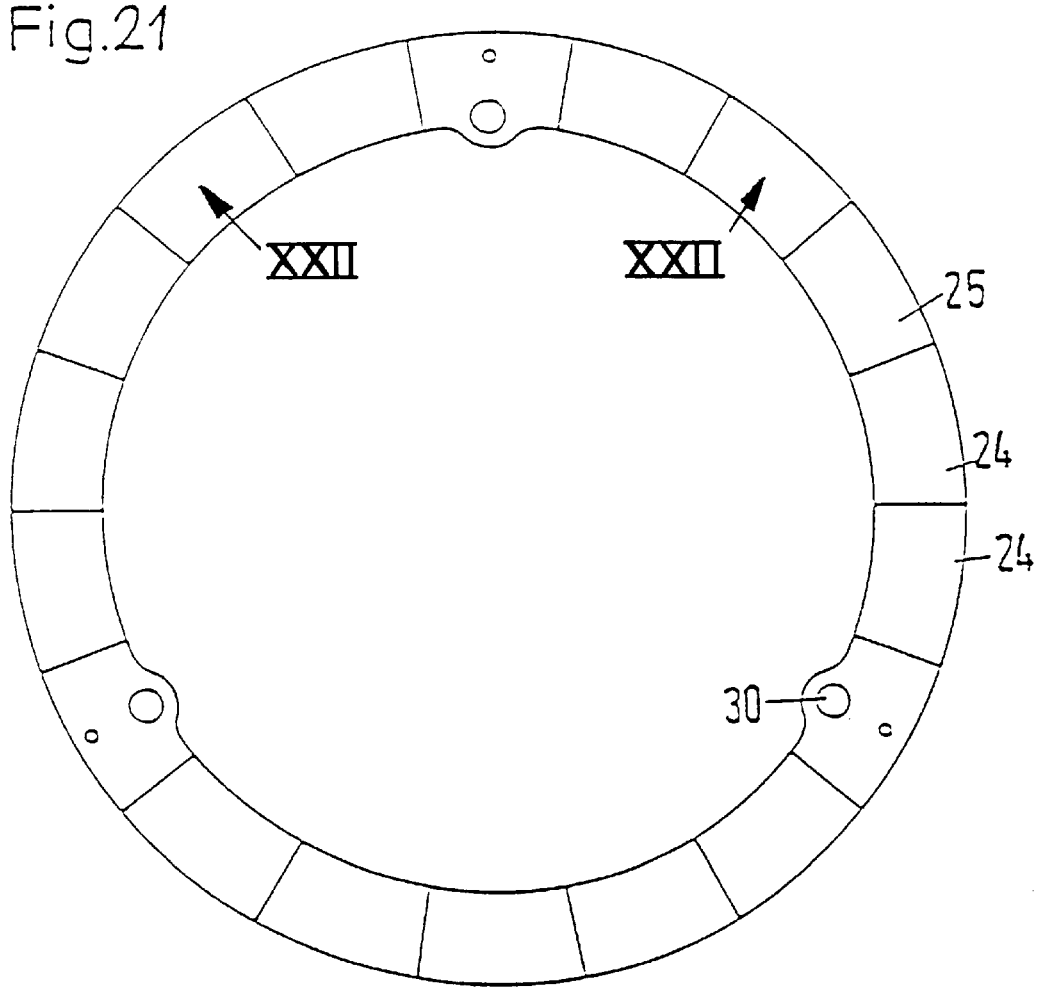

As can be seen in FIG. 19, the recesses 21 are uniformly distributed in the circumferential direction of the adjusting element 17 and five sloping ramps 18 are provided between each pair of neighboring recesses. The recesses 21 are configurated in such a way, as seen in the circumferential direction, that they enable the adjusting ring 17 to turn relative to the housing 2 through an angle which suffices to guarantee a compensation for wear upon the pressure plate 3 and the counterpressure plate 6 as well as upon the friction linings 7 and, if necessary, for wear upon the clutch proper, such as for example the seats 11, 12, those portions of the diaphragm spring 4 which are disposed between the seats, the projection or projections (3a) of the pressure plate 3 or those portions of the diaphragm spring 4 which confront the projections 3a, during the entire useful life of the friction clutch 1. Depending upon the design of the sloping ramps 18, the aforementioned angle of adjustment can be in the range of between 8° and 60°, preferably in the range of between 10° and 30°. In the illustrated embodiment, this angle of possible angular displacement of the adjusting element 17 is approximately 12° and the angle of slope 23 of sloping ramps 18 is also at least close to 12°. This angle 23 is selected in such a way that, when the sloping ramps 18 of the adjusting ring 17 are urged against the complementary ramps 24 of a supporting ring 25 which is shown in FIGS. 21 and 22, the friction which develops between the ramps 18 and 24 prevents slippage of the two sets of ramps relative to each other. Depending on the material of the ramps 18 and 24 at the surfaces of contact, the angle 23 can be in the range of between 4° and 20°.

The adjusting ring 17 is spring biased in the circumferential direction, namely in the direction of adjustment which is the direction causing the ramps 18 to move relative to the complementary ramps 24 of the supporting ring 25 so as to move the adjusting ring 17 in a direction toward the pressure plate 3, i.e., axially and away from the radially extending housing portion or bottom wall 2a. In the embodiment which is illustrated in FIGS. 17 and 18, the adjusting ring 17 is biased in the circumferential direction by at least one ring-shaped torsion spring 26 which can comprise, for example, two convolutions, a radially extending leg 27 disposed at one end of the torsion spring and non-rotatably connected with the adjusting ring 17, and an axially extending leg 28 disposed at the other end and being non-rotatably anchored in the housing 2. The spring 26 is installed in resiliently stressed condition.

The supporting ring 25 which is shown in FIGS. 21 and 22 also constitutes a ring-shaped part which is provided with ramps 24 having surfaces complementary to and opposing the surfaces defined by the sloping ramps 18. The surfaces which are defined by the sloping ramps 18 and the opposing ramps 24 can also be congruent surfaces. The angle of slope 29 of each opposing ramp 24 corresponds to the angle of slope 23 of each sloping ramp 18. As can be ascertained by a comparison of the structures shown in FIGS. 19 and 21, the distribution of the sloping ramps 18 in the circumferential direction is similar to the distribution of the opposing ramps 24. The supporting ring 25 is non-rotatably connected with the housing 2. To this end, the supporting ring 25 is provided with circumferentially distributed holes 30 through which the adjoining portions of the rivets 15 extend.

A further ring-shaped torsion spring 26a is indicated in FIG. 18 by broken lines. The end portions of the spring 26a can be bent in a manner similar to that of end portions of the torsion spring 26 to establish a non-rotatable connection with the housing 2 on the one hand and with the adjusting element 17 on the other hand. This spring 26a is also installed in stressed condition so that it applies to the adjusting element 17 a force tending to turn the adjusting element. The utilization of two torsion springs 26, 26a can be of advantage for many applications because, when the friction clutch 1 rotates, the springs 26, 26a are acted upon by centrifugal force which enhances the spring force. Thus, by utilizing two torsion springs, the increased spring force of, for example, the spring 26 can be compensated for by the force which is supplied by the torsion spring 26a. To this end, the torsion springs 26 and 26a are coiled in such a way that they apply to the adjusting element 17 forces at least when acted upon by centrifugal force whereby the forces generated by the two torsion springs oppose each other. Each of the torsion springs 26, 26a can have one or more convolutions and these torsion springs 26, 26a can have different convolution diameters, as actually shown in FIG. 18, so that the centrifugal forces which normally develop and act upon the springs 26, 26a and which would generate larger and smaller circumferential forces acting upon the adjusting element 17 can be at least substantially balanced by appropriate selection of the thickness of the wire of the torsion springs and/or by appropriate selection of the number of windings forming part of the springs 26 and 26a. FIG. 18 shows that the spring 26 is disposed radially inwardly and the spring 26a is disposed radially outwardly of the periphery 17a of the adjusting element 17. However, by properly selecting their parameters, each of these springs can be installed radially inwardly or radially outwardly of the adjusting element 17.

FIG. 23 is a plan view of the torsion spring 26. When the torsion spring 26 is unstressed, the legs 27, 28 define an angle 31 whose magnitude is in the range of between 40° and 120°. In the illustrated embodiment, this angle 31 is approximately 86°. The character 32 denotes that position of the leg 27 relative to the leg 28 which the leg 27 assumes when the friction linings 7 in the friction clutch 1 are new. The character 33 denotes that position of the leg 27 which corresponds to the maximum permissible wear upon the friction linings 7. In the illustrated embodiment, the adjustment angle 34 approximates 12°. The spring 26 is designed in such a way that, when it is unstressed, only one wire convolution 35 is disposed between the two legs 27, 28. Two wire convolutions axially overlie each other along the remaining portion of the circumference of the spring 26. The spring 26a is similar to the spring 26 but the diameters of its convolutions are larger and the spring 26a is stressed in a different direction relative to the adjusting element 17 of FIG. 18. However, the force which the spring 26 applies to the adjusting ring 17 is larger than that which is being applied by the spring 26a.

When the friction clutch 1 is new, the crests 18a, 24a which respectively constitute the sloping ramps 18 and the opposing ramps 24 are in mesh with each other to a maximum extent, i.e., the axial space which is required by the abutting rings 17 and 25 is at a minimum value.

In the embodiment of FIGS. 17 and 18, the opposing ramps 24 and the cam-shaped crests 24a of the ramps 24 constitute a separate part. However, it is also possible to provide the opposing ramps 24 directly on the housing 2, for example, by stamping cam-shaped projections which extend into the interior of the housing. Stamping is of particular advantage if the housing or cover 2 is made of a single piece of metallic sheet material.

In order to hold the adjusting ring 17 in its retracted position prior to mounting of the friction clutch 1, the ring 17 is provided with locating portions 36 having shoulders 38 which are disposed at the cams 22 and can be engaged by turning or restraining means which abut the housing 2. Such restraining means can be provided at the time of making or during assembly of the friction clutch 1 and are removed upon completed assembly of the friction clutch on the flywheel 6 to thus activate the adjusting device 16. To this end, the housing or cover 2 is provided with circumferentially extending slots 37 and the adjusting ring 17 is provided with a depression or shoulder 38. The circumferentially extending elongated slots 37 must have a length such as to enable the adjusting ring 17 to be turned back through an angle corresponding to the maximum required angle of adjustment to compensate for wear. It is also possible to employ a turning tool which is caused to pass through the slots 37 of the housing 2 upon completed assembly of the friction clutch 1 and is advanced toward the depressions 38 of the adjusting ring 17. It is then possible to turn the ring 17 back by resorting to such tool whereby the ring 17 is moved toward the radial portion or bottom wall 2a of the housing 2 to assume an axial position at a minimum distance from the housing portion 2a. The ring 17 is thereupon secured in such position, for example, with a clamp or pin which extends into registering holes 2b of the housing 2 and registering holes of the adjusting ring 17 to prevent such parts from turning relative to each other. The pin or clamp can be removed from the registering holes upon completed mounting of the friction clutch 1 onto the flywheel 6 so that, and as already mentioned above, the adjusting device 16 is released for operation. The slots 37 of the housing 2 are configured and dimensioned in such a way that the adjusting ring 17 can be moved back to its retracted position prior to or upon completion of detachment of the friction clutch 1 from the flywheel 6. To this end, the clutch is disengaged in a first step so that the actuating diaphragm spring 4 does not apply any axial force against the tilting seat 12 to thus permit convenient turning of the adjusting ring 17.

A further possibility of moving the component parts of a friction clutch 1 which is already mounted on a combustion engine to operative positions is that the adjusting element or adjusting ring 17 is turned back or that this ring is reset only subsequent to mounting of the clutch on a combustion engine or on a flywheel. To this end, one can employ for example an auxiliary tool to actuate the friction clutch 1 prior to rotating the thus at least substantially released ring 17 relative to the pressure plate 3 to its retracted position. The friction clutch 1 is thereupon reengaged so that the ring 17 at first remains in the retracted position.

The ring-shaped adjusting element 17 and/or the supporting ring 25 can each have two sets of sloping ramps with one set located radially outwardly of the other set, with each ramp sloping in the axial direction and with the ramps of each set distributed in the circumferential direction of the element 17 and/or ring 25. The radially inner sloping ramps can be offset in the circumferential direction with reference to the respective radially outer sloping ramps, namely by approximately one-half the length of a ramp or a ramp pitch. Such staggering of ramps in the circumferential direction ensures accurate centering and guidance of the adjusting element 17 and the supporting ring 25 relative to each other.

The mode of operation of the aforedescribed friction clutch will be explained in greater detail hereinafter with reference to the characteristic curves shown in the diagrams of FIGS. 24 to 27.

Figure 24:
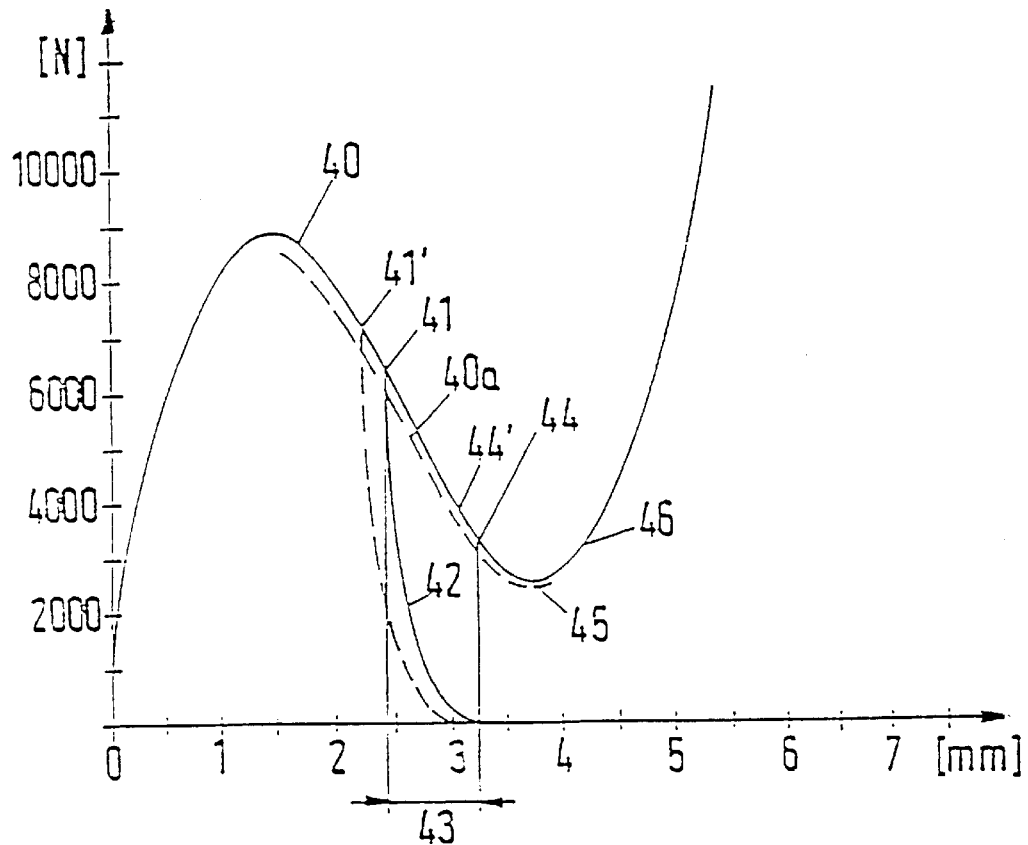

The curve 40 which is shown in FIG. 24 denotes the axial force which is generated by the diaphragm spring 4 as a function of changes of conicity of the spring 4, namely during deformation of the diaphragm spring 4 between two abutments whose radial distance from each other corresponds to radial distance between the tilting seat assembly 5 and the radially outer abutment diameter (at 3a) of the pressure plate 3. The relative axial distance between the two abutments is plotted along the abscissa and the force which is generated by the diaphragm spring 4 is plotted along the ordinate. The point 41 of the curve 40 denotes the flat position of the diaphragm spring which preferably corresponds to that position which the diaphragm spring assumes during installation into an engaged clutch 1, i.e., that position of the diaphragm spring 4 at which this spring applies a maximum force to the pressure plate 3 in the engaged condition of the clutch. The point 41 can be moved along the curve 40 upwardly or downwardly by changing the conicity, i.e., the initial position, of the diaphragm spring 4.

The curve 42 denotes the axial spreading force which is furnished by the spring segments 10 between the two friction linings 7. Such axial spreading force opposes the axial force which the diaphragm spring 4 applies to the pressure plate 3. It is of advantage if the axial force which is needed for maximum possible elastic deformation of the spring segments 10 at least matches the force which the diaphragm spring 4 applies to the pressure plate 3. The spring segments 10 dissipate energy during disengagement of the friction clutch 1 and the distance covered by the spring segments during dissipation of energy is shown at 43. The distance 43 denotes the extent of axial movement of the pressure plate 3 and, during such movement, the spring segments 10 participate in the disengagement of the clutch 1, i.e., it is necessary to apply a lesser maximum disengaging force than that which would correspond to the point 41 of the curve 40 in the absence of the spring segments 10 for the friction linings 7 (i.e., in the absence of means for biasing the two sets of friction linings apart). The friction linings 7 are released when the point 44 of the curve 40 is exceeded and, due to the degressive portion of the characteristic curve 40 of the diaphragm spring 4, the still necessary disengaging force is greatly reduced as compared with that force which would correspond to the point 41. The disengaging force for the clutch 1 continues to decrease until it reaches the value denoted by the lowermost portion 45 of the sinusoidal characteristic curve 40. When the minimum 45 is exceeded, the required disengaging force begins to increase and the extent of disengaging movement in the region of the tips 4c of the prongs 4b of the diaphragm spring 4 is selected in such a way that, even if the minimum 45 is exceeded, the disengaging force does not exceed the maximum disengaging force corresponding to that at the point 44, and is preferably less. Thus, the point 46 of the curve 40 should not be exceeded.

The distance-force progress of the spring 13 which constitutes a force sensor is denoted by the curve 47 in FIG. 25. This characteristic curve 47 corresponds to that which is generated when the conicity of the diaphragm spring-shaped part 13 changes in response to stressing of the spring 13, namely between two tilting seats installed at a radial distance corresponding to the radial distance between the tilting seat 11 and the fulcrum 14 for the sensor spring 13. As indicated by the characteristic curve 47, the movement of the diaphragm spring-shaped part 13 includes a spring travel 48 during which the axial force which is generated by the spring 13 remains practically unchanged. The force which is generated during spring travel 48 is selected in such a way that it at least substantially approximates the disengaging force at the point 44 of the curve 40 shown in FIG. 24. The supporting force which is to be generated by the sensor spring 13 is reduced in comparison with the force generated by the diaphragm spring 4 at the point 44 to an extent corresponding to the lever arm of the diaphragm spring 4. In most instances, such transmission ratio is between 1:3 and 1:5 but can be larger or smaller in many instances.

The aforementioned transmission ratio corresponds to that between the radial distance of the tilting seat assembly 5 from the projection or projections 3a and the radial distance of the tilting seat assembly 5 from the diameter of the circle formed by the tips 4c to establish a contact area, e.g., for a disengaging bearing.

The installed position of the diaphragm spring-shaped element 13 in the friction clutch 1 is selected in such a way that the element 13 can carry out, in the region of the tilting seat assembly 5, an axial spring travel which at least matches the extent of axial adjustment travel of the pressure plate 3 in a direction toward the counterpressure plate 6 in order to compensate for wear upon the friction surfaces and upon the friction linings 7, and which ensures the application of an at least substantially constant axial supporting force for the tilting seat assembly 5. This means that the linear portion 48 of the characteristic curve 47 has a length not less than that corresponding to the aforementioned wear compensating distance and preferably exceeds such distance because this renders it possible to at least partially compensate for tolerances due to mounting of the friction clutch.

In order to obtain a practically unchanged or predetermined release point 44 for the friction linings 7 during disengagement of the friction clutch 1, it is possible to employ between the friction linings 7 a so-called twin segmental spring assembly, namely an assembly wherein pairs of resilient segments are disposed back-to-back and the individual pairs of segments can be installed in an axially stressed condition of selected magnitude. Due to prestressing of the resilient means between the friction linings, it is possible to at least substantially counteract or compensate for losses which are due to penetration or embedding of the segments into the adjacent rear sides of the friction linings and which develop when the friction clutch is being operated. The losses due to embedding are those losses which are attributable to penetration of the segments into the rear sides of the friction linings. By properly limiting the extent of axial spring travel between the two sets of friction linings 7, and by applying to the spring assembly between the friction linings a predetermined initial stress, one can further ensure that the spring assembly between the friction linings pushes the pressure plate 3 back through the predetermined distance 43 during each disengagement of the friction clutch 1. In order to achieve such predetermined distance 43, the axial movement of the two sets of friction linings 7 relative to each other can be determined by suitable stops not only in the direction of disengagement but also in the direction to stress the spring assembly 10 for the friction linings. Spring assemblies for friction linings which can be utilized with advantage in practicing the present invention are those which are disclosed, for example, in the German patent application No. P 42 06 880.0 (corresponding to published German patent application No. 43 00 665 and U.S. Pat. No. 5,413,202 granted May 9, 1995 to Maucher).

Figure 26:
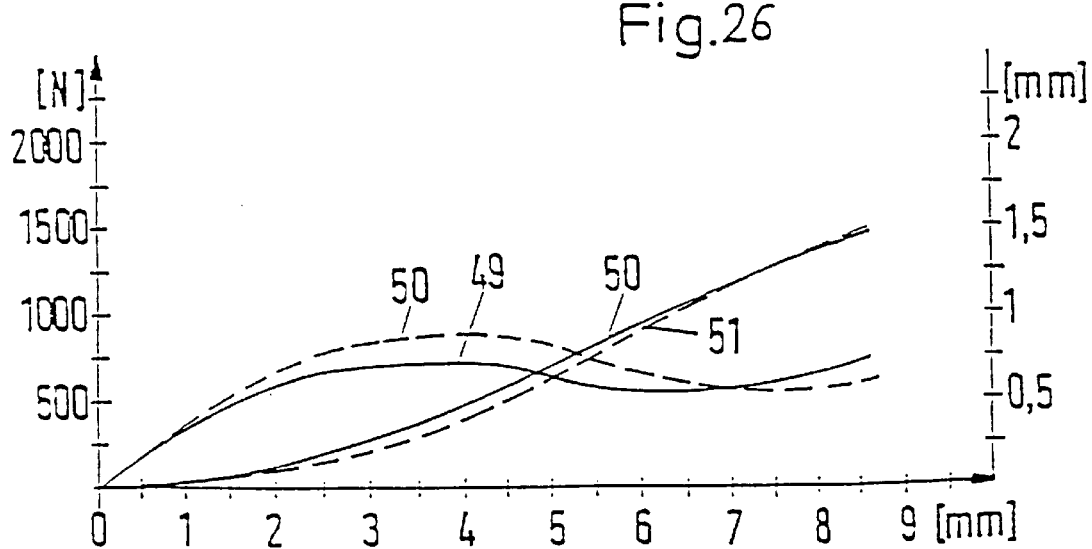

FIG. 26 shows a curve 49 denoting the force which is required to disengage the clutch by a disengaging element which acts in the region of the tips 4c of the prongs 4b of the diaphragm spring 4 in order to move the pressure plate 3 from the point 41 to the point 44 (FIG. 24). The curve 49 further denotes the travel of the tips 4c of prongs 4b forming part of the diaphragm spring 4.

In order to ensure optimum operation of the friction clutch 1 and to also ensure that the adjusting device 16 can automatically compensate for wear upon the friction linings, it is advisable that—during the actually developing progress of force as denoted by the curve 49 in FIG. 26—the sum of forces which the spring assembly 10 for the friction linings 7 and the sensor spring 13 apply to the diaphragm spring 4 exceeds the force which the diaphragm spring 4 applies to the seat 11. Furthermore, the bias which the sensor spring 13 applies to the diaphragm spring 4 upon disengagement of the pressure plate 3 from the friction linings 7 should exceed or at least match the disengaging force (as denoted by the curve 49) which acts in the region of the tips 4c of prongs 4b of the diaphragm spring 4, which is to be applied during disengagement of the friction clutch and which varies in a manner as shown in FIG. 26. Furthermore, the force which the sensor diaphragm spring 13 then applies to the seat 11 should be selected in such a way that the ring 17, which is acted upon by the torsion spring 26, cannot turn and accordingly, the diaphragm spring 4 cannot be displaced in the axial direction at least substantially until the point 41 of the upwardly sloping portion of the characteristic curve 40—such point denotes the installed position of the diaphragm spring—is not exceeded.

The above considerations relate to an exactly predetermined installed position of the diaphragm spring 4 without, as yet, taking into consideration the wear upon the friction linings 7.

If, for example, the friction linings 7 have undergone axial wear, the position of the pressure plate 3 is shifted in a direction toward the counterpressure plate 6 and this entails a change of conicity of the diaphragm spring 4 (the tips 4c of the prongs 4b of the spring 4 migrate in a direction to the right, as seen in FIG. 18) which, in turn, entails a change of the biasing force which the diaphragm spring 4 applies in the engaged condition of the friction clutch 1, i.e., the bias of the spring 4 increases. Such change of spring bias causes that the point 41 of the characteristic curve 40 migrates toward the point 41' and the point 44 migrates toward the point 44'. Furthermore, such change of bias of the spring 4 disturbs the equilibrium of forces between the diaphragm spring 4 and the sensor spring 13 in the region of the tilting seat 11 which equilibrium of forces originally existed during disengagement of the clutch 1. The increase of the bias of the diaphragm spring 4 upon the pressure plate 3 which was caused by wear upon the friction linings 7 results in a shifting of the progress of the disengaging force in an upward direction. The thus developed progress of the disengaging force is denoted in FIG. 26 by a broken line 50. As a result of the rise of the disengaging force, the axial force which the sensor spring 13 applies to the diaphragm spring 4 during disengagement of the friction clutch 1 is overcome and the sensor spring 13 yields in the region of the tilting seat assembly 5 by an axial distance which corresponds essentially to the extent of wear upon the friction linings 7. During the just described stage of operation of the sensor spring 13, the diaphragm spring 4 abuts the engagement portion or portions 3a of the pressure plate 3 so that the conicity of the diaphragm spring 4 is changed with attendant change of the amounts of energy and torque stored by the diaphragm spring 4 and, consequently, also the magnitude of the force which the diaphragm spring 4 applies to the tilting seat 11 as well as the bias of the sensor spring 13 against the pressure plate 3. As can be seen by referring to FIG. 24, such changes take place in a sense to reduce the magnitude of the force which the diaphragm spring 4 applies to the pressure plate 3. The just described change continues to take place until the axial force which the diaphragm spring 4 applies to the sensor spring 13 in the region of the tilting seat 11 matches the opposing force which is being generated by the sensor spring 13. This means that, and referring again to the diagram of FIG. 24, the points 41' and 44' migrate in directions toward the points 41 and 44, respectively. Upon completed establishment of the aforementioned equilibrium of forces, the pressure plate 3 is free to become disengaged from the friction linings 7. During the aforedescribed stage of adjustment to compensate for wear, namely when the sensor spring 13 is in the process of yielding during disengagement of the friction clutch 1, the adjusting element 17 of the adjusting device 16 turns in response to the bias of the stressed spring 26 whereby the tilting seat 12 shifts its axial position to an extent corresponding to the extent of wear upon the friction linings 7 to thus again ensure a clearance-free positioning of the tilting seat assembly 5 for the diaphragm spring 4. When the adjusting step is completed, the progress of the disengaging force again corresponds to that denoted by the curve 49 in the diagram of FIG. 26. The curves 50 and 51 denote in FIG. 26 the axial movements of the pressure plate 3 when the disengaging force to distance ratio corresponds to those denoted by the curves 49 and 50, respectively.

The diagram of FIG. 27 illustrates the progress of the force, in relation to the extent of movement during disengagement, which is being applied to the housing 2 and/or to the diaphragm spring 13 during disengagement of the clutch. The extreme values of the curve have been deleted. Starting with the engaged condition as shown in FIG. 17, the force first acting upon the housing 2 and hence also upon the pressure plate 3 corresponds to that of the diaphragm spring 4 at the installation point 41 (FIG. 24). In the course of disengagement of the clutch, axial bias of the diaphragm spring 4 upon the housing 2 and the tilting seat 12 decreases in a manner as denoted by the curve 52 in the diagram of FIG. 27 and down to the point 53. If the point 53 were exceeded in a direction toward disengagement in a conventional clutch wherein the diaphragm spring is tiltable at a fixed location of the housing, i.e., if the tilting seat 11 were not yieldable in the axial direction relative to the clutch housing, this would entail a reversal in the direction of application of force by the diaphragm spring 4 to the housing 2 at the radial level of the tilting seat assembly 5. In the novel clutch, the force which is generated as a result of axial reversal of the force generated by the diaphragm spring 4 in the region of the tilting seat assembly 5 is counteracted by the sensor spring 13. When the point 54 is reached, the diaphragm spring 4 no longer contacts the biasing portion or portions 3a of the pressure plate 3. At least to such point 54, the axial force which is furnished by the springs 10 for the friction linings 7 assists in the disengagement of the friction clutch 1 because such axial force opposes the bias of the diaphragm spring 4. The force which is applied by the springs 10 for the friction linings 7 decreases as the disengaging movement proceeds and while the extent of disengaging movement in the region of the tips 4c of the prongs 4b of the diaphragm spring 4 and as the extent of axial movement of the pressure plate 3 in the direction of disengagement of the clutch 1 increases. Thus, the curve 52 denotes on the one hand the resultant of the disengaging force which acts in the region of the tips 4c of the prongs 4b of the diaphragm spring 4 in the course of the disengaging operation and on the other hand of the axial force which is being applied by the springs 10 for the friction linings 7 upon the diaphragm spring 4 in the radial region of 3a. When the point 54 is exceeded in the direction of disengagement, the axial force which the diaphragm spring 4 applies to the tilting seat 11 is taken up by the opposing force which is furnished by the sensor diaphragm spring 13, and such forces are in a state of equilibrium at least after relaxation of pressure upon the friction linings 7 and, as the disengaging operation continues, the axial force which is being applied by the sensor spring 13 in the region of the tilting seat assembly 5 at least slightly exceeds the then existing axial force. The portion 55 of the characteristic curve 52 in the diagram of FIG. 27 indicates that, as the disengaging movement proceeds, the disengaging force or the force which the diaphragm spring 4 applies to the tilting seat 11 decreases as compared with the disengaging force at the point 54. The broken line 56 denotes in FIG. 27 a condition of the friction clutch 1 in which a certain amount of wear has developed upon the friction linings 7 but prior to an adjustment in the region of the tilting seat assembly 5. FIG. 27 also shows that the change of the position of the diaphragm spring 4 as a consequence of wear upon the friction linings effects an increase of the forces acting upon the housing 2, the tilting seat 11 and/or the sensor spring 13. An important consequence of such increase of forces acting upon the housing 2, seat 11 and/or sensor spring 13 is that the point 54 migrates in a direction toward the point 54' with the result that, in response to the next-following disengagement of the friction clutch 1, the axial force which the diaphragm spring 4 applies to the sensor spring 13 in the region of the tilting seat 11 exceeds the opposing force of the sensor spring 13 which entails the aforedescribed adjusting operation as a result of axial movement of the sensor spring 13. The adjusting operation which is then carried out by the torsion spring 26, i.e., rotation of the ring 17 and the resulting axial shifting of the seat 12, entails that the point 54' moves in a direction toward the point 54 to thus reestablish the desired state of equilibrium between the diaphragm spring 4 and the sensor spring 13 in the region of the tilting seat assembly 5.

In actual practice, the aforedescribed adjustment takes place continuously, i.e., in very small steps so that the large movements of various points of characteristic curves and the large shifting of the characteristic curves shown in the diagrams of FIGS. 24 to 27 normally do not take place.

Certain operating parameters or operating points can be displaced or can change during the useful life of the friction clutch 1. For example, improper actuation of the friction clutch 1 can result in overheating of the springs 10 for the friction linings 7 which, in turn, can entail a setting—i.e., a reduction of axial resiliency—of axial springiness of the springs for the friction linings such as the segments 10 for the friction linings. However, reliable operation of the friction clutch 1 can be ensured by properly selecting the characteristic curve 40 of the diaphragm spring 4 and by properly conforming the progress 47 of the bias of the sensor spring 13. An axial setting of the springs 10 for the friction linings 7 would merely entail that the diaphragm spring 4 would assume a position of greater deformation than that shown in FIG. 17 and the bias of the diaphragm spring 4 upon the pressure plate 3 would be somewhat less than that denoted by the characteristic curve 40 of FIG. 24. Furthermore, the sensor spring 13 would undergo a commensurate axial deformation which would result in corresponding axial displacement of the tilting seat 11.

In accordance with a further inventive concept, the resultant supporting force which acts upon the actuating diaphragm spring 4 can rise in response to increasing wear upon the friction linings 7. Such rise can be limited to a portion of the maximum permissible wear upon the friction linings 7. The rise of the supporting force can be achieved by proper selection of the parameters of the actuating diaphragm spring 4. FIG. 25 shows by broken lines the progress of a corresponding characteristic curve which is denoted by the character 47a and extends within the distance 48. By increasing the supporting force for the actuating diaphragm spring 4 in response to increasing wear, it is possible to compensate, at least in part, for a reduction of the bias of the diaphragm spring 4 upon the pressure plate 3 due to a reduction of the effectiveness of the springs for the friction linings, e.g., due to embedding of the spring segments 10 into the friction linings 7. It can be of particular advantage if the supporting force for the actuating diaphragm spring 4 rises proportionally with penetration of the spring segments into the friction linings. This means that the aforementioned supporting force should rise in response to a reduction of the thickness of the plates 3, 6 in the region of the friction linings 7, i.e., in response to a reduction of the distance between the friction surfaces of the friction linings due to embedding of the spring segments therein and/or due to a setting of the springs 10 for the friction linings 7 and/or due to wear upon the friction linings. It is of particular advantage if the force increases in such a way that the rise is more pronounced within a first range and is less pronounced within the next-following second range, both such ranges being within the distance or zone 48 which is shown in FIG. 25. The just described design exhibits the advantage that the major part of the aforementioned embedding of the spring segments into the friction linings takes place primarily within a relatively short portion of the useful life of the friction clutch and the relationship of the spring segments and the friction linings thereupon remains substantially stable. This means that, starting from a predetermined penetration or embedding, no appreciable further changes of the extent of embedding will take place. It is also possible to cause the supporting force for the actuating diaphragm spring 4 to rise at least during a portion of the period of wear upon the friction linings 7.

The preceding description of an adjusting operation to compensate for wear upon the friction linings 7 was made without taking into consideration the axial forces which are or which can be applied by the leaf springs 9. If the leaf springs 9 are stressed in a sense to urge the pressure plate 3 away from the adjacent friction lining 7, i.e., in a direction to urge the pressure plate 3 against the diaphragm spring 4, this causes the leaf springs to assist the disengagement of the friction clutch. The axial force which is furnished by the leaf springs 9 is superimposed upon the forces which are being applied by the sensor spring 13 and diaphragm spring 4 as well as upon the disengaging force upon the tips 4c. For the purpose of facilitating the understanding of the operation of the improved clutch, the axial force of the leaf springs 9 was not taken into consideration during the preceding description of the diagrams which are shown in FIGS. 24 to 27. The sum of forces which urge the actuating diaphragm spring 4 against the tilting seat 12 adjacent the clutch housing 2 in disengaged condition of the friction clutch 1 is obtained by adding up the forces which are being exerted mainly by the leaf spring elements 9, the sensor spring 13 and the applied disengaging force at 4c and act upon the actuating diaphragm spring 4. The leaf spring elements 9 can be installed between the housing 2 and the pressure plate 3 in such a way that the axial force which the leaf springs 9 apply to the actuating diaphragm spring 4 increases in response to increasing wear upon the friction linings 7. Thus, and referring to FIG. 25, the axial force which is being applied by the leaf springs 9 can progress in a manner as indicated by the curve 47b, for example within the distance 48 and hence during movement of the adjusting device 16 to compensate for wear. FIG. 25 also shows that, as the deformation of the sensor spring 13 increases, the restoring force applied by the leaf springs 9 and acting upon the actuating diaphragm spring 4 increases. By adding the force denoted by the characteristic curve 47a and the force denoting the characteristic curve of the diaphragm spring 4, one obtains a resultant force which acts upon the diaphragm spring 4 in the axial direction, namely in a sense to urge the diaphragm spring 4 against that tilting seat 12 which is nearer to the housing 2. In order to achieve a progress of force as denoted by the characteristic curve 47a, namely that an initial increase of the force takes place at the starting point of the adjustment range 47d with subsequent transition into a substantially constant region, it is advisable to design the sensor spring 13 in such a way that its characteristic curve progresses in a manner as denoted by the curve 47c shown in FIG. 25. By combining the progress of force whose characteristic curve is shown at 47c with the progress of force whose characteristic curve is shown at 47b, one obtains a force having the characteristic curve 47a. Thus, by properly stressing the leaf springs 9, it is possible to reduce the magnitude of the force which is to be furnished by the sensor spring 13 or, otherwise stated, it is possible to reduce the supporting force. Furthermore, by properly designing and installing the leaf springs 9, it is possible to compensate, at least in part, for a reduction of the bias of the springs for the friction linings and/or for embedding of the spring segments 10 into the friction linings 7. Thus, it is possible to ensure, in a manner as outlined above, that the operating point and that the operating range of the diaphragm spring 4 remains essentially unchanged so that the diaphragm spring applies to the pressure plate 3 an at least substantially unchanged bias during the useful life of the friction clutch 1. It is further necessary or desirable to take into consideration, in designing the friction clutch 1 and especially the sensor spring 13 and/or the leaf springs 9, the resultant axial force which is generated by the adjusting spring 26 and/or 26a and which opposes the bias of the sensor spring 13 and/or the bias of the leaf springs 9.

In designing the friction clutch I with leaf springs 9 which are installed in stressed condition, it is necessary to take into consideration that the prestressing of the leaf springs 9 entails the generation of an axial force which the pressure plate 3 exerts upon the friction linings 7. Thus, if the leaf springs 9 are stressed in a direction toward the actuating diaphragm spring 4, the biasing force which is generated by the diaphragm spring 4 is reduced to an extent corresponding to the initial bias of the leaf springs 9. Accordingly, if the friction clutch 1 is assembled in the just outlined manner, the pressure plate 3 and the friction linings 7 are biased by a resultant of the force which is applied by the diaphragm spring 4 and the force which develops as a result of prestressing of the leaf springs 9. If it is now assumed that—as considered within the operating range of the friction clutch 1—the characteristic curve 40 in the diagram of FIG. 24 denotes a force which is a resultant of the force supplied by the diaphragm spring 4 and the prestressed leaf springs 9 while the friction clutch 1 is still new, a reduction of the distance between the pressure plate 3 and the counterpressure plate 6 due to wear upon the friction linings 7 would entail a shifting of the thus obtained progress of force in a direction toward a reduction of such force. FIG. 24 shows a broken-line characteristic curve 40a which corresponds, by way of example, to a total wear upon the friction linings 9 in the range of 1.5 mm. Such shifting of the characteristic curve 40 to constitute the curve 40a takes place during the useful life of the friction clutch 1 and entails a reduction of the axial force which the diaphragm spring 4 applies to the sensor spring 13 during disengagement of the friction clutch because progressing wear upon the friction linings 7 results in the development of an opposing moment which is applied by the leaf springs 9 to the diaphragm spring 4. Such opposing moment develops and exists due to the presence of a radial distance between the tilting seat assembly 5 and the diameter of that portion or those portions 3a of the pressure plate 3 which is or are in contact with the diaphragm spring 4.

Figure 28:
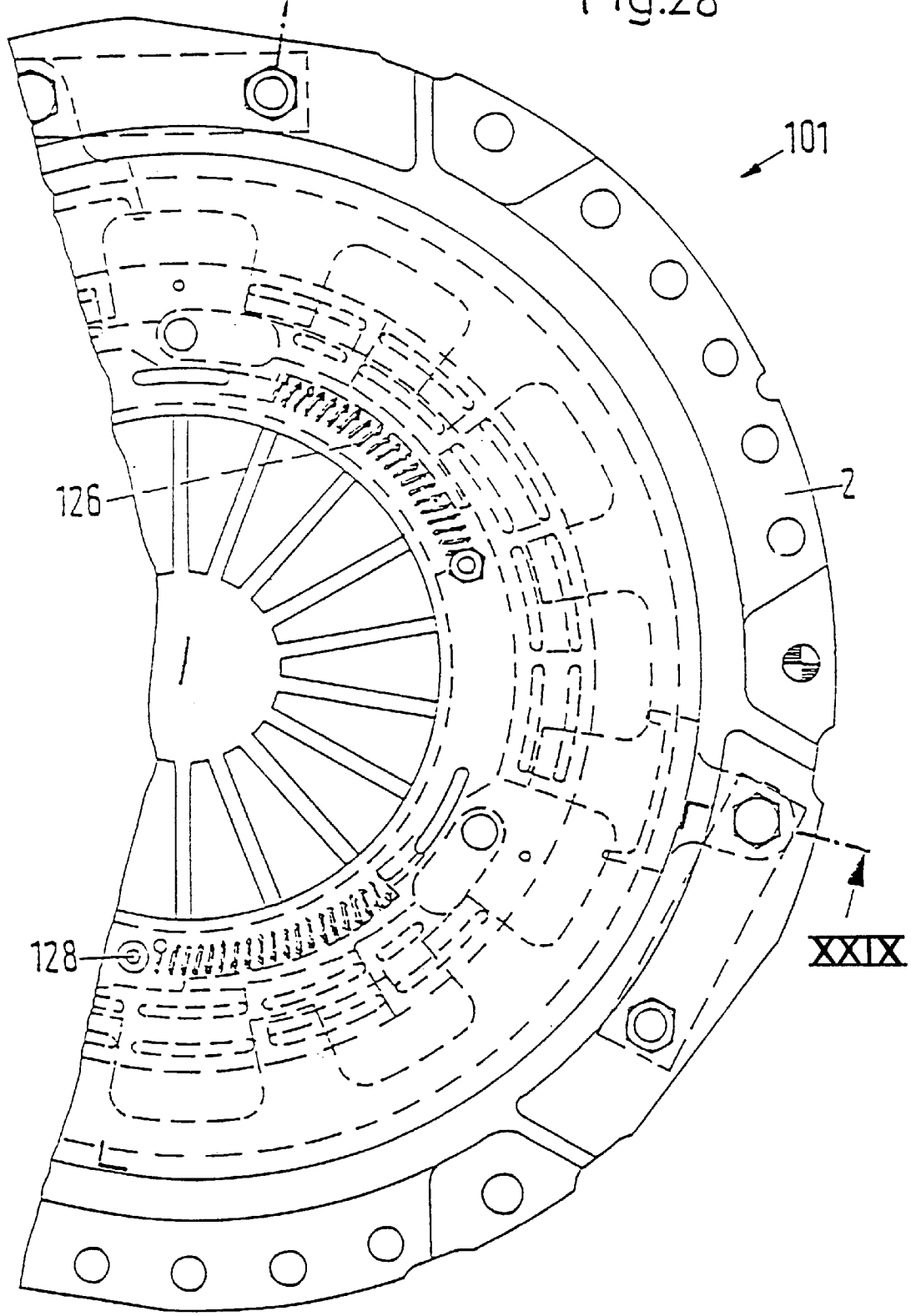
Figure 29:
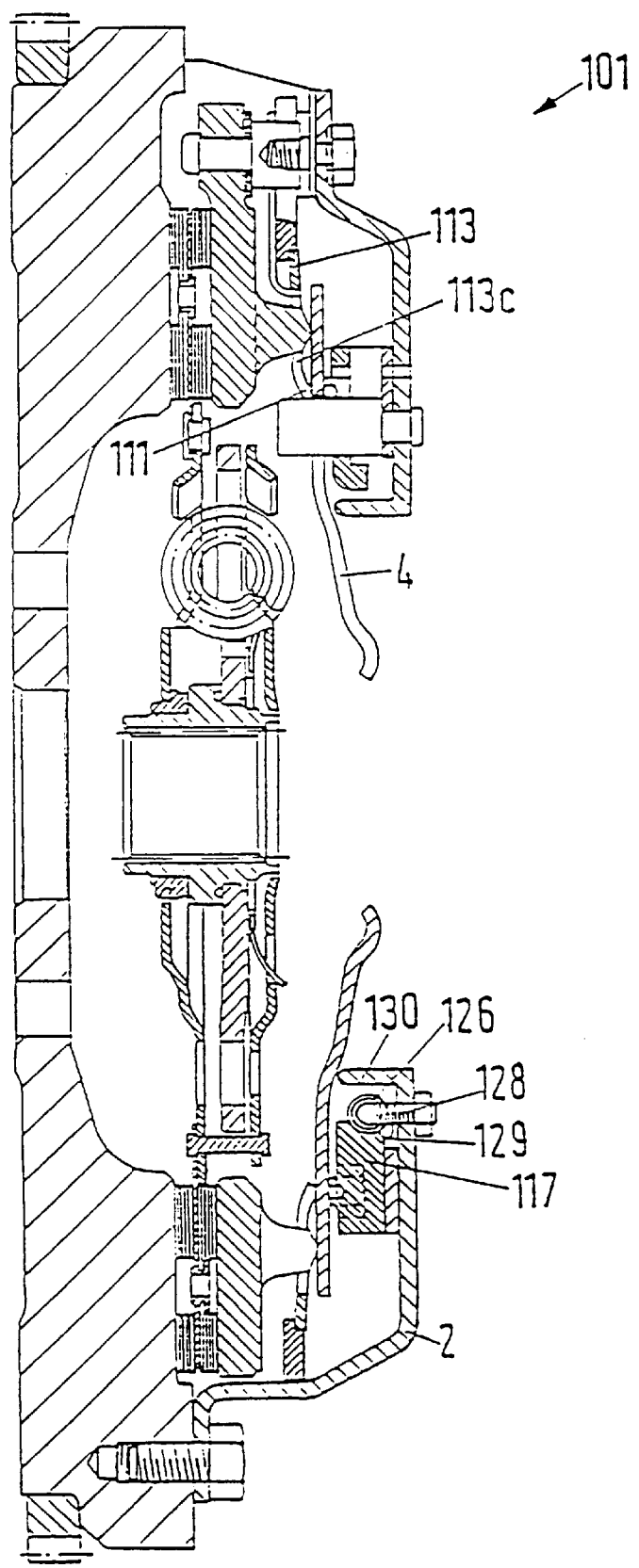

The main difference between the friction clutch 101 which is shown in FIGS. 28 and 29 and the friction clutch 1 which is illustrated in FIGS. 17 and 18 is that the adjusting ring 117 of the friction clutch 101 is biased in the circumferential direction by coil springs 126. As concerns its function and its mode of operation for the purpose of compensating for wear upon the friction linings, the adjusting ring 117 corresponds to the adjusting ring 17 which is shown in FIGS. 18 to 20. In the illustrated embodiment, the friction clutch 101 comprises three coil springs 126 which are uniformly distributed in the circumferential direction and are stressed between the clutch housing 2 and the adjusting ring 117.

Figure 30:
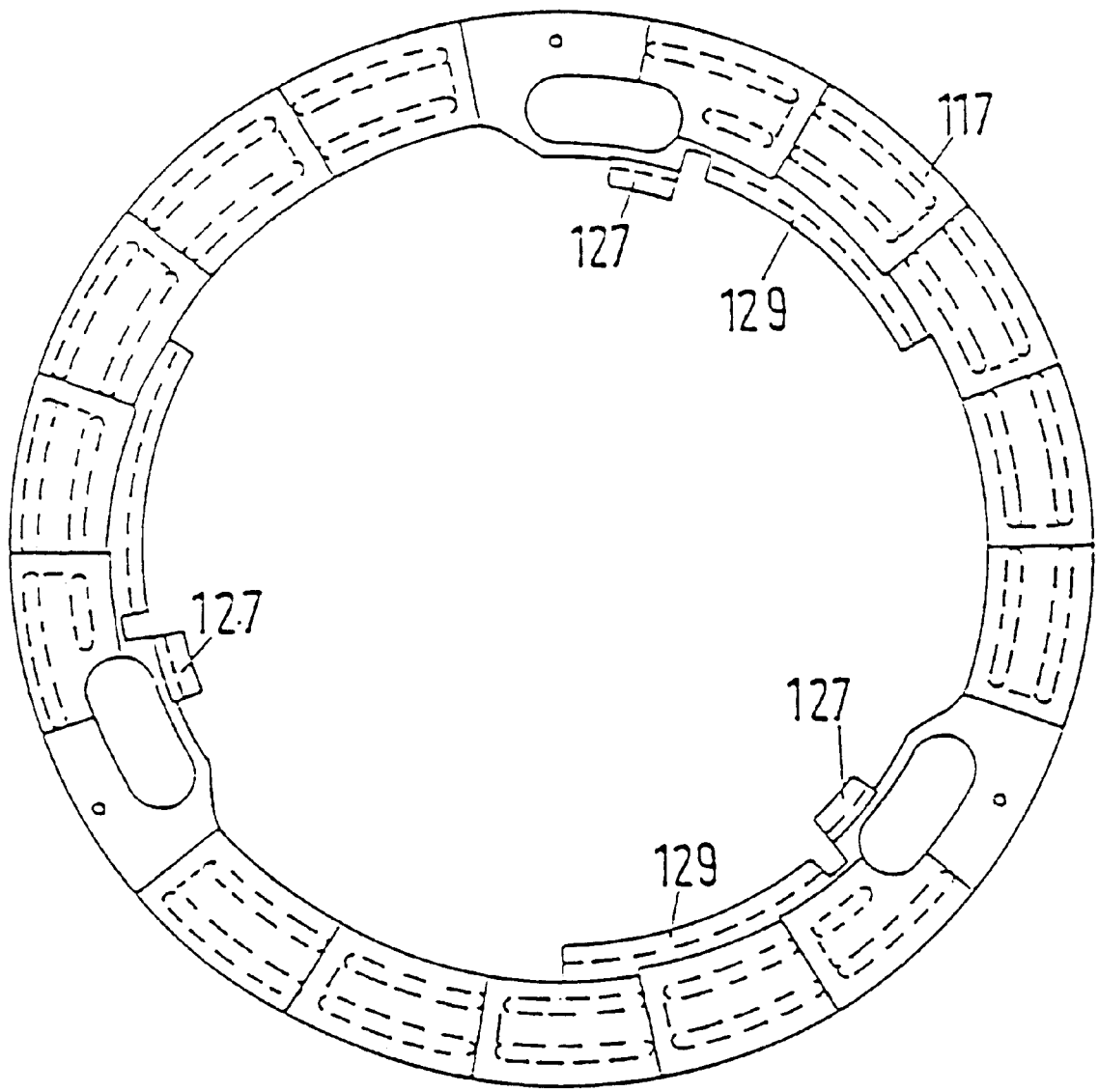

As best shown in FIG. 30, the inner marginal portion of the adjusting ring 117 is provided with radial projections or steps 127. One end of each arcuate coil spring 126 bears against a discrete projection 127 and urges the adjusting ring 117 to turn, and the other end of each coil spring 126 reacts against one of three projections 128 provided on the clutch housing 2. In the illustrated embodiment, the projections 128 are constituted by screw-shaped connecting elements which are connected with the housing 2. However, such abutments 128 can also be made of one piece with and can project axially from the clutch housing 2. For example, the abutments 128 can constitute stamped portions or lugs which are obtained as a result of deforming portions of a sheet-metal housing 2 in the axial direction. As best shown in FIGS. 29 and 30, the inner marginal portion of the ring 117 can be configured in such a way that it comprises guide means 129 which ensure axial retention of and radial support for the springs 126 and extend at least substantially adjacent the springs 126 through a distance corresponding to the extent of expansion of the springs 126 and preferably additionally along arcs corresponding to the angle of rotation of the ring 117 to compensate for wear upon the friction linings. In the illustrated embodiment, the guide means 129 for the coil springs 126 constitute recesses having substantially semi-circular cross-sectional outlines and being bounded by surfaces conforming substantially to the cross-sectional outlines of the coil springs 126.

The just outlined design exhibits the advantage that, when the clutch 101 rotates, the springs 126 are reliably guided so that they cannot yield in the axial direction. In order to further secure the coil springs 126, it is possible to provide the radially inner marginal portion of the cover 2 with axially extending formations 130, see FIG. 29, which overlie the springs 126 in the axial direction. In lieu of discrete formations 130, it is possible to provide the cover 2 with a circumferentially complete axially extending inner marginal portion. Such radially inner marginal portion can serve to prevent dissipation of energy by the diaphragm spring 4.

The provision of guide means for the coil springs 126 in a manner as described with reference to FIGS. 28 to 30 exhibits the advantage that, when the clutch 1 rotates, the convolutions of the springs 126 can abut the adjusting ring 117 under the action of centrifugal force with the result that the rotating forces which the coil springs 126 apply to the adjusting ring 117 in the circumferential direction are reduced or even completely eliminated due to friction which develops between the convolutions of the springs 126 and the adjusting ring 117 when the springs 126 are acted upon by centrifugal force because the clutch rotates. In other words, the springs 126 can be said to constitute substantially rigid bodies (due to the development of friction which opposes the bias of the coil springs) when the friction clutch 101 is rotated. This ensures that, at least at RPM above the idling RPM of the combustion engine, the springs 126 cannot change the angular position of the adjusting ring 117. Consequently, a compensation for wear upon the friction linings can take place only when the friction clutch 101 is actuated while its RPM is higher than the idling RPM. Thus, one ensures that compensation for wear upon the friction linings can take place only when the friction clutch 101 is actuated while rotating at the idling RPM or at least close to idling RPM. However, the adjusting ring 117 can also be blocked in such a way that an adjustment to compensate for wear can take place only when the combustion engine is at a standstill, i.e., when the friction clutch 101 is not rotated by the engine. Blocking of the adjusting or compensating operation when the friction clutch 1 rotates or when its RPM exceeds a predetermined RPM can also be resorted to with advantage in that embodiment of the improved friction clutch which is shown in FIGS. 17 and 18. For example, the housing 2 of the clutch which is shown in FIGS. 17 and 18 can be provided with means which prevent rotation of the adjusting element 17 relative to the housing in response to the action of centrifugal force, namely to prevent rotation of the element 17 under the action of the torsion spring 26 and/or 26a. The blocking means can comprise or constitute at least one weight which can be forced to move radially outwardly under the action of centrifugal force and to bear, for example, against the inner edge portion of the ring 17 with attendant generation of friction which produces a holding or retaining moment greater than the turning force generated by the adjusting springs and acting upon the ring 17.

It is also possible to provide supporting means which are carried by the housing 2 and serve to radially support at least a portion of each of the springs 126. In the embodiment which is shown in FIGS. 28 and 29, such supporting means can be made of one piece with the projections 128. For example, the projections 128 can have an angular shape so that each thereof includes a portion which extends in the circumferential direction and which also extends into at least a portion of one of the springs 126. In this manner, at least some convolutions of the springs 126 can be guided and supported at least in the radial direction.

As can be seen in FIG. 29, the wire ring 11 which is used in the friction clutch of FIG. 18 is omitted and is replaced with formations 111 which are provided at the tips 113c of tongues forming part of the sensor spring 113. To this end, the tongues have tips 113c including convex portions confronting the actuating diaphragm spring 4.

Figure 31:
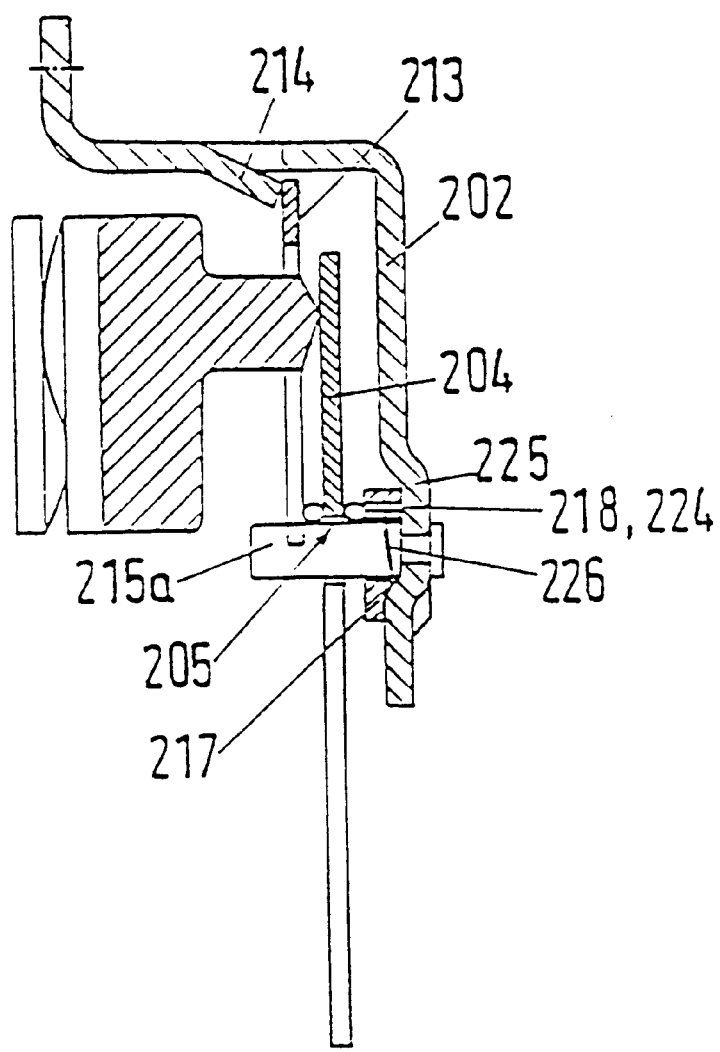
Figure 32:
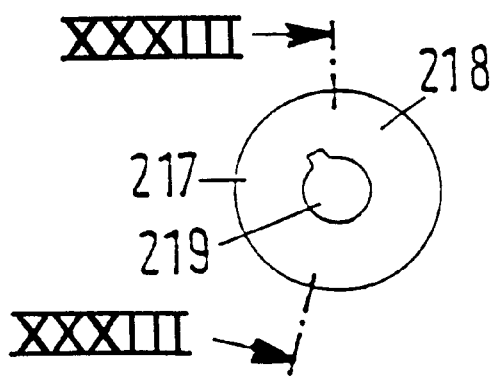
Figure 33:
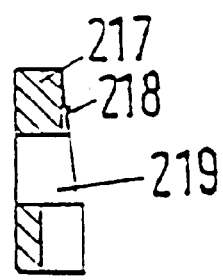

FIGS. 31 to 33 illustrate a further modification of the novel wear compensating device wherein a ring-shaped adjusting member is replaced with discrete adjusting elements 217. Such adjusting elements are uniformly distributed along the periphery of the housing or cover 202. The adjusting elements 217 constitute button- or disc-shaped parts which have ramps 218 extending in the circumferential direction and sloping in the axial direction. The ring-shaped adjusting elements 217 have centrally located recesses or bores 219 through which project axially extending pin-shaped projections 215a carried by the housing 202 and rotatably mounting the respective adjusting elements 218. The housing 202 is provided with stamped portions 225 which constitute opposing ramps 224 for the ramps 218. A spring element 226 is installed in stressed condition between the cover 202 and each adjusting element 217 to bias the respective adjusting element in a direction to carry out an adjusting or compensating step. As can be seen in FIG. 31, each spring element 226 can extend around one of the axial projections 215a so that it resembles a coil spring. The end portions of the springs 226 are provided with formations, for example in the form of bent portions or legs serving to support one end of the respective spring 226 on the housing 202 and to have the other end of the respective spring 226 engage the corresponding adjusting element 217. When the diaphragm spring 204 or the sensor spring 213 is moved in the axial direction in the region of the tilting seat assembly 205, the adjusting elements 218 are caused to turn and to thus compensate for the axial movement of the springs 204, 213 by causing the sloping ramps 218 to slide along the respective ramps 224.

The sensor spring 213 is axially supported by the housing 202 through the medium of lugs 214 which are bent out of the axially extending portion of the housing 202 and project radially inwardly to be forced under the radially outer portions of the sensor spring 213.

The ring-shaped adjusting elements 218 exhibit the advantage that their adjusting action is not appreciably influenced by centrifugal force.

In lieu of the rotary or turnable adjusting elements 217 which are shown in FIGS. 31 to 33, it is possible to employ discrete wedge-shaped adjusting elements which are shiftable in the radial and/or circumferential direction in order to compensate for wear. Each such wedge-shaped adjusting element can be provided with an elongated recess for one of the axially extending projections 215a so that the projections 215a can guide the respective adjusting elements. The wedge-shaped adjusting elements perform their adjusting function in response to the action of centrifugal force. However, it is also possible to provide energy storing elements which act upon the wedge-shaped adjusting elements in a direction to compensate for wear. In order to ensure proper guidance of the wedge-shaped adjusting elements, the housing 202 can be provided with suitable guiding formations for such adjusting elements. The sloping surfaces of the wedge-shaped adjusting elements make predetermined slope angles with a plane which is normal to the axis of rotation of the friction clutch and such adjusting elements can be provided on the housing 202 and/or at one side of the actuating diaphragm spring 204. If the adjusting device includes discrete wedge-shaped adjusting elements, it is desirable to make them of a lightweight material so as to reduce to a minimum the centrifugal force which acts upon the adjusting elements when the friction clutch rotates.

The materials of the parts which constitute the adjusting ramps are preferably selected in such a way that the sloping ramps and the complementary opposing ramps do not adhere to each other at any time during the useful life of the friction clutch because such adherence would prevent the ramps from performing their adjusting or compensating function. In order to prevent adherence of the two sets of ramps to each other, at least one set of the ramps can be provided with a coating at least in the region of the respective sloping surfaces which abut the sloping surfaces of the other set of ramps. Furthermore, such coating can be selected with a view to prevent corrosion if the sloping ramps and/or the opposing ramps consist of a metallic material. Adherence or bonding of neighboring sloping ramps and opposing ramps to each other can also be prevented by making the parts which constitute the sloping ramps and the opposing ramps from materials having different thermal expansion coefficients so that the fluctuations of temperature which develop when the friction clutch is in use cause the pairs of abutting sloping ramps and opposing ramps to move relative to each other. This ensures that the parts which constitute the sloping ramps and the parts which constitute the opposing ramps are invariably movable relative to each other. Thus, such selection of the materials of the two sets of ramps prevents the sloping ramps and the abutting opposing ramps from adhering or from being actually bonded to each other because different expansion in response to temperature changes would prevent adherence and would destroy the bonds between abutting sloping ramps and opposing ramps. Separation of abutting ramps from each other can also be achieved by making the ramps of materials having different strengths and/or shapes so that the centrifugal force acting upon such ramps induces different expansion and/or different movements which again ensures that the sloping ramps and the abutting opposing ramps cannot adhere and/or be bonded to each other.

In order to prevent adherence of the sloping ramps to the opposing ramps, it is also possible to provide at least one device which applies an axial force to the adjusting element or elements during disengagement of the friction clutch and/or during adjustment to compensate for wear. To this end, the adjusting element 17 or 117 can be axially coupled to a component part which is provided with portions that move axially in response to the development of wear. It is of particular advantage if the coupling is located in the region of the tilting seat assembly 5 and serves to couple the actuating spring 4 and/or the sensor spring 13.

Figure 34:
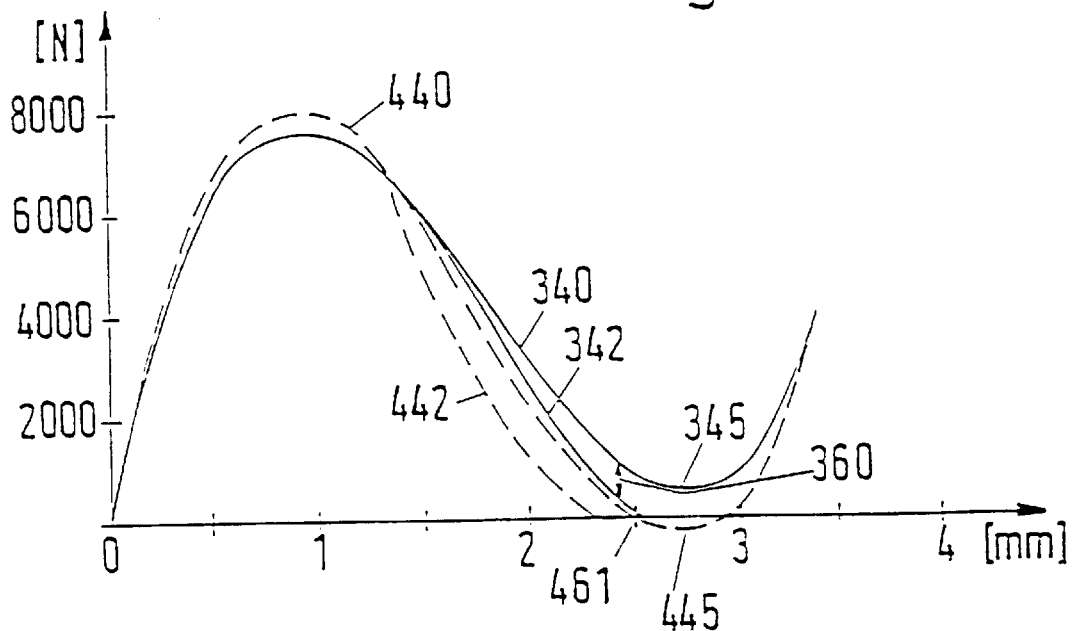

The diagram of FIG. 34 illustrates the characteristic curve 340 of a biasing diaphragm spring. The curve 340 includes a lowermost point or minimum 345 denoting that the corresponding force which is being applied by the biasing diaphragm spring is relatively small (approximately 450 Nm). The maximum of the characteristic distance-force curve 340 of the diaphragm spring is indicative of a force in the range of 7600 Nm. The characteristic curve 340 is obtained by deforming a diaphragm spring between two radially spaced-apart abutments, namely in a manner as already described with reference to the characteristic curve 40 (shown in FIG. 24) of the diaphragm spring 4.

The characteristic curve 340 of the diaphragm spring can be combined with a characteristic curve 342 of springs forming part of the clutch disc and acting directly upon the friction linings. As can be seen in FIG. 34, the distance-force progress of the characteristic curve 342 of the springs for the friction linings approximates the characteristic curve 340 of the biasing diaphragm spring, i.e., the two curves are disposed at a small distance from each other so that the corresponding friction clutch can be actuated in response to the application of a very small force. Within the operating range of the springs for the friction linings the theoretical disengaging force corresponds to the difference between two vertically superimposed points of the characteristic curves 340 and 342. One such difference is denoted by the character 360. The actually required disengaging force is reduced by the corresponding lever arm of the actuating elements, such as the prongs of the diaphragm spring. This was already described with reference to the embodiment which is illustrated in FIGS. 17 and 18 and with reference to the diagrams shown in FIGS. 24 to 27.

FIG. 34 further indicates, by broken lines, an additional characteristic curve 440 of an actuating diaphragm spring. The curve 440 includes a lowermost point or minimum 445 denoting that the corresponding force applied by the diaphragm spring is a negative force, i.e., it does not act in the direction of engagement of the respective friction clutch but rather in the direction of disengagement. This means that, when the point 461 is exceeded during disengagement, the friction clutch automatically remains in the disengaged condition. The characteristic curve 440 of a diaphragm spring can be selected in combination with a characteristic curve 442 of springs for the friction linings. In order to achieve minimal disengaging forces, it is desirable to ensure that the characteristic curve 440 of the actuating diaphragm spring is at least substantially parallel to the characteristic curve 442 of the springs for the friction linings.

Figure 35:
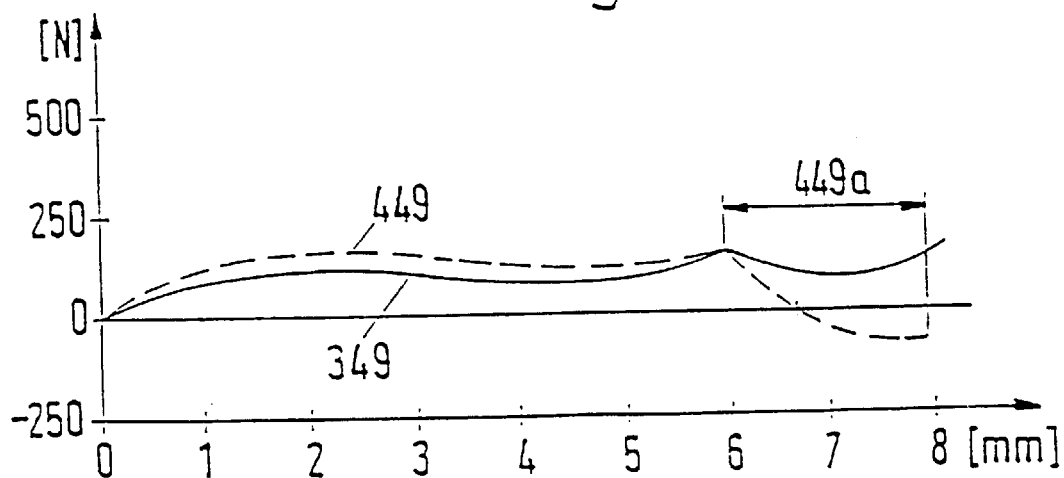

FIG. 35 illustrates the progress of the disengaging force, namely a force which is to be applied to the actuating levers (such as prongs of an actuating diaphragm spring) in order to disengage the respective friction clutch, during disengagement travel and relative to the corresponding characteristic curves 340 and 342 or 440 and 442. As can be seen in FIG. 35, the progress of the disengaging force (curve 349) with reference to the characteristic curves 340, 342 is always within the positive range of forces, i.e., it is necessary to always apply a certain disengaging force in order to maintain the friction clutch in the disengaged condition. The progress of the disengaging force (curve 449) which relates to the characteristic curves 440 and 442 includes a portion 449a denoting a stage during which the disengaging force at first decreases and thereupon advances from the positive range into the negative range so that the corresponding friction clutch can remain in the disengaged condition without the application of a holding force.

Figure 36:
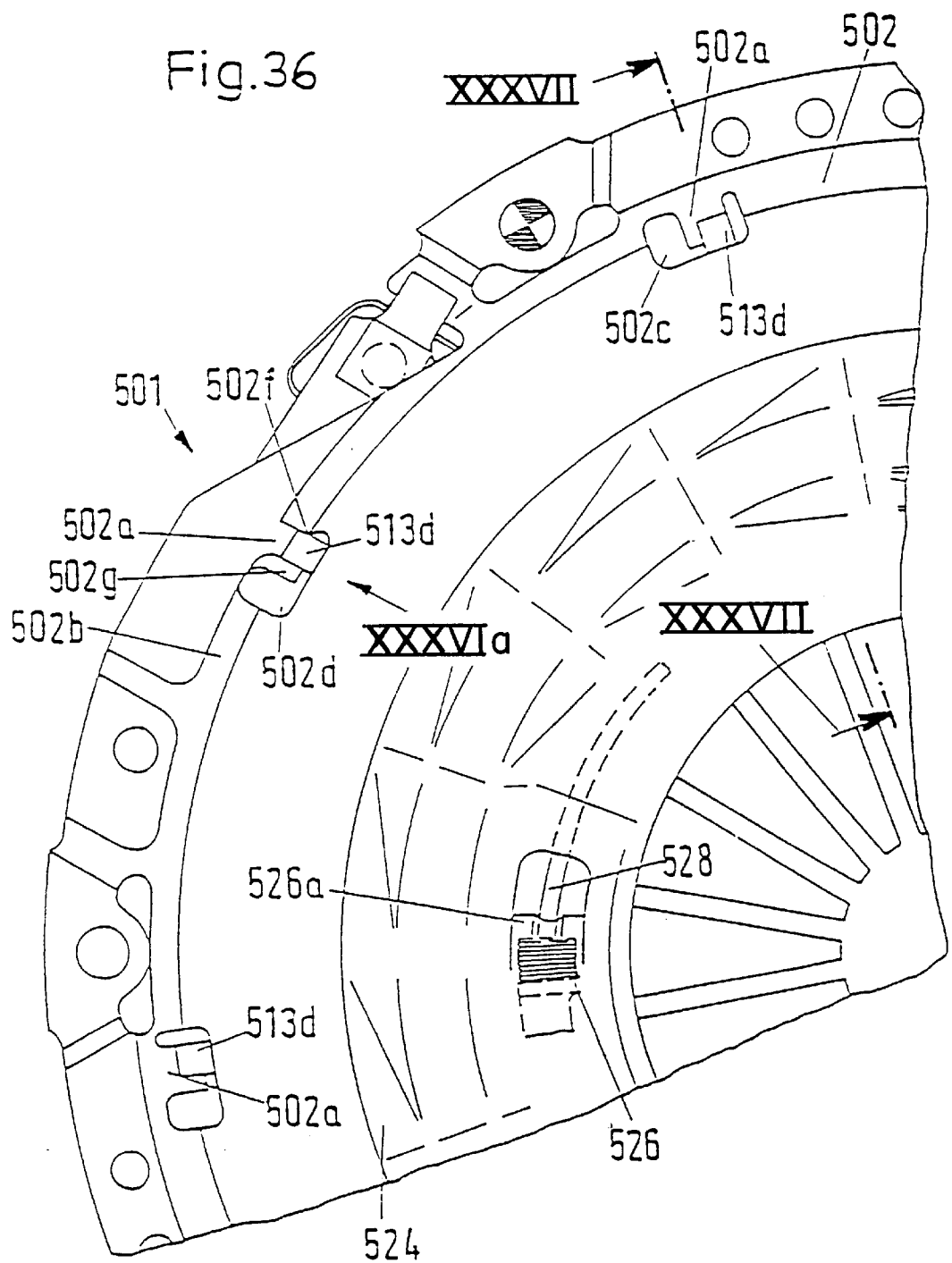
Figure 36A:
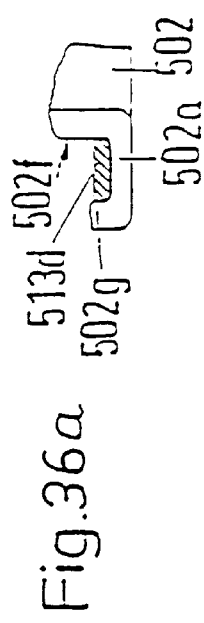
Figure 37:
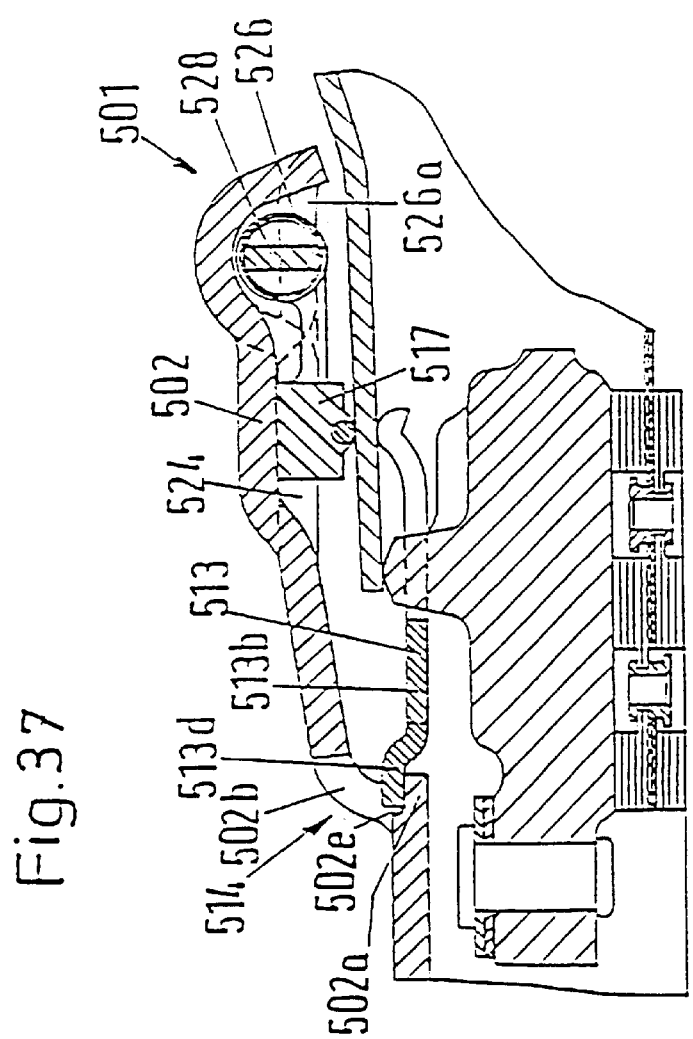

In that embodiment of the improved friction clutch 501 which is shown in FIGS. 36, 36a and 37, the sensor diaphragm spring 513 is axially coupled to the clutch housing or cover 502 by a connection 514 which resembles or constitutes a bayonet mount. To this end, the sensor spring 513 comprises a ring-shaped main portion 513b and lugs 513d which extend radially outwardly from the main portion 513b and are supported, as seen in the axial direction, by radially extending portions 502a here shown as lugs which are obtained as a result of displacement of corresponding parts of the housing 502. The lugs 502a of the housing 502 are obtained in response to radially outward displacement of portions of the axially extending marginal section 502b of the housing. It is advisable to displace the lugs 502a radially outwardly subsequent to provision of approximate cuts or slits 502c or 502d at least partially around the corresponding lugs 502a. The making of cuts or slits 502c or 502d at least partially around the lugs 502a renders it possible to more readily deform such lugs in their operative positions. As best shown in FIG. 37, the lugs 502a and the lugs 513d are positioned relative to each other in such a way that they center the sensor spring 513 relative to the housing 502. To this end, the lugs 502a of the illustrated embodiment are provided with small axial steps or shoulders 502e.

In order to ensure satisfactory positioning of the sensor spring 513 relative to the housing 502 during the making of the bayonet mount-like interlocking connection 514, at least three lugs 502a, which are preferably uniformly distributed in the circumferential direction of the housing 502, are positioned relative to the other portions of the housing in such a way that, when the housing and the sensor spring 513 are turned relative to each other through a predetermined angle, the corresponding lugs 513d each engage one of the circumferential stops 502f to thus prevent further angular movement of the sensor spring 513 and the housing 502 relative to each other. In the illustrated embodiment, and as can be best seen in FIG. 36a, each stop 502f constitutes an axially extending portion of the housing 502. FIG. 36a further shows that at least some, preferably three, lugs 502a constitute additional barriers 502g which prevent rotation of the housing 502 and the lugs 513d of the sensor spring 513 relative to each other. In the illustrated embodiment, one and the same set of lugs 502a constitutes a rotation preventing device 502f in one direction and a rotation preventing device 502g in the opposite direction. Those lugs 502a which act as barriers 502g to prevent a disengagement of the sensor spring 513 and the housing 502 from each other constitute axially extending edge portions of the lugs 502a. The circumferential barriers 502f and 502g (i.e., the lugs 502a)

ensure a predetermined positioning of the sensor spring 513 and housing 502 relative to each other, as seen in the circumferential direction. In order to make the locking connection 514, the sensor spring 513 is stressed axially in a direction toward the housing 502 so that the lugs 513d extend axially into the cuts or slits 502c and 502d and overlie the corresponding supporting portions or lugs 502a of the housing 502 in the axial direction. The housing 502 and the sensor spring 513 are then ready to be rotated relative to each other until some of the lugs 513d engage the corresponding barriers 502f which prevent further rotation of the housing and sensor spring with reference to each other. This is followed by partial unstressing of (i.e., partial dissipation of energy by) the sensor spring 513 so that some of the lugs 513d (such lugs are spaced from each other in the circumferential direction) advance between the corresponding barriers 502f and 502g and all of the lugs 513d overlie the lugs 502a of the housing. Due to the provision of the novel bayonet mount-like locking connection 514, one ensures that the lugs 513d do not come to rest adjacent the lugs 502a of the housing 502.

In the heretofore described embodiments, the circular ring-shaped main portion, e.g., 513b, which applies the actual bias or spring force of the sensor spring 513 is located radially outwardly of the region of abutment and force application between the pressure plate and the actuating diaphragm spring. However, it is of advantage for certain applications if the circular ring-shaped main portion of the sensor diaphragm spring is installed radially inwardly of the area of circular contact between the pressure plate and the actuating diaphragm spring. Thus, this means that, and referring again to FIGS. 17 and 18, the main portion 13b which applies the axial force of the sensor spring 13 is then installed radially inwardly of the region (at 3a) of contact between the actuating diaphragm spring 4 and the pressure plate 3.

In the embodiment which is illustrated in FIGS. 36, 36a and 37, the opposing ramps 524 on the housing 502 are constituted by cam-shaped stampings of the sheet metal housing. Furthermore, this embodiment employs coil springs 526 which are stressed between the housing 502 and the adjusting ring 517 and are guided by mandrels 528 which are of one piece with the adjusting ring 517 and extend in the circumferential direction. As can be best seen in FIG. 37, these guide mandrels 528 have an elongated cross-sectional outline, as seen in the axial direction, conforming to the inner diameters of the springs 526. The mandrels 528 extend at least along a portion of the length of and into the corresponding springs 526. In this manner, at least some convolutions of the springs 526 are guided and at the same time supported in the radial direction. Moreover, the springs 526 cannot buckle and cannot be actually separated from the adjusting ring 517. Furthermore, the mandrels or guides 528 can contribute significantly to the convenience of mounting the friction clutch 501.

Figure 38:
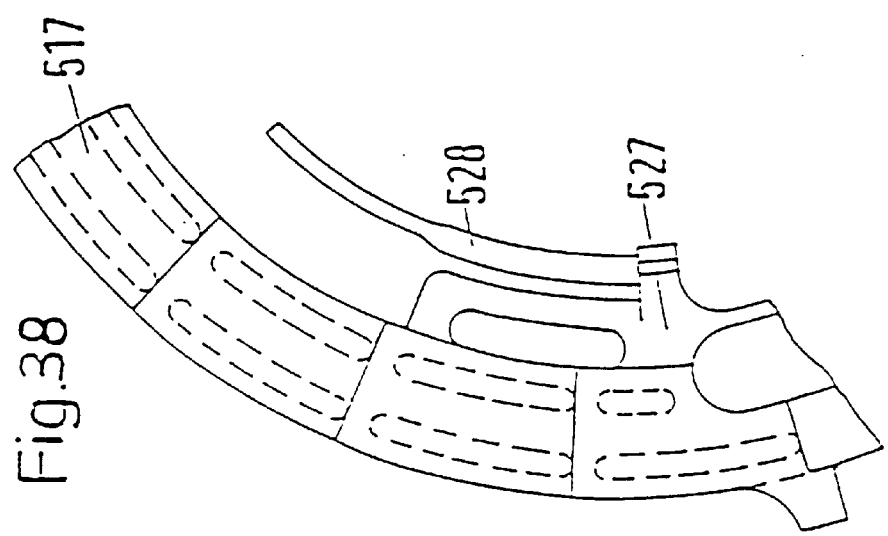

FIG. 38 illustrates a portion of the adjusting ring 517. The adjusting ring 517 comprises radially inwardly extending formations 527 which carry the mandrel-shaped circumferentially extending guides 528 for the coil springs 526. In the illustrated embodiment, the spring supporting and guiding mandrels 528 are of one piece with the adjusting ring 517 which is an extrusion made of a synthetic plastic material. However, the spring guiding and supporting mandrels 528 can also constitute separately produced parts or all of them can constitute a single part, and such part or parts can be connected with the adjusting ring 517, e.g., by a snap-type locking arrangement. For example, all of the guide mandrels 528 can form part of a single ring, such as a split ring, which is coupled to the adjusting ring 517 at least at three locations, preferably by snap action.

In a manner similar to that already described with reference to FIGS. 28 and 29, the coil springs 526 can be additionally supported in the radial direction, e.g., by relying on the action of centrifugal force which urges the springs against suitably configurated complementary portions of the housing 502 and/or adjusting ring 517.

The coil spring 526 are supported by stampings 526a which are of one piece with the housing 502 and constitute axially extending wings or axially extending walls. Such supporting portions or stampings 526a for the springs 526 are preferably configurated in such a way that they guide the corresponding ends of the springs to thus prevent undesirable shifting of the springs in the axial and/or radial direction.

FIG. 39 illustrates an embodiment of a clutch 601 wherein the sensor spring 613 is disposed at that side of the housing 602 which faces away from the pressure plate 603. Due to the mounting of the sensor spring 613 outside of the internal space of the housing which contains the pressure plate 603, one can reduce the thermal stress upon the sensor spring 613 to thus avoid the danger of setting of the spring 613 due to excessive thermal stressing. Furthermore, the spring 613 is more satisfactorily cooled at the outer side of the housing 602.

The tiling seat 611 is disposed at that side of the actuating diaphragm spring 604 which faces away from the cover, and such seat 611 is supported by distancing rivets 615 which extend axially through suitable openings in the diaphragm spring 604 and housing 602 and are axially coupled to the sensor spring 613. In the illustrated embodiment, the distancing rivets 615 are riveted to the sensor spring 613. In lieu of the distancing rivets 615, it is also possible to employ other means which establish a connection between the tilting seat 611 and the sensor spring 613. For example, the radially inner portion of the sensor spring 613 could be provided with axially extending lugs having radial portions provided with suitably shaped parts which directly support the tilting seat 611. The elements 615 which are fixedly riveted to the sensor spring can be replaced with otherwise configurated elements, e.g., elements which are articulately connected to the sensor spring.

In the embodiment of FIG. 40, the sensor spring 713 is disposed radially inwardly of the tilting seat assembly 705 for the actuating diaphragm spring 704. The radially inner portions of the sensor spring 713 are supported by the housing 702. To this end, the housing 702 is provided with lugs 715 which extend through complementary slots or holes of the diaphragm spring 704 and constitute axial supports for the sensor diaphragm spring 713.

Figure 41:
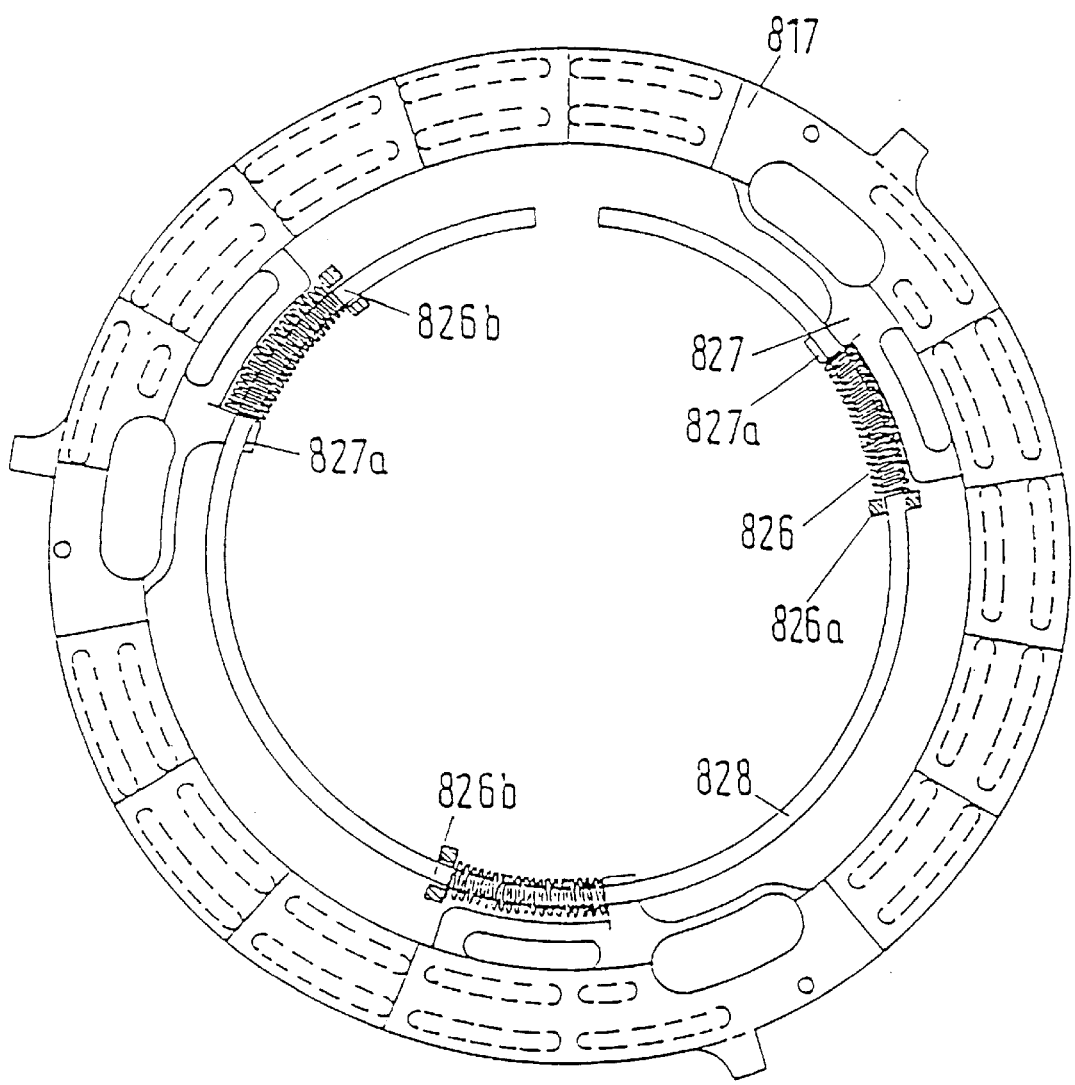

The adjusting ring 817 which is shown in FIG. 41 can be put to use in a friction clutch of the type shown in FIGS. 20 and 21. The radially inner portion of the adjusting ring 817 is provided with radially extending formations 827. The formations 827 include radial portions 827a constituting supporting means for the coil springs 826 which are stressed in the circumferential direction between the clutch housing and the adjusting ring 817. In order to guide and to facilitate the installation of the coil springs 826, there is provided a ring 828 which is open or slotted at its periphery. The ring 828 is connected with the radial portions 827a. To this end, the portions 827a can be formed with recesses or grooves which extend in the circumferential direction and are configurated in such a way that they cooperate with the ring 828 to form a snap action type coupling. The means for supporting the adjusting springs 826 at the housing comprises axially extending lugs 826a which are provided on the housing. The axially extending lugs 826a are formed with axial slots 826b for reception of the ring 828. The slots 826b are configured in such a way that the ring 828 is free to move relative to the lugs 826a in the axial direction, at least to the extent which is necessary to compensate for the wear. To this end, it is of particular advantage if the recesses which are provided in the radial formation 827 to receive the ring 828, and the slots 826b face in opposite directions as considered in the axial direction. In other words, recesses in the portions 827a are open in one axial direction and the slots 826b are open in the other axial direction.

Figure 42:
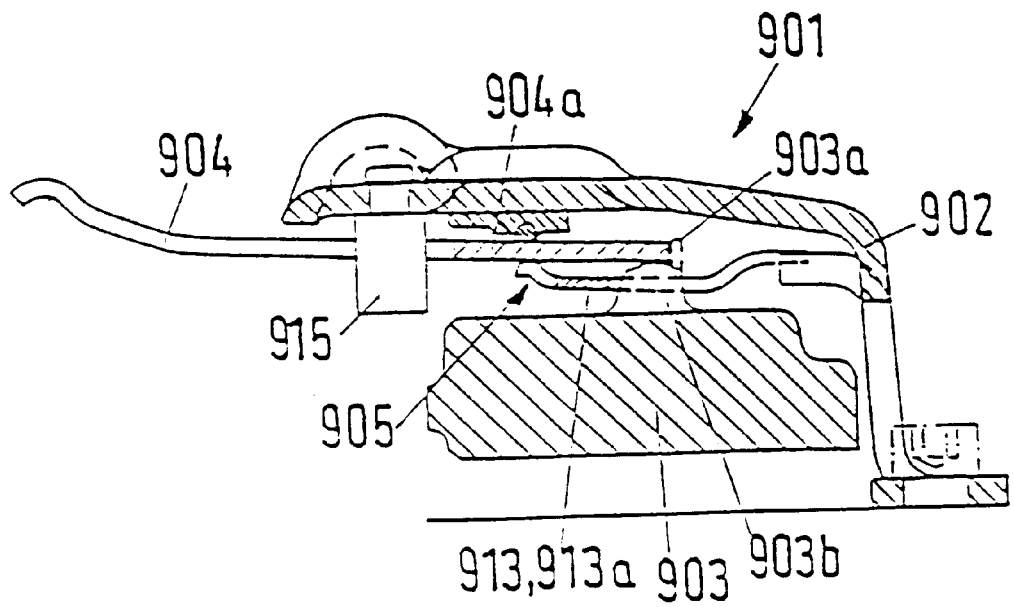

In that embodiment of a friction clutch 901 which is shown in FIG. 42, the actuating diaphragm spring 904 is supported in the direction of disengagement at the central region of its main portion 904a. The radially outer part of the main portion 904a abuts the pressure plate 903 and extends radially inwardly beyond the tilting seat assembly 905. This means that, in contrast to heretofore known diaphragm spring type clutches, the tilting seat assembly 905 is disposed at a relatively long distance from the inner marginal part of the main portion 904a. In the illustrated embodiment, the ratio of radial widths of those parts of the main portion 904a which are located radially inwardly of the tilting seat assembly 905 to those parts of the main portion 904a which are located radially outwardly of the tilting seat assembly 905 is in the range of 1:2. It is 116 advisable to select a ratio which is between 1:6 and 1:2. Such mode of supporting the actuating diaphragm spring 904 reduces or eliminates the possibility of damage to or excessive stressing of the main portion 904a of the diaphragm spring 904 in the region of the tilting seat assembly 905.

FIG. 42 further shows, by broken lines, one of several axial formations 903a which are provided on the pressure plate 903. Such formations 903a of the pressure plate 903 are preferably provided at the region of the supporting cams 903b and can center the actuating diaphragm spring 904 within the clutch 901. Thus, the actuating diaphragm spring 904 can be centered relative to the housing 902 at its outer periphery so that the centering rivets or bolts 915, also shown in FIG. 42, can be dispensed with. Even though such modification is not specifically shown, it is further possible to center the periphery of the diaphragm spring 904 by means of lugs or stampings which constitute displaced portions of the housing 902.

In the friction clutch 901, the sensor spring 913 is shaped in such a way that the force-applying main portion 913a is located radially inwardly of the cams 903b. In order to properly support the actuating diaphragm spring 904 on the one hand, and to be properly supported by the housing 902 on the other hand, the sensor spring 913 is provided with radial arms or tongues which extend radially inwardly of the main portion 913a on the one hand, and with radial arms or tongues which extend radially outwardly of the main portion 913a on the other hand.

Figure 43:
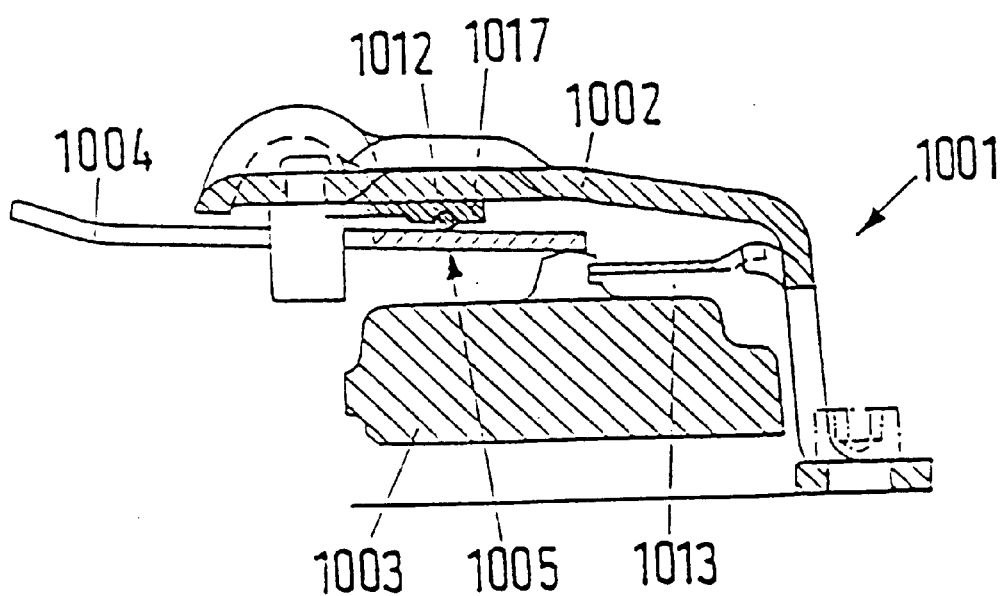

In that embodiment of a friction clutch 1001 which is shown in FIG. 43, the force which opposes the disengaging force for the friction clutch and the tilting force of the actuating diaphragm spring 1004 is furnished by a sensor spring 1013 which is installed in axially stressed condition between the housing 1002 and the pressure plate 1003. In such embodiment, that portion of the actuating diaphragm spring 1004 which is located at the tilting or pivoting region defined by the assembly 1005 is not supported in the direction of disengagement by a tilting seat assembly. The bias of the sensor spring 1013 ensures that the diaphragm spring 1004 abuts that tilting seat 1012 which is adjacent the housing 1002. This sensor spring is designed in such a way that, during disengagement of the friction clutch 1001, the axial force which is furnished by the sensor spring 1013 and acts upon the diaphragm spring 1004 is greater or becomes greater than the force which is required to disengage the friction clutch 1001. It is necessary to ensure that, before the friction linings have undergone some wear, the diaphragm spring 1004 always contacts the support at the housing, such as the tilting seat 1012. To this end, it is necessary to ensure a proper relationship of several superimposed forces which act in the axial direction. Such relationship of forces can be arrived at in a manner as already explained with reference to the previously described embodiments. These forces are being applied by the sensor spring 1013, by the springs for the friction linings, by leaf spring elements (if such elements are provided between the pressure plate 1003 and the housing 1002), by the actuating diaphragm spring 1004, by the disengaging force for the friction clutch 1001, and by the adjusting spring elements acting upon the adjusting ring 1017, and they should be properly related to each other.

Figure 44:
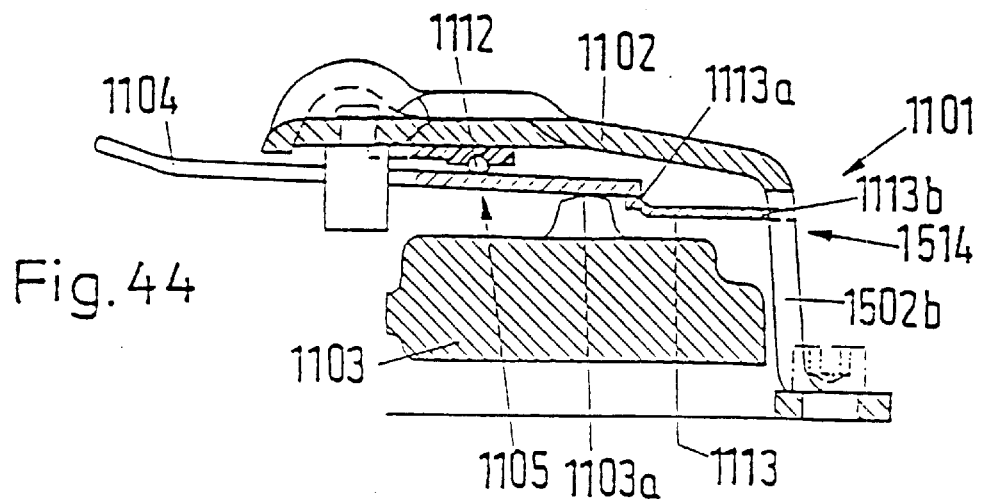

In the friction clutch 1101 which is shown in FIG. 44, the sensor spring 1113 is supported radially outwardly of the ring-shaped tilting seat 1112 at the housing 1102. In the illustrated embodiment, the location of abutment of the actuating diaphragm spring 1104 and the sensor spring 1113 is also disposed radially outwardly of the circular locus 1103a of abutment between the actuating diaphragm spring 1104 and the pressure plate 1103. In order to be supported by the housing 1002, the radially outer portion of the sensor spring 1113 is provided with formations including radially outwardly extending arms 1113b which are supported by and held against rotation relative to the housing 1 102 by a bayonet mount 1514 in a manner similar to that already described with reference to FIGS. 36 and 37. In order to support the sensor spring 1113, the housing 1102 is provided with complementary axially extending recesses 1502b which permit axial introduction of the radially outer supporting arms of the sensor spring 1113 to establish the bayonet mount-type locking device 1514. Engagement of the diaphragm spring 1104 with the tilting or supporting seat 1112 at the housing 1102 of the friction clutch 1101 is ensured by the bias of the stressed sensor spring 1113.

The operation of the clutch will be described in greater detail with reference to FIG. 43. The bias of the sensor spring is selected in such a way that it corresponds to the disengaging force at the adjustment point. When the friction linings (or other parts) have undergone a certain amount of wear so that the conicity of the diaphragm spring 1004 is changed with attendant increase of the bias of the diaphragm spring, the diaphragm spring is tilted first relative to the seat 1012 up to close to the point of adjustment. Since the disengaging force at the adjustment point matches the bias of the sensor spring plus the residual force of the spring means for the friction linings, the diaphragm spring is tilted relative to the seat 1012 at the housing 1002 in response to further disengagement until the reestablishment of equilibrium between the disengaging force and the bias of the sensor spring. At such time, the diaphragm spring 1004 is lifted off the seat 1012 at the housing 1002 and thus releases the seat 1012 for the purpose of axial adjustment to compensate for wear upon the friction linings. During the next stage of disengagement, the disengaging force continues to decrease so that the bias of the sensor spring 1013 prevails and the sensor spring causes the pressure plate 1003 to press the diaphragm spring 1004 against the seat 1012 at the housing 1002 whereupon the diaphragm spring is tilted relative to the seat 1012. During transition of the position of the diaphragm spring 1004 from tiltable engagement with the seat 1012 at the housing 1002 to tiltable engagement with the pressure plate 1003, the diaphragm spring ceases to act not unlike a two-armed lever. The diaphragm spring 1004 temporarily engages the pressure plate 1003 in response to the application of the remaining disengaging force and, accordingly, is temporarily disengaged from the seat 1012 at the housing 1002. As the disengagement continues, the resulting reduction of the force enables the sensor spring 1013 to again urge the diaphragm spring 1004 against the seat 1012 at the housing 1002. This blocks the adjusting device and, accordingly, the adjusting operation is terminated. During the next-following stage of disengagement, the diaphragm spring 1004 again acts as a two-armed lever. The diaphragm spring 1004 is preferably designed by fully considering all of the spring forces which act upon the diaphragm spring, either directly or indirectly. Such forces include primarily forces which are generated by the actuating diaphragm spring 1004 and by those parts of the selected compensating or adjusting device which are movable axially relative to the housing.

The embodiment of FIG. 44 exhibits the additional advantage that, when the friction clutch 1101 is engaged, the diaphragm spring 1104 is stressed and acts not unlike a two-armed lever and, therefore, is stressed between the seat 1112 at the housing 1102 and the abutment 1103a on the pressure plate 1103. However, when the friction clutch 1101 is disengaged, the diaphragm spring 1104 actually abuts only the sensor spring 1113 and is tiltable at the abutment 1103a with simultaneous axial shifting of the abutment 1103a so that the diaphragm spring then acts not unlike a one-armed lever.

The sensor spring 1113 of FIG. 44 can be designed, the same as the sensor springs in other embodiments of the invention, in such a way that it abuts the actuating diaphragm spring 1104 at a desired radial distance from the axis of the spring 1104. Thus, the sensor spring 1113 can engage the diaphragm spring 1104 at a radius such that the locus of engagement between the springs 1104 and 1113 is disposed between the tilting seat assembly 1105 at the cover and at the abutment 1103a of the pressure plate. Furthermore, the sensor spring 1113 can engage the diaphragm spring 1104 radially inwardly of the diameter of the tilting seat assembly 1105 at the housing 1102. As a rule, the axial supporting force to be furnished by the sensor spring 1113 is greater if the diameter of its location 1113a of abutment against the diaphragm spring 1104 is reduced. Furthermore, that range of the bias of the sensor spring 1113 within which the force furnished by the sensor spring is substantially constant must be wider if the location 1113a of abutment between the springs 1104 and 1113 is disposed at a greater distance from the diameter of the supporting seat assembly 1105 for the diaphragm spring 1104.

Figure 45:
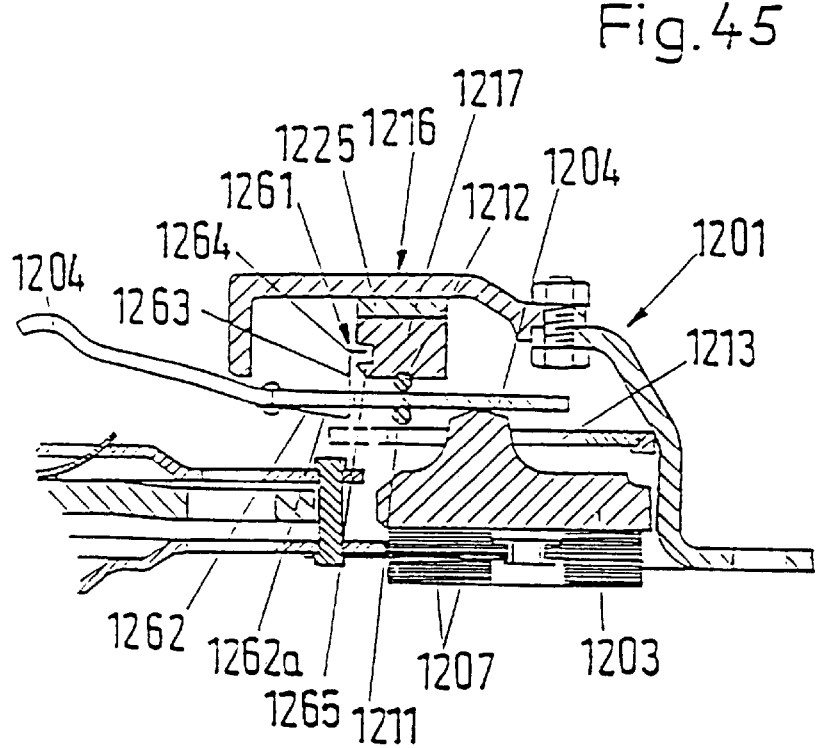

The embodiment of the friction clutch 1201 which is shown in FIG. 45 comprises an adjusting device 1216 operating in a manner similar to that described with reference to the preceding Figures, particularly FIGS. 17 to 30. The actuating diaphragm spring 1204 is tiltably mounted between two ring-shaped tilting seats 1211 and 1212. That seat 1211 which is nearer to the pressure plate 1203 is acted upon by the sensor spring 1213. The friction clutch 1201 comprises an arrangement 1261 ensuring that the ramps of the adjusting ring 1217 do not adhere to the opposing ramps at the housing 1202 during the useful life of the friction clutch. In the illustrated embodiment, the opposing ramps are provided on a supporting ring 1225 which is held against rotation relative to the housing 1202 in a manner similar to that described with reference to the embodiment of FIG. 18. Adherence of the ramps and opposing ramps to each other would entail that a compensation for wear could no longer take place.

The arrangement 1261 constitutes a separating or pulling apart mechanism which can apply to the adjusting ring 1217 an axial force during disengagement of the friction clutch 1201 and when the friction linings have undergone some wear, and the axial force terminates the bond (if any) between the ramps and the opposing ramps. The mechanism 1261 comprises an axially resilient element 1262 which, in the illustrated embodiment, is axially secured to the diaphragm spring 1204. The element 1262 comprises a ring-shaped first portion or main portion 1262a which is springy not unlike a membrane or a diaphragm spring and the radially outer portion of which is connected to the diaphragm spring 1204. The element 1262 further comprises axial lugs 1263 which extend from the inner marginal zone of and are uniformly distributed along the periphery of the main portion 1262a. The lugs 1263 extend through axial openings of the diaphragm spring 1204. The free end portions of the lugs 1263 are provided with abutments in the form of bent portions 1264 which cooperate with complementary abutments 1265 of the adjusting ring 1217. The complementary abutments 1265 include radial recesses or a circumferentially extending groove provided in the ring 1217. The distance between the abutments 1264 and the complementary abutments 1265 in the engaged condition of the friction clutch 1201 is selected in such a way that the abutments 1264 and the complementary abutments 1265 do not contact each other at least during the major part of disengagement of the friction clutch. It is preferred that the abutments 1264 engage the complementary abutments 1265 only when the friction clutch 1201 is fully disengaged so that the element 1262 can be resiliently stressed between the adjusting ring 1217 and the diaphragm spring 1204. This ensures that, as soon as the tilting seat 1211 is shifted axially as a result of wear upon the friction linings 1207, the adjusting ring 1217 is compelled to move away from the opposing ramps on the cover. Furthermore, the arrangement 1261 should ensure that, when the extent of disengaging movement is excessive, for example due to improper initial setting of the disengaging system, no adjustment of the ring 1217 will take place. This is achieved in that, when the change of conicity of the diaphragm spring 1204 in the direction of disengagement is excessive, the resilient element 1262 urges the adjusting ring 1217 against the diaphragm spring 1204 to thus prevent rotation of the adjusting ring 1217 relative to the diaphragm spring 1204. Thus, it is necessary to ensure that, when the point 46 of the characteristic curve 40 shown in the diagram of FIG. 24 is exceeded in the direction of disengagement, the adjusting ring 1217 is held against rotation relative to the diaphragm spring 1204 because, when the point 46 is exceeded, the holding force of the sensor spring 1213 is overcome so that an adjustment could take place even in the absence of wear or in the absence of additional wear upon the clutch disc. This would entail a change of the installed position of the diaphragm spring 1204, namely in a direction toward the application of a smaller biasing force. Thus, and referring again to FIG. 24, the point 41 of the characteristic curve 40 would advance in a direction toward the minimum at 45.

In that embodiment of a friction clutch certain details of which are constructed and assembled in a manner as shown in FIGS. 46 to 48, the individual coil springs 1326 are carried by lugs 1328 which are of one piece with the clutch housing 1302. The lugs 1328 are obtained by providing the metallic sheet material of the housing 1302 with U-shaped slits 1302*a* which are formed, e.g., by stamping. The lugs 1328 extend along arcs or tangentially, as seen in the circumferential direction, and are preferably located at least close to the same axial level as the immediately adjacent portions of the housing 1302. FIG. 48 shows that, in the illustrated embodiment, a lug 1328 is shifted relative to the bottom portions 1302*b* of the housing 1302 through approximately one-half of the thickness of the material of the bottom. The width of each lug 1328 is selected in such a way that the coil spring 1326 which is supported thereby is guided not only in the radial direction but also in the axial direction.

The radially inner marginal portion of the adjusting ring 1317, which latter is biased in the direction of adjustment by the spring 1326, is provided with radially inwardly extending formations or arms 1327 which are disposed between the housing 1302 and the diaphragm spring 1304. The arms 1327 have radially inner portions which extend in the axial direction and constitute forks or analogous U-shaped parts 1327*a*. Each fork 1327*a* has two prongs 1327*b* which are disposed at opposite sides of the respective lug 1328. To this end, both prongs 1327*b* extend through a slit 1302*a* of the housing 1302. The parts 1327*a*, and more specifically their prongs 1327*b*, support the adjusting springs 1326.

The sloping ramps of the adjusting ring 1317 abut the opposing ramps 1324, which are stamped into the housing 1302, in the same way as already described with reference to the preceding Figures. The opposing ramps 1324 constitute stamped out portions of the housing and are configurated in such a way that they define an air flow opening 1324*a* as seen in the direction of rotation of the clutch. Due to such configuration, one achieves a more satisfactory forced circulation of air and hence a more satisfactory cooling effect when the respective friction clutch is set in rotary motion. The just described cooling system is particularly suitable to reduce the temperature of the adjusting ring 2317 which is made of a plastic material so that the thermal stressing of such ring can be reduced to a considerable extent.

In accordance with a further embodiment, the force which is being applied by the sensor spring and acts upon the the actuating diaphragm spring of the friction clutch can be furnished, for example, by leaf spring elements which are installed between the clutch housing and the pressure plate and which can be mounted in such a way that they are capable of coupling the pressure plate and the housing to each other in a manner such that the pressure plate cannot rotate relative to the housing but can perform limited axial movements relative thereto. In such embodiment of the invention, one could dispense with a discrete sensor spring because the leaf spring elements 9 of the friction clutch 1 which is shown in FIGS. 1 and 2 can be designed in such a way that they also perform the function of the sensor spring 13. This renders it possible to dispense with the sensor spring 13 as well as with the tilting seat 11. The leaf spring elements 9 are then designed in such a way that, when the friction clutch 1 is actuated at a time prior to the development of wear upon the friction linings 7, the actuating diaphragm spring 4 continues to bear upon that tilting seat 11 which is adjacent the housing 2. However, as soon as the friction linings 7 have undergone a certain amount of wear, which entails an increase of the disengaging force of the diaphragm spring 4, the leaf spring elements 9 must permit an adjustment of the diaphragm spring 4 which compensates for wear. It is presently preferred that the leaf spring elements which are built into the friction clutch exhibit a substantially linear force-distance characteristic curve at least within the maximum required adjustment range of the friction clutch or its pressure plate. This means that the characteristic curve of the leaf spring elements 9 should include a portion corresponding to the portion 48 of the characteristic curve 47 or 47*a* in a manner similar to that described with reference to FIG. 25.

The invention is not limited to the illustrated and described embodiments but also encompasses modifications which can be arrived at by combining those features and/or elements which were described hereinbefore. Furthermore, individual features and modes of operation which were described with reference to the drawings could constitute independent inventions.

The applicants further reserve the right to present claims for the protection of additional features which merit patent protection and were heretofore only described in the specification, particularly with reference to the drawings. Thus, the appended claims merely constitute a proposed formulation of the sought-after protection without prejudice to achieving additional and broader patent protection.

We claim:

1. Clutch assembly including a friction clutch with a pressure plate which can be non-rotatably connected with a counterpressure plate with limited freedom of axial movement, at least one biasing spring being provided to act upon the pressure plate in a direction toward a clutch disc which has friction linings and can be clamped between the pressure plate and the counterpressure plate, there being further provided an adjusting device which can compensate at least for the wear upon the friction linings of the clutch disc and which effects a substantially unchanged application of force from the biasing spring to the pressure plate, the friction clutch further comprising actuating means which can disengage and engage the friction clutch and is actuatable by a disengaging member which is movable axially by disengaging means, the actuating means being shifted axially in the direction of disengaging movement in dependency at least on the wear upon the friction linings, a device which at least substantially compensates for axial displacement of the actuating means being provided to operate between the disengaging means and the actuating means.

2. The clutch assembly according to claim 1, wherein the compensating device is disposed between the disengaging member and the actuating means.

3. The clutch assembly according to claim 1 or 2, wherein the friction clutch comprises a housing, such as for example a sheet metal cover, which can be affixed to the counterpressure plate and comprises a bottom wall confronting the disengaging member, the compensating device being adapted to be stressed axially between the actuating means and the bottom wall.

4. The clutch assembly according to claim 1, wherein the biasing spring is constituted by a diaphragm spring which can be stressed between the clutch housing and the pressure plate in the axial direction and comprises a resilient ring-shaped main body and prongs extending radially inwardly from the main body and constituting the actuating means.

5. The clutch assembly according to claim 1, wherein the compensating device comprises adjusting ramps which slope in the axial direction.

6. The clutch assembly according to claim 5, wherein the adjusting ramps constitute climbing ramps provided on at least one ring-shaped member.

7. The clutch assembly according to claim 5 or 6, wherein the adjusting ramps comprise complementary ramps which cooperate with the climbing ramps.

8. The clutch assembly according to claim 7, wherein the complementary ramps are also carried by a ring-shaped member.

9. The clutch assembly according to claim 5, wherein the members which are provided with adjusting ramps are movable in the axial direction.

10. The clutch assembly according to claim 8, wherein the members which carry the climbing ramps and the complementary ramps are rotatable relative to each other.

11. The clutch assembly according to claim 10, wherein one of the members which carry the climbing ramps or the complementary ramps cannot rotate relative to the friction clutch.

12. The clutch assembly according to claim 5, wherein the adjusting ramps have a slope angle which effects a self-locking action as a result of frictional engagement between the adjusting ramps.

13. The clutch assembly according to claim 5, wherein the adjusting ramps have an angle of slope which is between 5° and 20°, preferably in the range of between 7° and 11°.

14. The clutch assembly according to claim 8, wherein at least one of the members which carry the climbing ramps or the complementary ramps is spring biased in the direction of adjustment.

15. The clutch assembly according to claim 8, wherein the member which carries the climbing ramps or the member which carries the complementary ramps is acted upon or stressed in the direction of adjustment by at least one energy storing element, such as a coil spring, which is disposed between such members.

16. The clutch assembly according to claim 1, wherein there is further provided a device which limits the extent of movement in the direction of disengagement.

17. The clutch assembly according to claim 16, wherein the limiting device comprises at least one limiting stop.

18. The clutch assembly according to claim 16 or 17, wherein the limiting device is effective between the disengaging member and the clutch cover.

19. The clutch assembly according to claim 16, wherein the disengaging member comprises a disengaging bearing and the limiting stop is effective between the bearing race which rotates with the friction clutch and the clutch cover.

20. The clutch assembly according to claim 16, wherein the limiting device is disposed between a tubular guide for the disengaging member, which guide is provided on the transmission, and the disengaging member.

21. The clutch assembly according to claim 1, wherein there is further provided means for effecting during disengagement of the clutch a gradual reduction of torque which can be transmitted by the friction clutch or by the clutch disc while the actuating means are in the process of completing a portion of disengaging movement.

22. The clutch assembly according to claim 1, wherein the biasing spring, which is constituted by a diaphragm spring, is tiltably mounted in the clutch housing between two stops one of which confronts the clutch plate and is spring-biased toward the biasing spring, the force which is transmitted by the biasing spring to the spring-biased stop during disengagement of the friction clutch increasing in response to wear upon the friction linings and such force being greater than the force acting upon the spring-biased stop.

23. The clutch assembly according to claim 22, wherein the spring-biased stop is movable in the axial direction.

24. The clutch assembly according to claim 22 or 23, wherein the spring-biased stop is moved in a direction toward the pressure plate in response to increasing disengaging force which is furnished by the biasing spring.

25. The clutch assembly according to claim 22, wherein the disengaging force for the biasing spring decreases in response to movement of the spring-biased stop.

26. The clutch assembly according to claim 22, wherein the spring-biased stop moves until [the establishment of] an equilibrium is established between the maximum disengaging force acting upon the stop and the opposing force acting upon such stop.

27. The clutch assembly according to claim 22, wherein the characteristic curve of the biasing diaphragm spring slopes downwardly at least within a portion of the range of disengagement.

28. The clutch assembly according to claims 22, wherein the axially yieldable or shiftable stop is biased by a diaphragm spring which acts as a sensor of forces.

29. The clutch assembly according to claim 22, wherein said one stop is biased by a diaphragm spring which acts as a sensor of forces.

* * * * *